(12) United States Patent
Hori et al.

(10) Patent No.: US 11,333,743 B2
(45) Date of Patent: May 17, 2022

(54) LAMP DEVICE, SENSOR SYSTEM, AND SENSOR DEVICE

(71) Applicant: KOITO MANUFACTURING CO., LTD., Tokyo (JP)

(72) Inventors: Takashi Hori, Shizuoka (JP); Norimasa Yamamoto, Shizuoka (JP); Akitaka Kanamori, Shizuoka (JP); Akinori Matsumoto, Shizuoka (JP); Teruaki Yamamoto, Shizuoka (JP); Minami Katagiri, Shizuoka (JP); Yoshiaki Fushimi, Shizuoka (JP); Naoki Takii, Shizuoka (JP); Yasuyuki Kato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 195 days.

(21) Appl. No.: 16/633,465

(22) PCT Filed: Jun. 19, 2018

(86) PCT No.: PCT/JP2018/023263
§ 371 (c)(1),
(2) Date: Jan. 23, 2020

(87) PCT Pub. No.: WO2019/021693
PCT Pub. Date: Jan. 31, 2019

(65) Prior Publication Data
US 2020/0174100 A1    Jun. 4, 2020

(30) Foreign Application Priority Data

Jul. 24, 2017 (JP) .............................. JP2017-142753
Jul. 25, 2017 (JP) .............................. JP2017-143576

(Continued)

(51) Int. Cl.
*F21S 41/20* (2018.01)
*F21S 45/435* (2018.01)
(Continued)

(52) U.S. Cl.
CPC .......... *G01S 7/4812* (2013.01); *B60Q 1/0023* (2013.01); *B60Q 1/08* (2013.01);
(Continued)

(58) Field of Classification Search
CPC .......... F21S 41/28; F21S 45/435; F21S 45/47; B60Q 1/08; G01S 7/4812; G01S 2013/93277; G01S 13/865; G01S 13/931
See application file for complete search history.

(56) References Cited

U.S. PATENT DOCUMENTS 1,925,200 A * 9/1933 Miller .................. F21S 41/28
                                                    362/20
5,546,284 A * 8/1996 Harada ................ B60Q 1/0041
                                                    362/487

(Continued)

FOREIGN PATENT DOCUMENTS

JP    H07-129894 A    5/1995
JP    2000-236462 A    8/2000

(Continued)

OTHER PUBLICATIONS

Communication dated Feb. 24, 2021, from the European Patent Office in European Application No. 18838790.6.

(Continued)

*Primary Examiner* — Arman B Fallahkhair
(74) *Attorney, Agent, or Firm* — Sughrue Mion, PLLC

(57) ABSTRACT

A translucent cover (1012) defines a lamp chamber (1013) together with a housing (1011) while forming a portion of an outer face of a vehicle. A LiDAR sensor (1161) is disposed in the lamp chamber (1013) to detect external information of (Continued)

the vehicle. A half mirror (1162) is disposed in the lamp chamber (1013) so as to cover the LiDAR sensor (1161) from a side where the translucent cover (1162) is disposed. The translucent cover (1012) has a first transparency to visible light. The half mirror (1162) has a second transparency to the visible light that is lower than the first transparency.

6 Claims, 42 Drawing Sheets

(30) Foreign Application Priority Data

| Aug. 4, 2017 | (JP) | JP2017-151425 |
| Aug. 17, 2017 | (JP) | JP2017-157566 |
| Aug. 30, 2017 | (JP) | JP2017-165462 |
| Oct. 26, 2017 | (JP) | JP2017-207339 |

(51) Int. Cl.

| F21S 45/47 | (2018.01) |
| B60Q 1/08 | (2006.01) |
| B60Q 1/00 | (2006.01) |
| G01S 7/481 | (2006.01) |
| G01S 13/931 | (2020.01) |
| G01S 13/86 | (2006.01) |

(52) U.S. Cl.
CPC ............ *F21S 41/28* (2018.01); *F21S 45/435* (2018.01); *F21S 45/47* (2018.01); *G01S 13/865* (2013.01); *G01S 13/931* (2013.01); *G01S 2013/93277* (2020.01)

(56) References Cited

U.S. PATENT DOCUMENTS

| 7,794,128 B2 * | 9/2010 | Fujiwara | F21S 41/148 |
| | | | 362/545 |
| 10,618,453 B2 * | 4/2020 | Furui | F21S 45/47 |
| 2007/0206114 A1 | 9/2007 | Tanaka et al. | |
| 2008/0180965 A1 * | 7/2008 | Nakamura | B60Q 1/0023 |
| | | | 362/507 |
| 2012/0154785 A1 * | 6/2012 | Gilliland | G01S 7/4972 |
| | | | 356/5.01 |
| 2015/0293532 A1 | 10/2015 | Gilliland et al. | |
| 2016/0144770 A1 | 5/2016 | Graf | |

FOREIGN PATENT DOCUMENTS

| JP | 2000-314620 A | 11/2000 |
| JP | 2007-178310 A | 7/2007 |
| JP | 2007-235863 A | 9/2007 |
| JP | 2007-251555 A | 9/2007 |
| JP | 2009-166725 A | 7/2009 |
| JP | 2010-135087 A | 6/2010 |
| JP | 2010-185769 A | 8/2010 |
| JP | 2010-260379 A | 11/2010 |
| JP | 2011-099683 A | 5/2011 |
| JP | 2016-016768 A | 2/2016 |
| JP | 2017-102832 A | 6/2017 |
| WO | 2016194135 A1 | 12/2016 |

OTHER PUBLICATIONS

Written Opinion (PCT/ISA/237) issued by the International Searching Authority in corresponding International Application No. PCT/JP2018/023263, dated Sep. 18, 2018.
International Search Report (PCT/ISA/210), issued by International Searching Authority in corresponding International Application No. PCT/JP2018/023263, dated Sep. 18, 2018.

* cited by examiner

FIG. 2
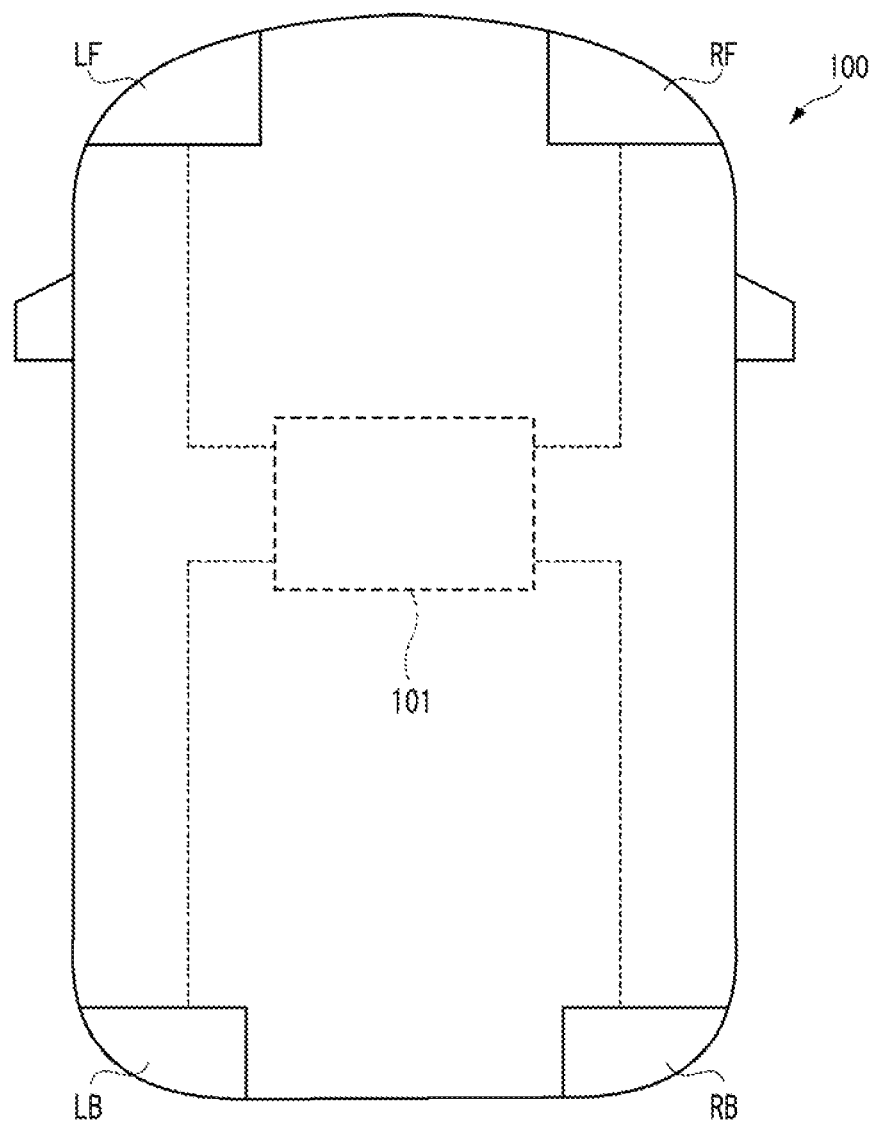
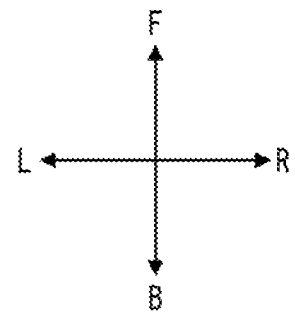

FIG. 16
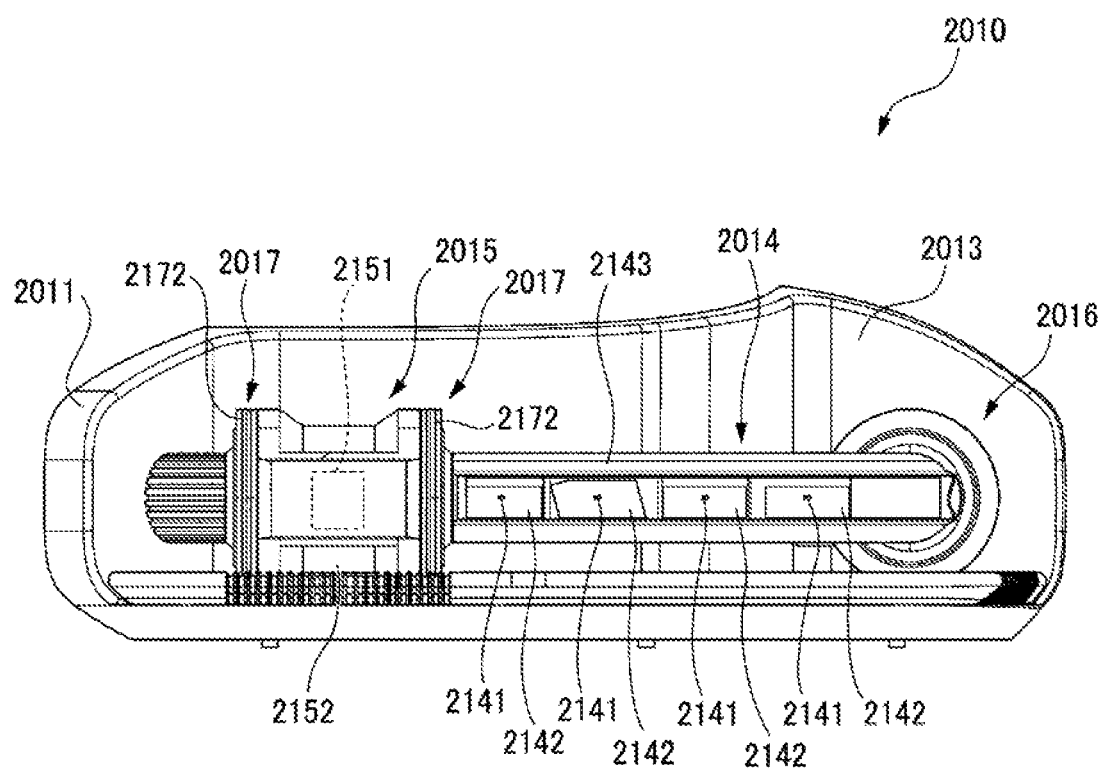
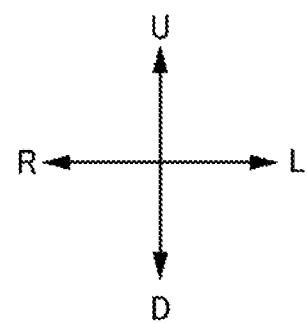

FIG. 17
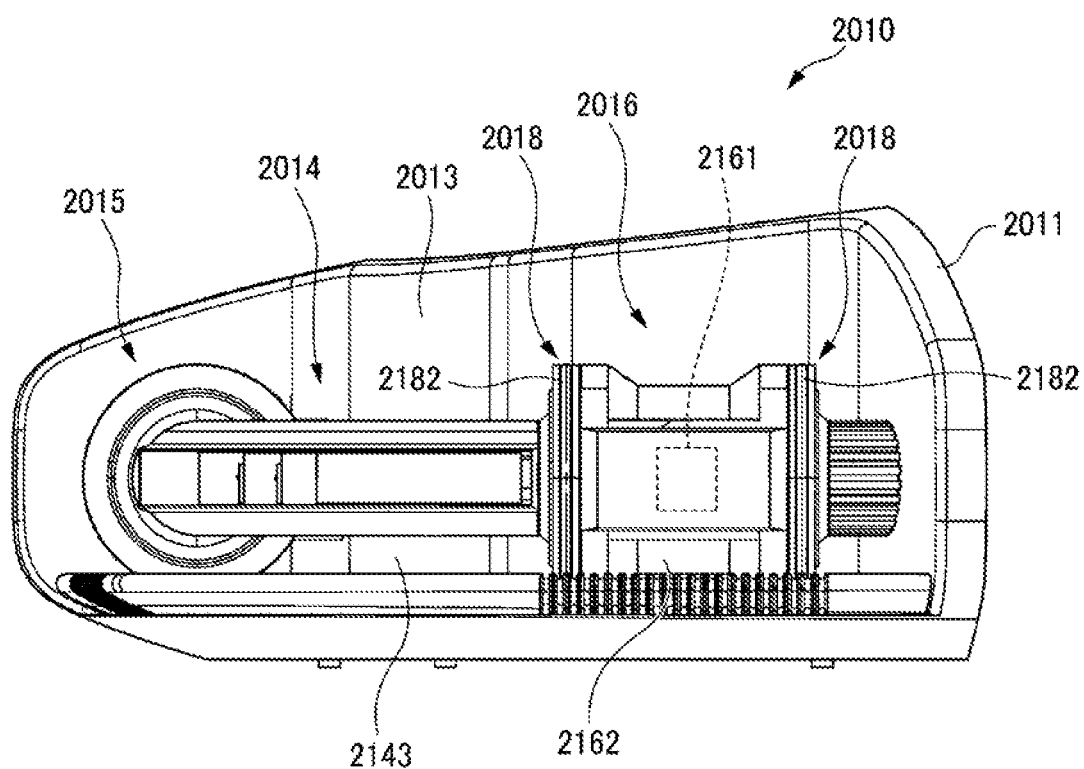
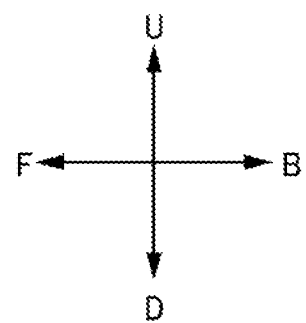

FIG. 18
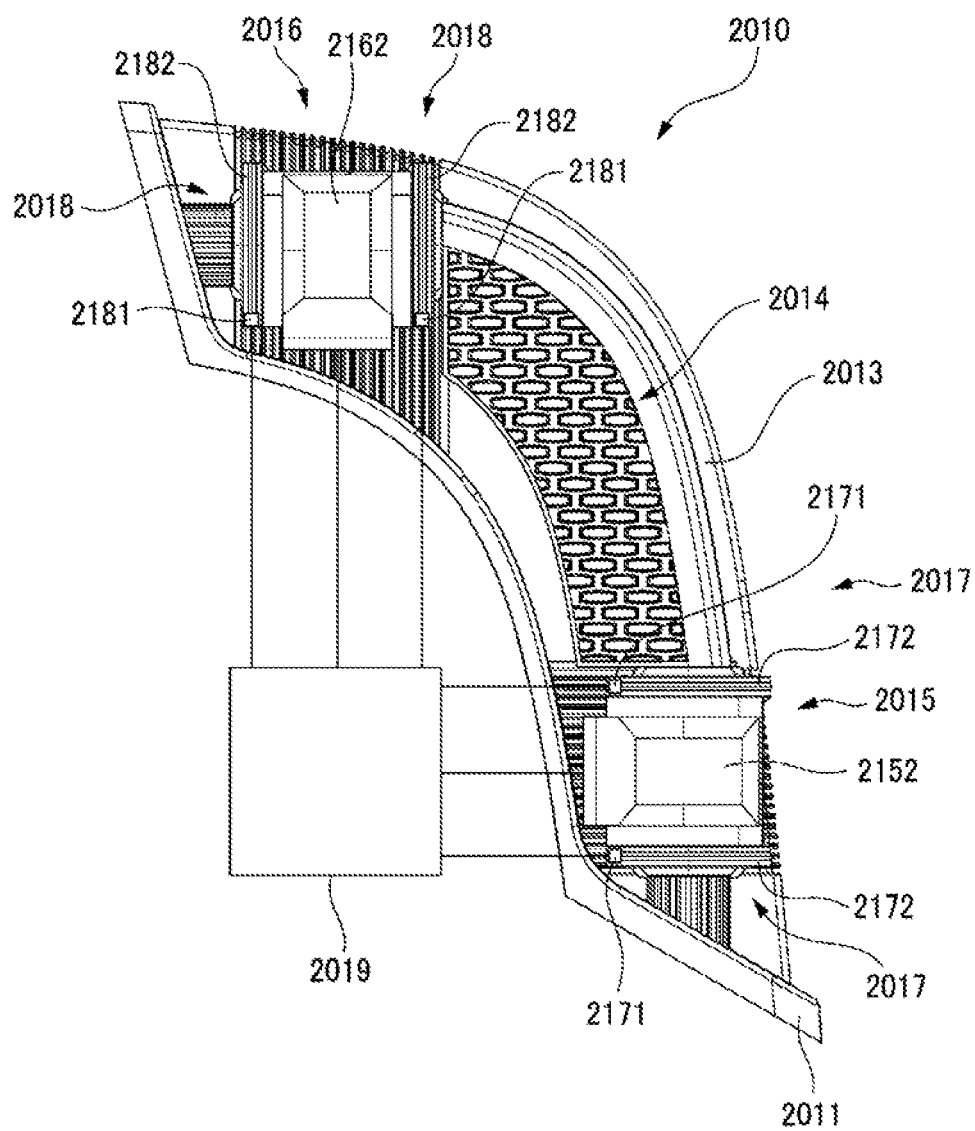
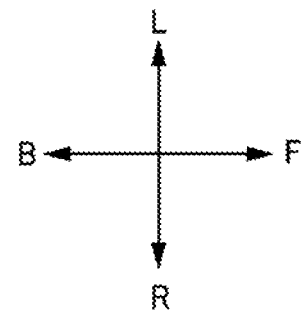

FIG. 32
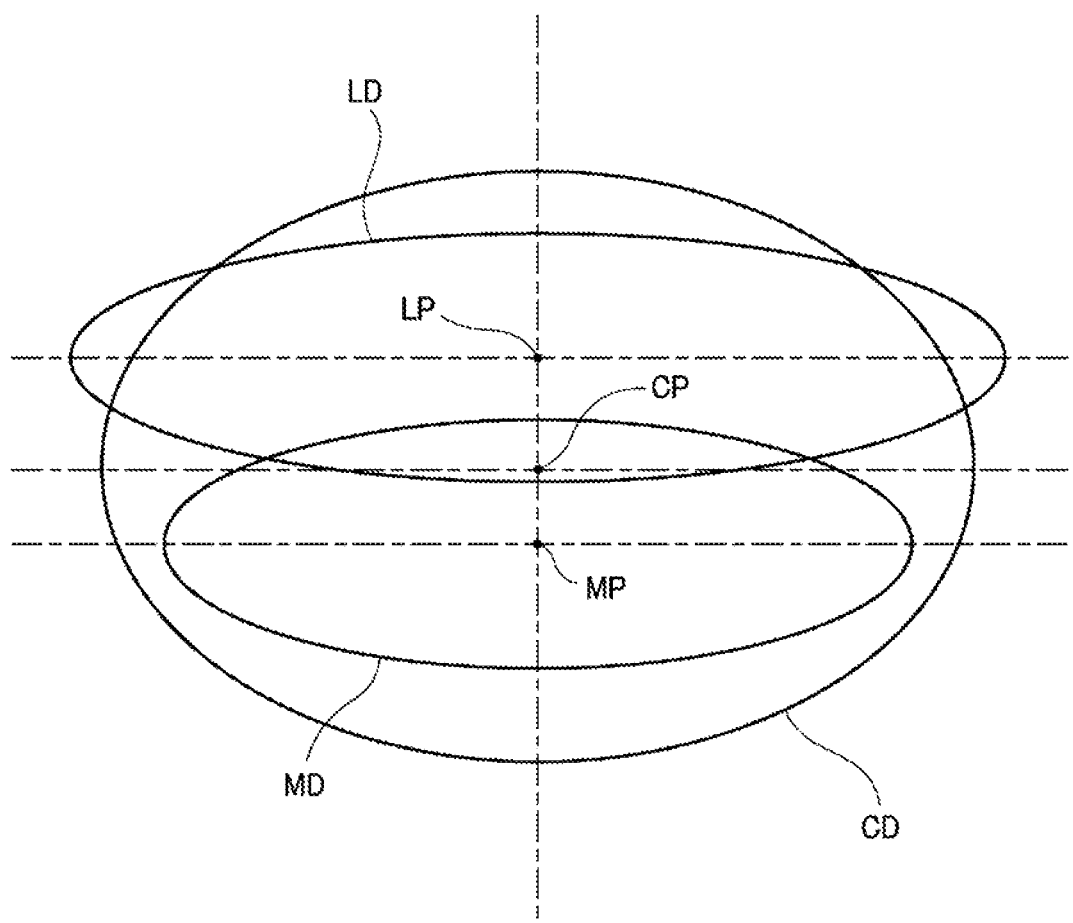
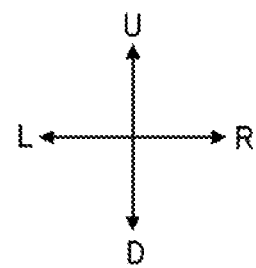

FIG. 34A
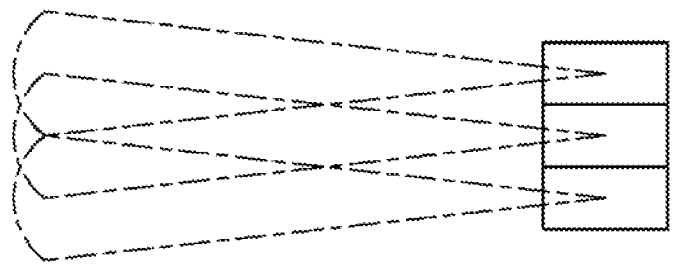
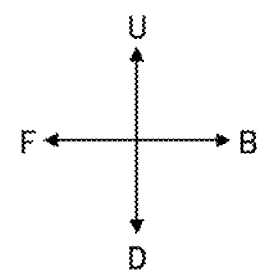
FIG. 34B
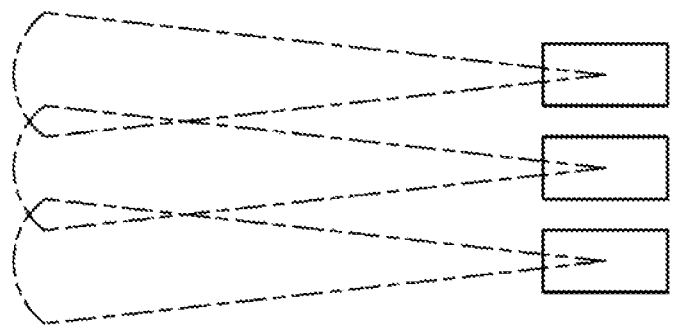
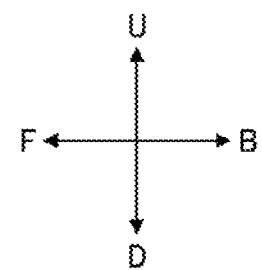
FIG. 34C
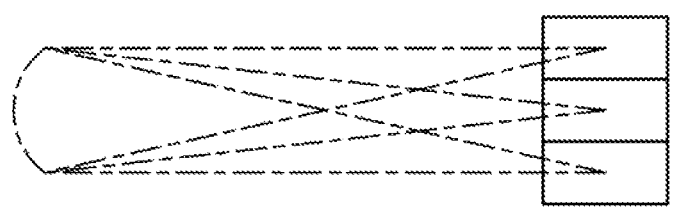
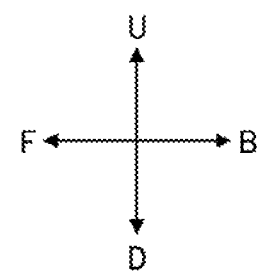

FIG. 35
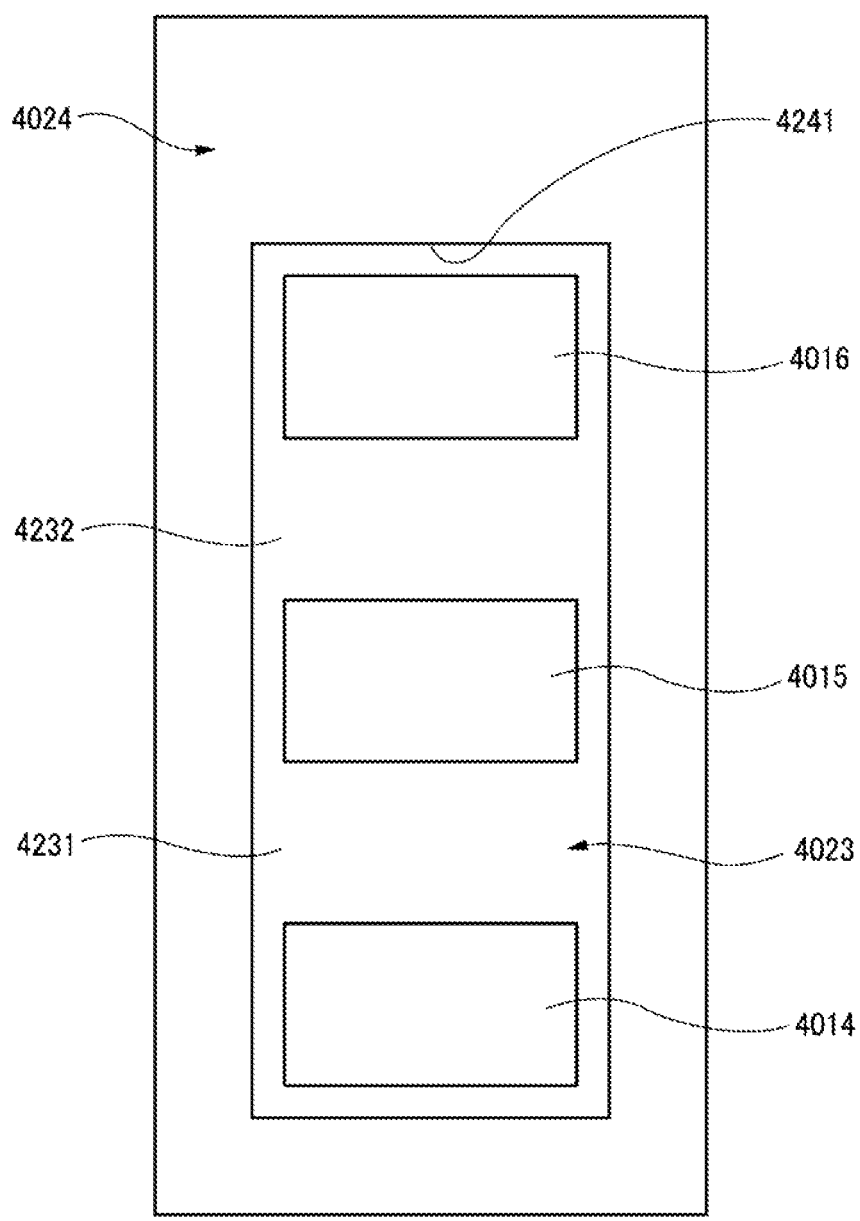
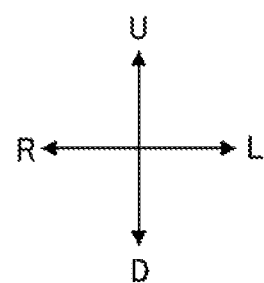

FIG. 36
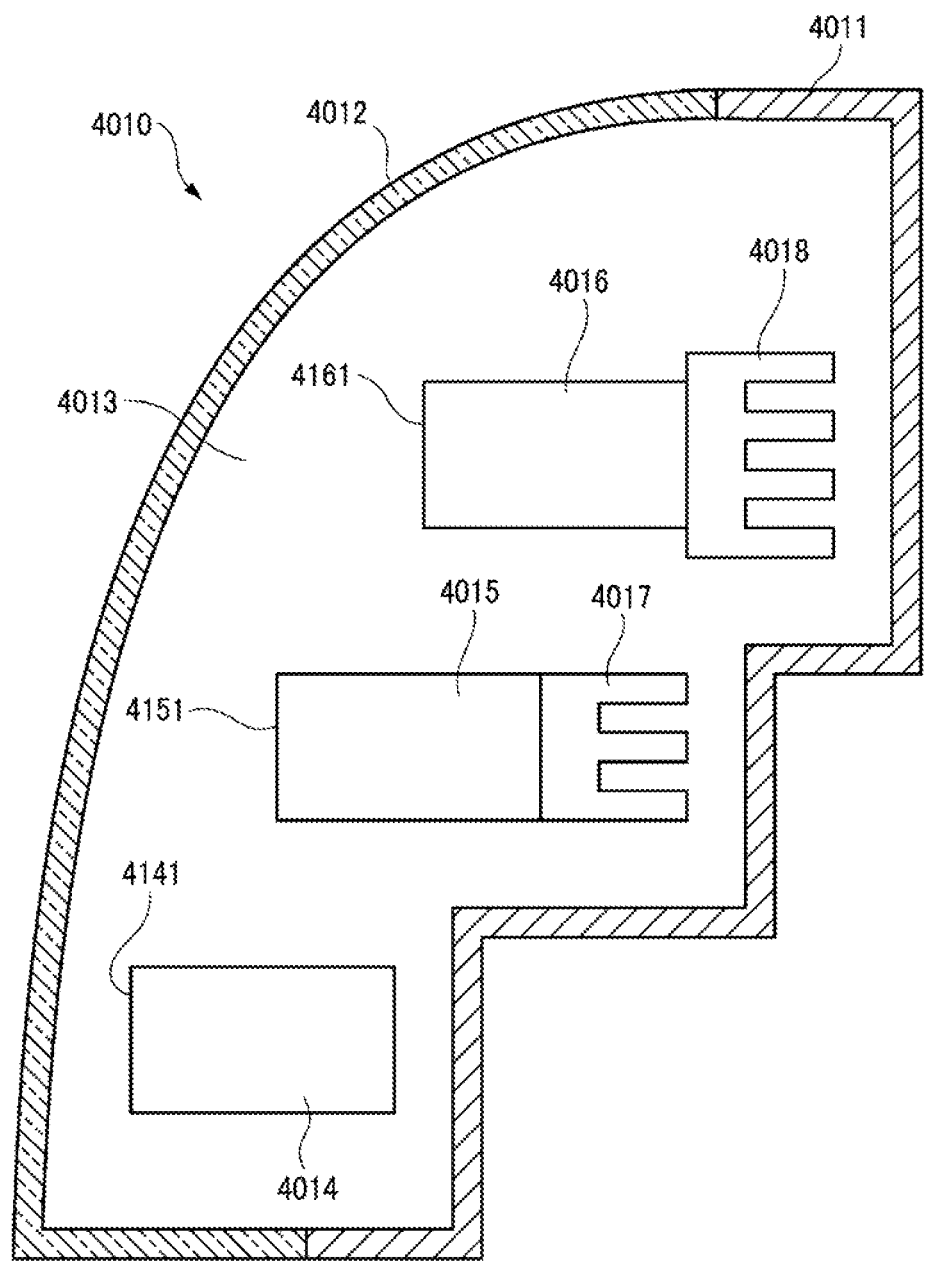
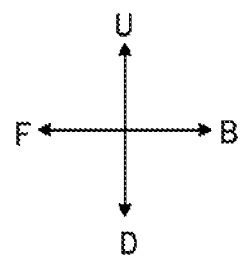

LAMP DEVICE, SENSOR SYSTEM, AND SENSOR DEVICE

FIELD

The presently disclosed subject matter relates to a lamp device, a sensor system, and a sensor device that are adapted to be mounted on a vehicle.

BACKGROUND

In order to realize the driving support technology of the vehicle, sensors for sensing external information of the vehicle shall be mounted on a vehicle body. Examples of such sensors include a LiDAR (Light Detection and Ranging) sensor, a camera, and a millimeter wave sensor (for example, see PTL 1).

CITATION LIST

Patent Literature

PTL1: Japanese Patent Publication No. 2010-185769 A

SUMMARY

Technical Problem

Four corner portions of the vehicle body (left front corner portion, right front corner portion, left rear corner portion, and right rear corner portion) have been considered as placement locations of sensors capable of efficiently acquire external information of the vehicle. These are places where a lamp device for supplying illumination light to the outside of the vehicle is mounted.

However, such sensors are likely to have relatively large dimensions and to have a very different appearance from the lamp. Accordingly, when the sensor is disposed in the lamp chamber or in the vicinity of the lamp device, it is necessary to consider the interference with the lamp, or it is inevitable to cause a sense of discomfort in appearance. That is, it is difficult to secure a place where the sensor can detect information while avoiding interference with the lamp and to reduce the sense of discomfort in appearance.

Accordingly, it is demanded to alleviate the layout-related constraint that occurs when a sensor for detecting external information of the vehicle is disposed in the lamp chamber (first demand).

Additionally or alternatively, it is demanded to enhance the degree of freedom of disposition of sensors for detecting external information of the vehicle (second demand).

In addition, when an attempt is made to arrange the above-described sensor in the lamp device or in the vicinity of the lamp device, the layout would be further constrained. For example, in a case where a decorative member such as an extension is provided in order to suppress the sense of discomfort in appearance, the decorative member might interfere with the detectable area of the sensor. That is, there is a difficulty in determining the layout of a sensor capable of suppressing the sense of discomfort in appearance while securing a desired detectable area of the sensor.

Accordingly, it is demanded to enable efficient detection of external information of the vehicle while alleviating the layout-related constraint of the sensor device adapted to be mounted on the vehicle (third demand).

Moreover, as the number of sensors increases to obtain more information, the layout would be further constrained. Accordingly, it is demanded to enable efficient detection of external information of the vehicle while alleviating the layout-related constraints in the case where a plurality of sensors are mounted on the vehicle.

As dependence on the driving support technology increases, the importance of whether such sensors are operating normally also increases.

Accordingly, it is demanded to enable automatic determination on whether a sensor mounted on a vehicle to acquire external information of the vehicle is operating normally (fifth demand).

In addition, as the driving support technology of the vehicle becomes more sophisticated, the load relating to the required information processing also increases.

Accordingly, it is demanded to suppress an increase in the load of the information processing required for the driving support of the vehicle (sixth demand).

As used herein, the term "driving support" means control processing that at least partially performs at least one of driving operation (steering operation, acceleration, deceleration), monitoring of a driving environment, and backup of driving operation. That is, it includes not only the partial driving support such as braking function for collision avoidance and assisting function for lane-keeping, but also a full self-driving operation.

Solution to Problem

In order to meet the first demand described above, according to an illustrative aspect of the presently disclosed subject matter, there is provided a lamp device adapted to be mounted on a vehicle, comprising:
  a housing;
  a cover defining a lamp chamber for housing a lamp together with the housing and forming a portion of an outer face of the vehicle;
  a sensor disposed in the lamp chamber and configured to detect external information of the vehicle; and
  an optical member disposed in the lamp chamber so as to partially cover the sensor from a side where the cover is disposed,
  wherein the cover has a first transparency to visible light; and
  wherein the optical member has a low transparency portion that has at least temporarily a second transparency to the visible light that is lower than the first transparency.

As for the present illustrative aspect, "optical member" means a member that participates in at least one of light emission, light transmission, light reflection, light refraction, light diffraction, light scattering, light polarization, light separation, light mixing, and light wavelength selection.

In order to efficiently acquire the external information of the vehicle, it is advantageous if the sensor is disposed in the lamp chamber of the lamp device. However, in a case where the sensor has a relatively large dimension and a very different appearance from the lamp, it is difficult to secure an installation location where the sensor can detect information without interference with the lamp while avoiding a sense of discomfort in appearance.

However, according to the configuration described above, since the visibility of the sensor is reduced by the low transparency portion of the optical member, it is possible to alleviate at least the constraint on the sense of discomfort in appearance. Accordingly, it is possible to reduce the layout-related constraint that would be imparted when attempting to dispose the sensor in the lamp chamber.

The above lamp device may be configured such that the optical member is configured to form the low transparency portion by light emission.

According to such a configuration, it is possible to provide a lamp device which not only reduces the visibility of the sensor but also exhibits a novel appearance during operation.

In this case, the above lamp device may be configured such that the optical member serves also as the lamp.

According to such a configuration, since the sensor can be disposed behind the lamp, it is possible to efficiently utilize a limited space in the lamp chamber.

Alternatively, the above lamp device may be configured such that the sensor is configured to utilize reflection by the low transparency portion to detect the external information.

The above lamp device may be configured so as to further comprise:
- a support member disposed in the lamp chamber and supporting the sensor and the optical member so as to maintain a relative positional relationship between the sensor and the optical member; and
- an adjustment mechanism configured to adjust at least one of a position and an attitude of the support member.

The attitude of the support member is adjusted in order to adjust at least one of the detection reference position of the sensor and the light emitting direction from the optical member. According to the above configuration, since the relative positional relationship between the sensor and the optical member is maintained by the support member, it is unnecessary to perform the above-mentioned adjustment and the adjustment for maintaining the effect of reducing the visibility of the sensor by the low transparency portion individually.

In order to meet the second demand described above, according to an illustrative aspect of the presently disclosed subject matter, there is provided a sensor system adapted to be mounted on a vehicle, comprising:
- a housing;
- a translucent cover defining a housing chamber together with the housing;
- a sensor disposed in the housing chamber and configured to detect external information of the vehicle; and
- a light emitting member disposed in a position in the housing chamber at which operation of the sensor is not obstructed, and configured to emit light in cooperation with the operation of the sensor.

From the viewpoint of efficiently acquiring the external information of the vehicle, the corner portion of the vehicle where the lamp is disposed is advantageous as a location where the sensor is disposed. However, in a case where the sensor has a relatively large dimension and a very different appearance from the lamp, it is inevitable to cause a sense of discomfort in appearance when an attempt is made to dispose the sensor in the vicinity of the lamp. In order to alleviate such a sense of discomfort, a method of covering the sensor with an opaque cover or the like is generally employed.

On the other hand, in the above-mentioned configuration, the sensor is disposed in the housing chamber defined by the translucent cover, so that the sensor is visually recognized with intention. In addition, a light-emitting body that emits light in cooperation with the operation of the sensor is disposed in the housing chamber. As a result, it is possible to provide a new marketability with a novel appearance that intentionally emphasizes the presence of the sensor. In addition, since it is released from the constraint of the necessity of suppressing the presence of the sensor for detecting the external information of the vehicle, the degree of freedom of disposition of such a sensor can be enhanced.

The above sensor system may be configured such that the light emitting member is disposed at a portion that appears to surround the sensor when viewed from an outside of the vehicle According to such a configuration, it is possible to provide an appearance that further emphasizes the presence of the sensor.

The above sensor system may be configured such that the light emitting member is configured to emit light when the vehicle performs a driving support operation.

According to such a configuration, the fact that the vehicle is in the driving support operation can be recognized even from the outside of the vehicle, so that a new marketability can be provided. If social recognition of such a function is promoted, the light emission can give safety feeling to pedestrians and other drivers.

The above sensor system may be configured such that the light emitting member is a light guide member.

The light guide member is an optical component that has a relatively high degree of freedom in selecting a shape and can easily secure a wide light emitting area. Accordingly, it is possible to easily and flexibly realize a light emitting mode capable of emphasizing the presence of the sensor.

Alternatively, the above sensor system may be configured such that the light emitting member is a light source.

In this case, it is not necessary to consider a change in the traveling direction of the light by the light guide member, and it is possible to easily and flexibly determine the arrangement of the light source for realizing the light emitting mode in which the presence of the sensor can be emphasized.

In this case, the above sensor system may be configured so as to further comprise:
- a controller configured to control the operation of the sensor; and
- a support member supporting the light source, the sensor and the controller so as to maintain their positional relationships.

According to such a configuration, the controller, the sensor, and the light source involved in the cooperative operation can be modularized and arranged in the housing chamber.

In this case, the above sensor system may be configured so as to further comprise an adjustment mechanism configured to adjust at least one of a position and an attitude of the support member relative to the vehicle.

The adjustment of at least one of the position and the attitude of the support member is performed in order to adjust at least one of the detection reference position of the sensor and the light emitting direction from the light source. Since the relative positional relationship between the sensor and the light source is maintained by the support member, when either adjustment is performed, the result is reflected on the other.

In order to meet the third demand described above, according to an illustrative aspect of the presently disclosed subject matter, there is provided a sensor device adapted to be mounted on a vehicle, comprising:
- a housing;
- a cover defining a housing chamber together with the housing, and forming a portion of an outer face of the vehicle;
- a sensor unit disposed in the housing chamber and configured to detect external information of the vehicle with detection light; and a light control surface disposed at a position that is at least one of on an outer face of the cover, on an inner face of the cover, and in a space between the cover and the sensor unit, and configured to change a traveling direction of the detection light.

As for the present illustrative aspect, "sensor unit" means a constituent unit of a component that can be distributed by itself as a single unit while providing a desired information sensing function.

As for the present illustrative aspect, "light control surface" means a surface that intentionally causes refraction, reflection, diffraction, and scattering of light, thereby changing the traveling direction of light. For example, when light emitted from a lamp passes through a translucent cover in a lamp device, strictly speaking, slight refraction or reflection of the light occurs at the surface of the translucent cover. However, the surface of such a member, which is merely intended to allow light to pass through, is distinguished from the "light control surface" described above.

As for the present illustrative aspect, "light" means an electromagnetic wave having an arbitrary wavelength. For example, "light" is a concept including not only visible light but also ultraviolet light, infrared light, millimeter waves and microwaves.

According to such a configuration, since the light control surface appropriately changes the traveling direction of the detection light used by the sensor unit to detect the information, a desired detection range can be set with a high degree of freedom regardless of the arrangement of the sensor unit. In other words, it is possible to alleviate the layout-related constraint on the sensor unit while setting the detection range capable of efficiently acquiring the external information of the vehicle.

In order to meet the fourth demand described above, according to an illustrative aspect of the presently disclosed subject matter, there is provided a sensor system adapted to be mounted on a vehicle, comprising:
  a housing;
  a cover defining a housing chamber together with the housing, and forming a portion of an outer face of the vehicle; and
  a plurality of sensor units, each of which is disposed in the housing chamber and configured to detect external information of the vehicle,
  wherein at least one of the sensor units has a narrower detection range in a first direction corresponding to an up-down direction of the vehicle than a second direction perpendicular to the first direction; and
  wherein the sensor units are arranged in the first direction.

By arranging a plurality of sensor units in a direction in which the detection range is narrower, it is possible to avoid increasing the interval between the sensor units even if the overlap of the detection ranges of adjacent sensor units is reduced. On the other hand, when the detection ranges of adjacent sensor units are to be matched, the amount of adjustment of the detection direction required in each sensor unit can be reduced. Accordingly, it is possible to efficiently detect the external information of the vehicle while alleviating the layout-related constrains caused when a plurality of sensor units are mounted on the vehicle.

As for the present illustrative aspect, "sensor unit" means a constituent unit of a component that can be distributed by itself as a single unit while providing a desired information sensing function.

As for the present illustrative aspect, "light" means an electromagnetic wave having an arbitrary wavelength. For example, "light" is a concept including not only visible light but also ultraviolet light, infrared light, millimeter waves and microwaves.

In order to meet the fifth demand described above, according to a first illustrative aspect of the presently disclosed subject matter, there is provided a sensor system adapted to be mounted on a vehicle, comprising:
  a sensor configured to detect external information of the vehicle;
  a communicator configured to acquire infrastructure information via communication; and
  a controller configured to collate the external information detected by the sensor and the infrastructure information acquired by the communicator at a predetermined timing, and to determine that the sensor is not normal in a case where the external information does not match the infrastructure information.

According to such a configuration, it is possible to automatically judge whether or not the sensor mounted on the vehicle and acquiring the external information of the vehicle is operating normally. In addition, the reliability of the judgment can be enhanced by using, for the judgment, information on the infrastructure where the installation location that is basically unchanged.

The sensor system according to the first illustrative aspect may be configured such that the communicator is configured to acquire the infrastructure information from map information stored in a storage installed in the vehicle.

According to such a configuration, it is possible to automatically judge whether or not a sensor mounted on the vehicle to acquire the external information of the vehicle is operating normally by acquiring appropriate infrastructure information regardless of the external environment of the vehicle such as weather, brightness, and radio wave conditions.

The sensor system according to the first illustrative aspect may be configured such that the communicator is configured to acquire the infrastructure information via communication with an external entity of the vehicle.

According to such a configuration, it is possible to automatically judge whether or not the sensor mounted on the vehicle to acquire the external information of the vehicle is operating normally by acquiring the infrastructure information having a higher real-time characteristic.

The sensor system according to the first illustrative aspect may be configured such that the predetermined timing is a timing when the vehicle stops.

According to such a configuration, since the information is acquired by the sensor under a condition that the relative speed between the vehicle and the infrastructure is zero, not only the accuracy of the information can be enhanced, but also an increase in the processing load can be suppressed.

The sensor system according to the first illustrative aspect may be configured such that the controller is configured to cause the vehicle to perform at least one of notification processing and cancellation processing of an automatic driving support in a case where it is determined that the sensor is not normal.

According to such a configuration, it is possible to avoid a situation where the driving support control involving a sensor determined to be not normal is continued without the driver recognizing the fact that the sensor is not normal.

In order to meet the fifth demand described above, according to a second illustrative aspect of the presently disclosed subject matter, there is provided a sensor system adapted to be mounted on a vehicle, comprising:

a sensor configured to detect external brightness information of the vehicle;

a light source configured to light an area outside the vehicle; and a controller configured to acquire an output from the sensor while causing the light source to perform blinking at a predetermined timing, and to determine that the sensor is not normal in a case where the output from the sensor does not correspond to the blinking.

According to such a configuration, it is possible to automatically judge whether or not the sensor mounted on the vehicle is operating normally. In addition, a diagnostic system can be constructed at a low cost by utilizing the light source for lighting the outside of the vehicle for the judgment.

The sensor system according to the second illustrative aspect may be configured such that the blinking is repeated with such a frequency that a human cannot visually recognize the blinking.

According to such a configuration, even at night, it is possible to automatically judge whether or not the sensor mounted on the vehicle is operating normally without giving a sense of discomfort not only to an occupant of the vehicle but also to a person in the vicinity of the vehicle.

The sensor system according to the second illustrative aspect may be configured such that the predetermined timing is a timing when the vehicle is activated.

According to such a configuration, even not at night, it is possible to automatically judge whether or not the sensor mounted on the vehicle is operating normally without giving a sense of discomfort to a person around the vehicle. In addition, it is possible to avoid a situation in which the driving is started under a condition that a sensor mounted on the vehicle is not operating normally.

The sensor system according to the second illustrative aspect may be configured such that the controller is configured to cause the vehicle to perform at least one of notification processing and cancellation processing of an automatic driving support in a case where it is determined that the sensor is not normal.

According to such a configuration, it is possible to avoid a situation where the driving support control involving a sensor determined to be not normal is continued without the driver recognizing the fact that the sensor is not normal.

In order to meet the fifth demand described above, according to a third illustrative aspect of the presently disclosed subject matter, there is provided a sensor system adapted to be mounted on a vehicle, comprising:

a first sensor adapted to be mounted on a first portion of the vehicle, and configured to detect external information of the vehicle;

a second sensor adapted to be mounted on a second portion of the vehicle, and configured to detect external information of the vehicle; and a controller configured to collate the external information detected by the first sensor and the external information detected by the second sensor at a predetermined timing, and to determine that either the first sensor or the second sensor is not normal in a case where the external information detected by the first sensor does not match the external information detected by the second sensor.

According to such a configuration, it is possible to automatically and easily judge whether the sensor mounted on the vehicle is operating normally.

The sensor system according to the third illustrative aspect may be configured such that the external information is environmental information.

According to such a configuration, less constraints would be imparted on the timing at which the judgment is performed. In addition, in the environment information, a large difference is less likely to occur in the detection result compared with detection of an object or the like. If the detection results for such information do not match each other, an abnormality with a higher severity is expected. Accordingly, it is possible to detect an abnormality having a higher severity.

The sensor system according to the third illustrative aspect may be configured such that the predetermined timing is periodic.

According to such a configuration, it is possible to easily construct a periodic self-diagnosis system of the camera mounted on the vehicle.

The sensor system according to the third illustrative aspect may be configured such that the controller is configured to cause the vehicle to perform at least one of notification processing and cancellation processing of an automatic driving support in a case where it is determined that either the first sensor or the second sensor is not normal.

According to such a configuration, it is possible to avoid a situation where the driving support control involving a sensor determined to be not normal is continued without the driver recognizing the fact that the sensor is not normal.

In order to meet the sixth demand described above, according to an illustrative aspect of the presently disclosed subject matter, there is provided a sensor system adapted to be mounted on a vehicle, comprising:

a sensor unit configured to detect external information of the vehicle including distance information, and to output data corresponding to the external information; and a processing device configured to process the data to acquire the external information, wherein the processing device is configured to perform processing while excluding data corresponding to a space closer to the sensor unit than a predetermined distance.

As for the present illustrative aspect, "sensor unit" means a constituent unit of a component that can be distributed by itself as a single unit while providing a desired information sensing function.

As for the present illustrative aspect, "predetermined distance from the sensor unit" means a distance from any reference point in the sensor unit. However, the reference point is a fixed point determined in advance.

As for the present illustrative aspect, "light" means an electromagnetic wave having an arbitrary wavelength. For example, "light" is a concept including not only visible light but also ultraviolet light, infrared light, millimeter waves and microwaves.

According to such a configuration, the amount of information subjected to the processing for acquiring the external information of the vehicle is reduced, so that an increase in processing load can be suppressed. In addition, since a part of the information outputted from the sensor unit is uniformly excluded from the processing target based on predetermined distances, it is possible to omit the determination processing relating to the selection of information. This also makes it possible to suppress an increase in the processing load.

The above sensor system may be configured such that the predetermine distance varies in accordance with a detecting direction relative to the sensor unit.

According to such a configuration, it is possible to flexibly cope with more complicated information detection while suppressing an increase in the processing load.

The above sensor system may be configured such that the predetermined distance is a distance to an outer face of a cover defining a housing chamber for housing the sensor unit.

According to such a configuration, since it is not necessary to consider the presence of the cover when acquiring the external information of the vehicle, an increase in the processing load can be suppressed.

In this case, the above sensor system may be configured such that the processing device is configured to acquire a temporal change in a detection result by the sensor unit at the predetermined distance.

According to such a configuration, water droplets or dirt adhering to the outer face of the cover, scratches formed on the outer face of the cover, and the like can be detected.

In this case, the above sensor system may be configured so as to further comprise a camera unit configured to acquire an image of an area outside the vehicle. The processing device is configured to acquire the external information based on the image while referring to the temporal change.

In principle, the distance information is not included in the image information outputted from the camera unit. On the other hand, water droplets, dirt, scratches, and the like on the outer face of the cover may be captured in an image acquired by the camera unit. By referring to the presence of water droplets, dirt, scratches, or the like detected by the sensor unit, processing for detecting the water droplets, dirt, scratches, or the like from the image information can be made unnecessary, so that an increase in the processing load can be suppressed.

BRIEF DESCRIPTION OF THE DRAWINGS

FIG. 2 schematically illustrates a vehicle.

FIG. 16 illustrates an appearance of a portion of the left front sensor system of FIG. 14.

FIG. 17 illustrates an appearance of a portion of the left front sensor system of FIG. 14.

FIG. 18 illustrates a configuration of a portion of the left front sensor system of FIG. 14.

FIG. 32 illustrates detection ranges of respective sensor units in the left front sensor system of FIG. 31.

FIG. 34A is a diagram for explaining advantages of the arrangement of the sensor units in the left front sensor system of FIG. 31.

FIG. 34B is a diagram for explaining advantages of the arrangement of the sensor units in the left front sensor system of FIG. 31.

FIG. 34C is a diagram for explaining advantages of the arrangement of the sensor units in the left front sensor system of FIG. 31.

FIG. 35 is a front view illustrating an appearance of a portion of the left front sensor system of FIG. 31.

FIG. 36 schematically illustrates a modified example of the left front sensor system of FIG. 31.

DESCRIPTION OF EMBODIMENTS

Examples of embodiments will be described below in detail with reference to the accompanying drawings. In each of the drawings used in the following description, the scale is appropriately changed in order to make each of the members have a recognizable size.

In the accompanying drawings, an arrow F represents a forward direction of the illustrated structure. An arrow B represents a rearward direction of the illustrated structure. An arrow L represents a leftward direction of the illustrated structure. An arrow R represents a rightward direction of the illustrated structure. An arrow U represents an upward direction of the illustrated structure. An arrow D represents a downward direction of the illustrated structure. The terms of "left" and "right" used in the following descriptions represent the left-right directions as viewed from the driver's seat.

Figure 1:
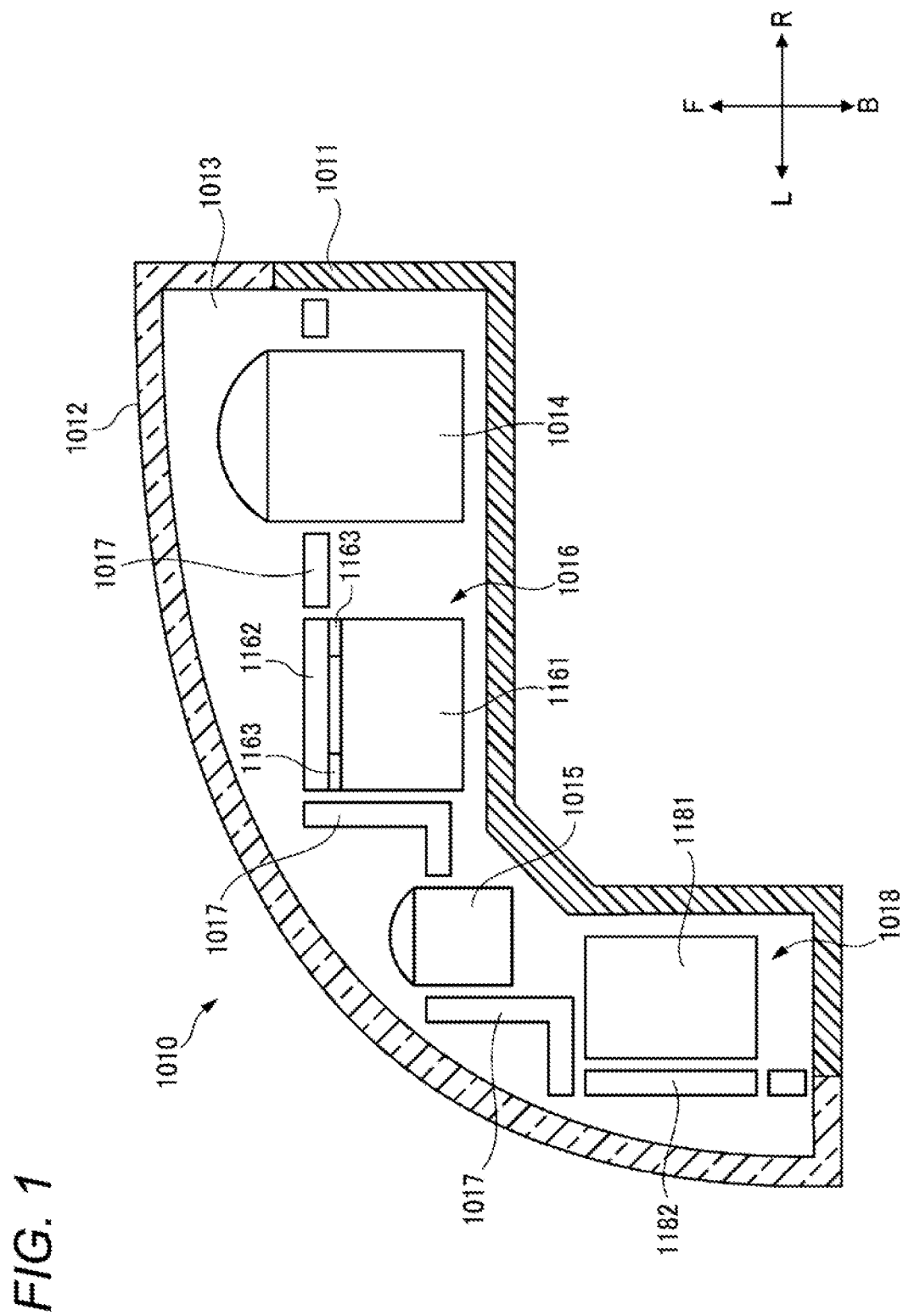
FIG. 1 schematically illustrates a configuration of a left front lamp device according to a first embodiment.

FIG. 1 schematically illustrates a configuration of a left front lamp device 1010 according to a first embodiment. The left front lamp device 1010 is mounted on the left front corner portion LF of the vehicle 100 illustrated in FIG. 2. A right front lamp device having a configuration symmetrical with the left front lamp device 1010 relative to the left-right direction is mounted on the right front corner portion RF of the vehicle 100.

The left front lamp device 1010 includes a housing 1011 and a translucent cover 1012. The translucent cover 1012 forms a portion of the outer face of the vehicle 100. The translucent cover 1012 defines a lamp chamber 1013 together with the housing 1011.

The left front lamp device 1010 includes a first lamp unit 1014. The first lamp unit 1014 is a lamp that emits light toward an area including ahead of the vehicle 100. The first lamp unit 1014 is a headlamp, for example.

The left front lamp device 1010 includes a second lamp unit 1015. The second lamp unit 1015 is a lamp that emits light toward an area including ahead of the vehicle 100. The second lamp unit 1015 is, for example, a direction indicator lamp.

The left front lamp device 1010 includes a first sensor unit 1016. The first sensor unit 1016 includes a LiDAR sensor 1161 and a half mirror 1162.

The LiDAR sensor 1161 has a configuration for emitting non-visible light and a configuration for detecting return light as a result of the non-visible light being reflected by an object existing at least ahead of the vehicle 100. The front of the vehicle 100 is an example of the outside of the vehicle. As required, the LiDAR sensor 1161 may include a scan device that sweeps the non-visible light to change the light emitting direction (i.e., the detecting direction). In the present embodiment, infrared light having a wavelength of 905 nm is used as the non-visible light.

The LiDAR sensor 1161 can acquire the distance to the object associated with the returned light, for example, based on the time period from the time when the non-visible light is emitted in a certain direction to the time when the returned light is detected. Further, by accumulating such distance information in association with the detecting position, it is possible to acquire information as to the shape of the object associated with the returned light. Additionally or alternatively, information as to an attribute such as the material of the object associated with the returned light can be acquired based on the difference in wavelength between the emitted light and the returned light.

In other words, the LiDAR sensor 1161 is a sensor for detecting at least information ahead of the vehicle 100. The LiDAR sensor 1161 outputs signals corresponding to the attributes of the detected return light, such as intensities and wavelengths. The above-mentioned information is acquired by appropriately processing signals outputted from the LiDAR sensor 1161 by an information processing unit (not illustrated). The information processing unit may be provided in the left front lamp device 1010 or may be installed in the vehicle 100.

The half mirror 1162 is one example of an optical member. The half mirror 1162 has a structure in which a reflective coating film is deposited on a transparent substrate. The reflective film is formed of a material that can transmit the non-visible light emitted from the LiDAR sensor 1161. Examples of such materials include tin (Sn), silver (Ag), calcium fluoride ($CaF_2$), titanium oxide ($TiO_2$), potassium bromide (KBr).

Figure 3:
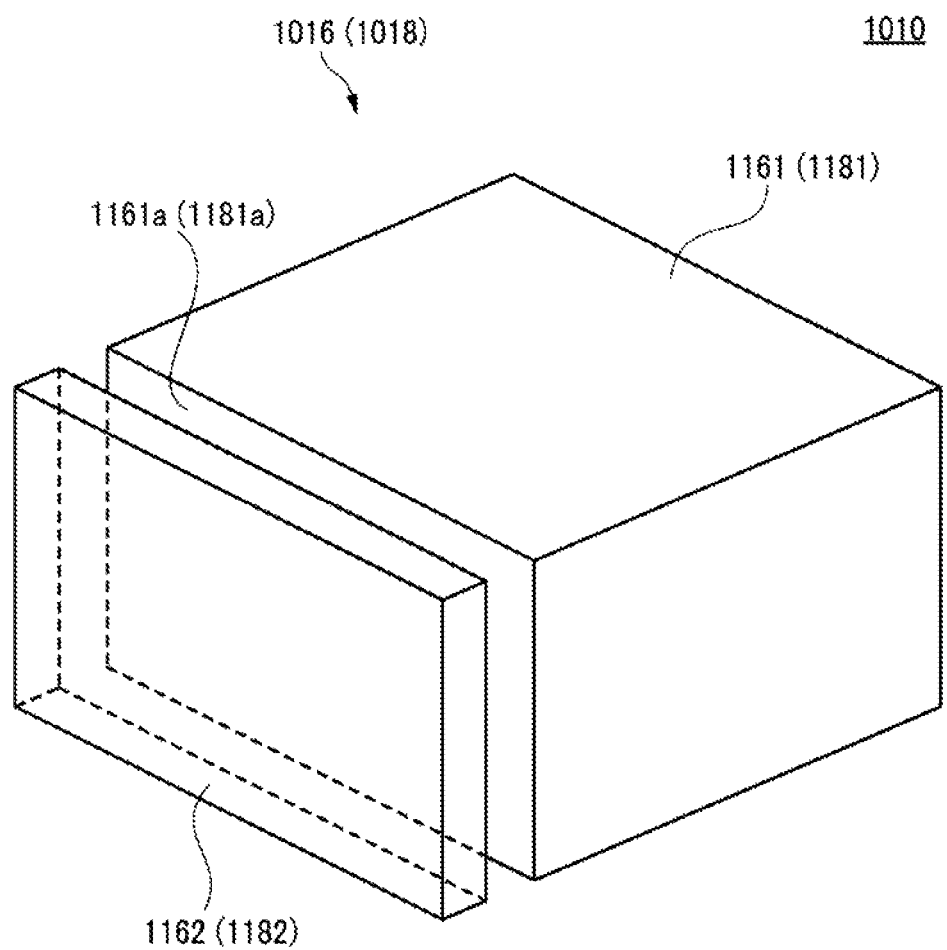
FIG. 3 schematically illustrates configurations of a first sensor unit and a second sensor unit in the left front lamp device of FIG. 1.

As illustrated in FIG. 1 and FIG. 3, the half mirror 1162 is disposed so as to cover a detection surface 1161a of the LiDAR sensor 1161 from the side where the translucent cover 1012 is disposed. Visible light passing through the translucent cover 1012 from the outside of the vehicle 100 and coming into the lamp chamber 1013 is reflected by the reflective coating of the half mirror 1162. Accordingly, the half mirror 1162 is viewed like a mirror from the outside, the visibility of the LiDAR sensor 1161 placed behind decreases.

As used herein, the term "detection surface of the LiDAR sensor" means a surface having a part of an outer face that exhibits the appearance of the LiDAR sensor, through which non-visible light related to detection of information passes.

In this case, the translucent cover 1012 may have a first transparency to visible light. On the other hand, the reflective film of the half mirror 1162 may have a second transparency to the visible light. The second transparency is lower than the first transparency. The reflective film of the half mirror 1162 is an example of a low transparency portion.

In order to efficiently acquire the external information of the vehicle 100, it is advantageous if the LiDAR sensor 1161 is disposed in the lamp chamber 1013 of the left front lamp device 1010. However, the LiDAR sensor 1161 is likely to have a relatively large dimension and to have a very different appearance from the lamp. Accordingly, it is difficult to secure a location where the LiDAR sensor 1161 can detect the information without interferences with the lamp, while avoiding a sense of discomfort in appearance.

However, according to the configuration of the present embodiment, since the visibility of the LiDAR sensor 1161 is reduced by the half mirror 1162, it is possible to alleviate at least the constraint relating to the sense of discomfort in appearance. Accordingly, it is possible to alleviate the layout-related constraint that would be imparted when the LiDAR sensor 1161 is disposed in the lamp chamber 1013.

In addition, the half mirror 1162 allows transmission of non-visible light used for detection although it covers the detection surface 1161a of the LiDAR sensor 1161. Accordingly, the half mirror 1162 does not prevent the LiDAR sensor 1161 from detecting information. This may also alleviate the layout-related constraint that would be imparted when attempting to dispose the LiDAR sensor 1161 in the lamp chamber 1013.

As illustrated in FIG. 1, the left front lamp unit 1010 includes an extension member 1017. The extension member 1017 is a decorative component that covers a part of the structure disposed in the lamp chamber 1013 so as to make the structure invisible from the outside of the vehicle 100. The surface of the extension member 1017 is generally mirror-finished. The appearance of the half mirror 1162 resembles a mirror-finished surface. Accordingly, it is possible to suppress the possibility that the presence of the half mirror 1162 causes a sense of discomfort on the appearance.

As illustrated in FIG. 1, the first sensor unit 1016 includes a light shielding member 1163. The light shielding member 1163 is provided so as to prevent light from entering a space between the LiDAR sensor 1161 and the half mirror 1162.

When the amount of light directed from the back of the half mirror 1162 to the outside of the vehicle 100 increases, the effect of suppressing the visibility of the LiDAR sensor 1161 by the half mirror 1162 decreases. The light shielding member 1163 is provided to prevent such a situation from occurring. The light shielding member 1163 is particularly effective when at least one of the first lamp unit 1014 and the second lamp unit 1015 is turned on.

The configuration of the first sensor unit 1016 with the half mirror 1162 is also applicable to other sensors that use infrared light for detecting information. Examples of such sensors include an infrared camera.

The left front lamp device 1010 includes a second sensor unit 1018. The second sensor unit 1018 includes a millimeter wave radar 1181 and a half mirror 1182.

The millimeter wave radar 1181 has a configuration for transmitting a millimeter wave and a configuration for receiving a reflection wave resulting from the millimeter wave being reflected by an object existing at least on the left of the vehicle 100. The left side of the vehicle 100 is an example of an outside of the vehicle. In the present embodiment, a millimeter wave having a frequency of 76 GHz is used. Examples of other frequencies include 24 GHz, 26 GHz, 79 GHz, and the like.

The millimeter wave radar 1181 can acquire the distance to the object associated with the reflection wave, for example, based on the time period from the time when the millimeter wave is transmitted in a certain direction to the time when the reflection wave is received. In addition, by accumulating such distance data in association with the detecting position, it is possible to acquire information as to the shape of the object associated with the reflection wave.

That is, the millimeter wave radar 1181 serves as a sensor that acquires information at least on the left of the vehicle 100. The millimeter wave radar 1181 outputs a signal corresponding to the detected reflection wave. The above-mentioned information is acquired by appropriately processing a signal outputted from the millimeter wave radar 1181 by an information processing unit (not illustrated). The information processing unit may be provided in the left front lamp device 1010 or may be installed in the vehicle 100.

The half mirror 1182 is an example of an optical member. The half mirror 1182 has a structure in which a reflective coating film is deposited on a transparent substrate. The reflective film is formed of a material capable of transmitting millimeter waves emitted from the millimeter wave radar 1181. Examples of such materials include indium (In) and nickel (Ni).

As illustrated in FIG. 1 and FIG. 3, the half mirror 1182 is disposed so as to cover the detection surface 1181a of the millimeter wave radar 1181 from the side where the translucent cover 1012 is disposed. Visible light passing through the translucent cover 1012 from the outside of the vehicle 100 and coming into the lamp chamber 1013 is reflected by the reflective coating of the half mirror 1182. Accordingly, the half mirror 1182 is viewed like a mirror from the outside, the visibility of the millimeter wave radar 1181 which is placed behind decreases.

As used herein, the term "detection surface of the millimeter wave radar" means a surface having a portion of an outer face that exhibits the appearance of the millimeter wave radar, through which a millimeter wave related to detection of information passes.

In this case, the translucent cover 1012 may have a first transparency to visible light. On the other hand, the reflective film of the half mirror 1182 may have a second transparency to the visible light. The second transparency is lower than the first transparency. The reflective film of the half mirror 1182 is an example of a low transparency portion.

In order to efficiently acquire the external information of the vehicle 100, it is advantageous if the millimeter wave radar 1181 is disposed in the lamp chamber 1013 of the left front lamp device 1010. However, the millimeter wave radar 1181 is likely to have a relatively large dimension and have a very different appearance from the lamp. Accordingly, it is difficult to secure a location where the millimeter wave radar 1181 can detect the information without interferences with the lamp, while avoiding a sense of discomfort in appearance.

However, according to the configuration of the present embodiment, since the visibility of the millimeter wave radar 1181 is reduced by the half mirror 1182, it is possible to alleviate at least the constraint relating to the sense of discomfort in appearance. Accordingly, it is possible to alleviate the layout-related constraint that would be imparted when attempting to dispose the millimeter wave radar 1181 in the lamp chamber 1013.

In addition, the half mirror 1182 allows transmission of millimeter waves used for detection although it covers the detection surface 1181a of the millimeter wave radar 1181. Accordingly, the half mirror 1182 does not prevent the millimeter wave radar 1181 from detecting information. This fact can also alleviate the layout-related constraint that would be imparted when attempting to dispose the millimeter wave radar 1181 in the lamp chamber 1013.

Also, the appearance of the half mirror 1182 is similar to the mirror-finished surface of the extension member 1017. Accordingly, it is possible to suppress the possibility that the presence of the half mirror 1182 causes a sense of discomfort on the appearance.

In addition to or instead of the first sensor unit 1016, a configuration similar to the second sensor unit 1018 may be provided for detecting information in an area including at least ahead of the vehicle 100. That is, in addition to or instead of the LiDAR sensor or the infrared camera, information of an area including at least ahead of the vehicle 100 can be acquired by the millimeter wave radar.

In addition to or instead of the second sensor unit 1018, a configuration similar to the first sensor unit 1016 may be provided to detect information in at least an area including on the left of the vehicle 100. That is, in addition to or instead of the millimeter wave radar, information in an area including at least ahead of the vehicle 100 can be acquired by at least one of a LiDAR sensor and an infrared camera.

The type and number of sensors for detecting information in an area including at least ahead of the vehicle 100 can be appropriately determined according to the specification of the left front lamp device 1010.

The type and number of sensors for detecting information in an area including at least on the left of the vehicle 100 can be appropriately determined according to the specification of the left front lamp device 1010.

The configuration of the left front lamp unit 1010 is also applicable to the left rear lamp device. The left rear lamp device is mounted on the left rear corner portion LB of the vehicle 100 illustrated in FIG. 2. The basic configuration of the left rear lamp unit may be symmetric to the left front lamp device 1010 relative to the front-rear direction. However, the specifications of the first lamp unit 1014 and the second lamp unit 1015 may be appropriately changed. The specifications of the LiDAR sensor 1161 and the millimeter wave radar 1181 can also be appropriately changed.

The configuration of the left front lamp device 1010 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Next, a left front lamp device 1020 according to a second embodiment will be described with reference to FIG. 4. The left front lamp device 1020 is mounted on the left front corner portion LF of the vehicle 100 illustrated in FIG. 2. A right front lamp device having a configuration symmetrical with the left front lamp device 1020 relative to the left-right direction is mounted on the right front corner portion RF of the vehicle 100. The left front lamp device 1020 includes a first sensor unit 1026 and a second sensor unit 1028. Any other configurations are the same as those of the left front lamp device 1010 according to the embodiment. Repetitive explanations for those will be omitted.

The first sensor unit 1026 includes a LiDAR sensor 1261. The configuration of the LiDAR sensor 1261 is identical with that of the LiDAR sensor 1161 according to the first embodiment.

The first sensor unit 1026 includes an EL panel 1262. EL is an abbreviated representation of electroluminescence. The EL panel 1262 is an optical member that self-emits light so as to include a predetermined wavelength based on a control signal input from a driving circuit (not illustrated). The EL panel 1262 has a transparent substrate. The substrate is selected so as to be transparent not only to visible light but also to non-visible light used by the LiDAR sensor 1261 for detecting information. The EL panel 1262 can be an organic EL panel or an inorganic EL panel. The light emitted from the EL panel 1262 passes through the translucent cover 1012 and is directed to the outside of the vehicle 100.

Figure 4:
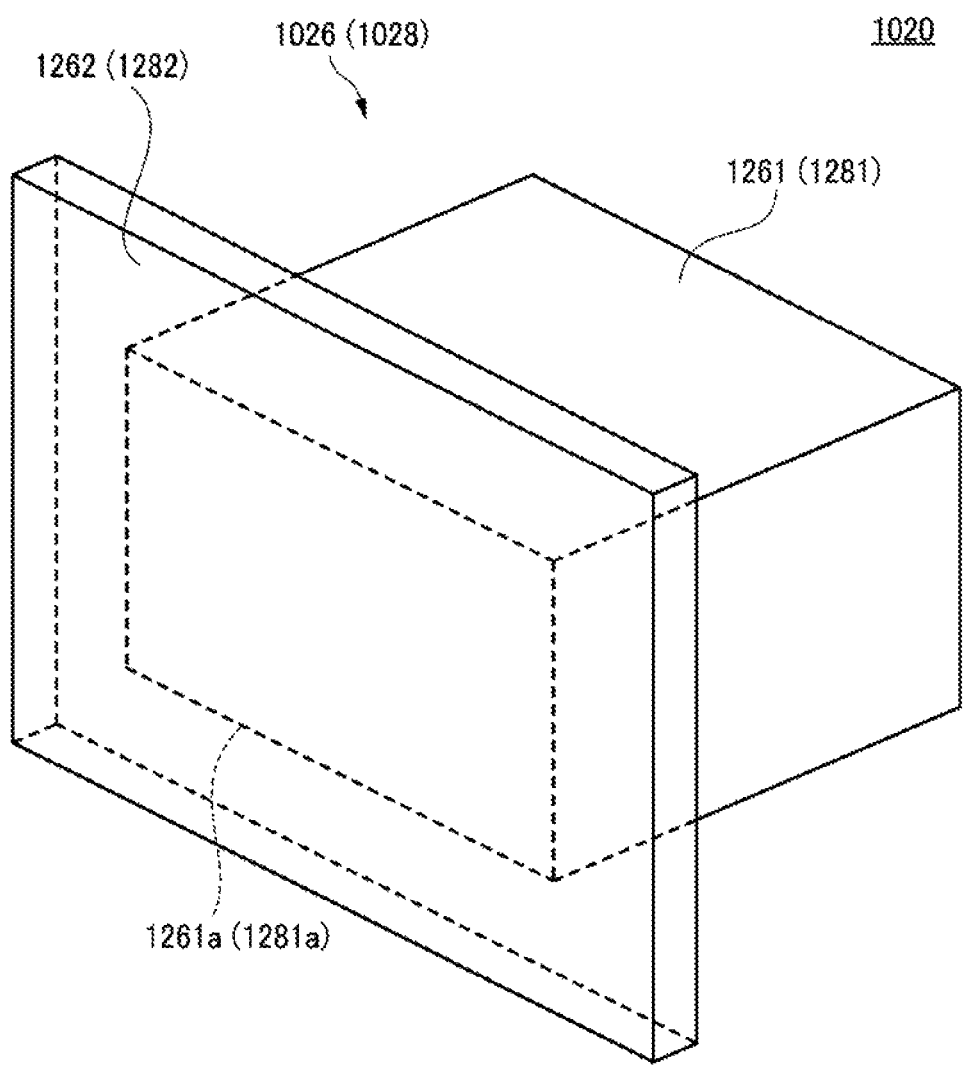
FIG. 4 schematically illustrates configurations of a first sensor unit and a second sensor unit in a left front lamp device according to a second embodiment.

As illustrated in FIG. 4, the EL panel 1262 is disposed so as to cover the detection surface 1261a of the LiDAR sensor 1261 from the side where the translucent cover 1012 (not illustrated) is disposed. When the EL panel 1262 self-emits light, a color corresponding to the wavelength of the light is visible from the outside of the vehicle 100. As a result, the visibility of the LiDAR sensor 1261 disposed therebehind is reduced.

As described above, the translucent cover 1012 has a first transparency to the visible light. The EL panel 1262 may have a second transparency to the visible light, at least temporarily. The second transparency is lower than the first transparency. In other words, the EL panel 1262 is configured to form a low transparency portion by light emission.

As described above, it is difficult to secure an installation location in the lamp chamber 1013 where the LiDAR sensor 1261 can detect information without interferences with the lamp while avoiding a sense of discomfort in appearance. However, according to the configuration of the present embodiment, since the visibility of the LiDAR sensor 1261 is reduced by the EL panel 1262, it is possible to alleviate at least the constraint on the sense of discomfort in appearance. Accordingly, it is possible to alleviate the layout-related constraint that would be imparted when attempting to dispose the LiDAR sensor 1261 in the lamp chamber 1013.

Furthermore, the EL panel 1262 allows the transparency of the invisible light used for detecting although it covers the detection surface 1261a of the LiDAR sensor 1261. Accordingly, the EL panel 1262 does not prevent the LiDAR sensor 1261 from detecting the information. This may also alleviate the layout-related constraint that would be imparted when attempting to dispose the LiDAR sensor 1261 in the lamp chamber 1013.

The color of the light emitted from the EL panel 1262 can be appropriately determined. Accordingly, it is possible to provide a lamp device which not only reduces the visibility of the LiDAR sensor 1261 but also exhibits a novel appearance during operation.

The configuration of the first sensor unit 1026 with the EL panel 1262 is also applicable to other sensors that use infrared light for detecting information. Examples of such sensors include an infrared camera.

The second sensor unit 1028 includes a millimeter wave radar 1281. The configuration of the millimeter wave radar 1281 is identical with that of the millimeter wave radar 1181 according to the first embodiment.

The second sensor unit 1028 includes an EL panel 1282. The EL panel 1282 is a transparent optical member that self-emits light so as to include a predetermined wavelength based on a control signal input from a driving circuit (not illustrated). The EL panel 1282 has a transparent substrate. The material of the substrate is selected so as to be transparent not only to visible light but also to millimeter waves used by the millimeter wave radar 1281 for detecting information. The EL panel 1282 may be an organic EL panel or may be an inorganic EL panel. The light emitted from the EL panel 1282 passes through the translucent cover 1012 and is directed toward the outside of the vehicle 100.

As illustrated in FIG. 4, the EL panel 1282 is disposed so as to cover the detection surface 1281a of the millimeter wave radar 1281 from the side where the translucent cover 1012 (not illustrated) is disposed. When the EL panel 1282 self-emits light, a color corresponding to the wavelength of the light is visible from the outside of the vehicle 100. As a result, the visibility of the millimeter wave radar 1281 disposed therebehind is reduced.

As described above, the translucent cover 1012 has a first transparency to the visible light. The EL panel 1282 may have a second transparency to the visible light, at least temporarily. The second transparency is lower than the first transparency. In other words, the EL panel 1282 is configured to form a low transparency portion by light emission.

As described above, it is difficult to secure an installation location in the lamp chamber 1013 where the millimeter wave radar 1281 can detect information without interferences with the lamp while avoiding a sense of discomfort in appearance. However, according to the configuration of the present embodiment, since the visibility of the millimeter wave radar 1281 is reduced by the EL panel 1282, it is possible to alleviate at least the constraint relating to the sense of discomfort in appearance. Accordingly, it is possible to alleviate the layout-related constraint that would be imparted when attempting to dispose the millimeter wave radar 1281 in the lamp chamber 1013.

Furthermore, the EL panel 1262 allows the transparency of the invisible light used for detecting although it covers the detection surface 1281a of the millimeter wave radar 1281. Accordingly, the EL panel 1282 does not prevent the millimeter wave radar 1281 from detecting information. This fact may also alleviate the layout-related constraint that would be imparted when attempting to dispose the millimeter wave radar 1281 in the lamp chamber 1013.

The color of the light emitted from the EL panel 1282 can be appropriately determined. Accordingly, it is possible to provide a lamp device which not only reduces the visibility of the millimeter wave radar 1281 but also exhibits a novel appearance during operation.

In addition to or instead of the first sensor unit 1026, a configuration similar to the second sensor unit 1028 may be provided to detect information in an area including at least ahead of the vehicle 100. That is, in addition to or instead of the LiDAR sensor or the infrared camera, information of an area including at least ahead of the vehicle 100 can be acquired by the millimeter wave radar.

In addition to or instead of the second sensor unit 1028, a configuration similar to the first sensor unit 1026 may be provided to detect information in at least an area including on the left of the vehicle 100. That is, in addition to or instead of the millimeter wave radar, information in an area including at least ahead of the vehicle 100 can be acquired by at least one of a LiDAR sensor and an infrared camera.

The type and number of sensors for detecting information in an area including at least ahead of the vehicle 100 can be appropriately determined according to the specification of the left front lamp device 1020.

The type and number of sensors for detecting information in an area including at least on the left of the vehicle 100 can be appropriately determined according to the specification of the left front lamp device 1020.

The configuration of the left front lamp device 1020 is also applicable to the left rear lamp device. The left rear lamp device is mounted on the left rear corner portion LB of the vehicle 100 illustrated in FIG. 2. The basic configuration of the left rear lamp device may be symmetric to the left front lamp device 1020 relative to the front-rear direction. However, the specifications of the LiDAR sensor 1261 and the millimeter wave radar 1281 may also be appropriately changed.

Particularly in the case of the left rear lamp device, at least one of the EL panel 1262 and the EL panel 1282 can be used as a lamp device such as a stop lamp, a brake lamp, or a direction indicator lamp, instead of at least one of the first lamp unit 1014 and the second lamp unit 1015.

In this case, since the LiDAR sensor, the infrared camera, or the millimeter wave radar can be disposed therebehind the lamp, the limited space in the lamp chamber can be efficiently utilized.

The configuration of the left front lamp device 1020 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Next, a left front lamp device 1030 according to the third embodiment will be described with reference to FIG. 5. The left front lamp device 1030 is mounted on the left front corner portion LF of the vehicle 100 illustrated in FIG. 2. A right front lamp device having a configuration symmetrical with the left front lamp device 1030 relative to the left-right direction is mounted on the right front corner portion RF of the vehicle 100. The left front lamp device 1030 includes a first sensor unit 1036 and a second sensor unit 1038. Any other configurations are the same as those of the left front lamp device 1010 according to the embodiment. Repetitive explanations for those will be omitted.

The first sensor unit 1036 includes a LiDAR sensor 1361. The configuration of the LiDAR sensor 1361 is identical with that of the LiDAR sensor 1161 according to the first embodiment.

The first sensor unit 1036 includes a light guide member 1362 and a light source 1363. The light guide member 1362 is a transparent optical member. The light emitted from the light source 1363 is incident on the light guide member 1362, and is subjected to at least one of internal reflection, scattering, and diffusion. As a result, the light emitted from the light guide member 1362 passes through the translucent cover 1012 and is directed to the outside of the vehicle 100.

The light source 1363 is a lamp light source or a light emitting element configured to emit light having a predetermined wavelength. Examples of the lamp light source include an incandescent lamp, a halogen lamp, a discharge lamp, a neon lamp. Examples of the light-emitting element include a light-emitting diode, a laser diode, and an EL element.

Figure 5:
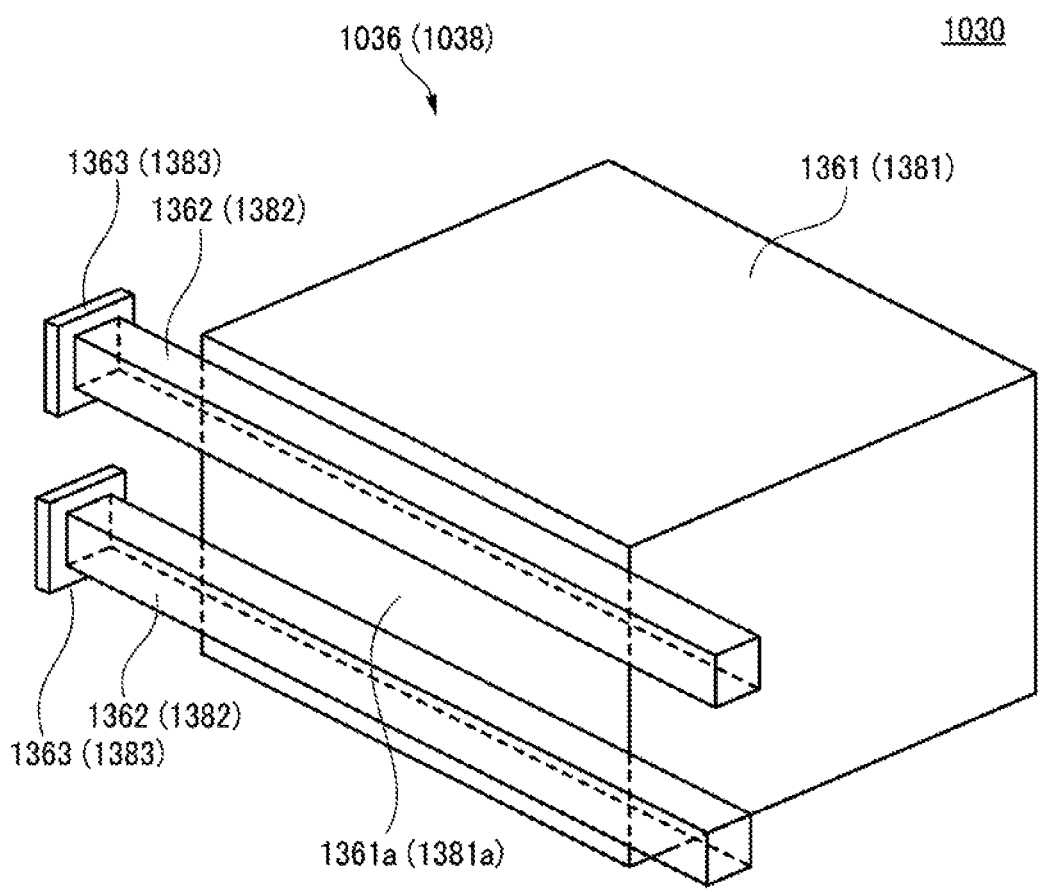
FIG. 5 schematically illustrates configurations of a first sensor unit and a second sensor unit in a left front lamp device according to a third embodiment.

As illustrated in FIG. 5, the light guide member 1362 is disposed so as to partially cover the detection surface 1361a of the LiDAR sensor 1361 from the side where the translucent cover 1012 (not illustrated) is disposed. When the light emitted from the light source 1363 enters the light guide member 1362, the light guide member 1362 appears to emit light in a color corresponding to the wavelength of the light from the outside of the vehicle 100. As a result, the visibility of the LiDAR sensor 1361 disposed therebehind is reduced.

As described above, the translucent cover 1012 has a first transparency to the visible light. The light guide member 1362 may have a second transparency to the visible light, at least temporarily. The second transparency is lower than the first transparency. In other words, the light guide member 1362 is configured to form a low transparency portion by light emission.

As described above, it is difficult to secure an installation location where the LiDAR sensor 1361 can detect information in the lamp chamber 1013 without interferences with the lamp while avoiding a sense of discomfort in appearance. However, according to the configuration of the present embodiment, since the visibility of the LiDAR sensor 1361 is reduced by the light guide member 1362, it is possible to alleviate at least the constraint on the sense of discomfort in appearance. Accordingly, it is possible to alleviate the layout-related constraint that would be imparted when attempting to dispose the LiDAR sensor 1361 in the lamp chamber 1013.

In addition, the color of the light emitted from the light guide member 1362 can be appropriately determined. Accordingly, it is possible to provide a lamp device which not only reduces the visibility of the LiDAR sensor 1361 but also exhibits a novel appearance during operation.

The material of the light guide member 1362 is preferably selected so as to be transparent not only to visible light but also to non-visible light used by the LiDAR sensor 1361 for detecting information. In this instance, the light guide member 1362 allows transmission of non-visible light used for detection although it covers a part of the detection surface 1361a of the LiDAR sensor 1361. Accordingly, the light guide member 1362 does not prevent the LiDAR sensor 1361 from detecting information. This may also alleviate the layout-related constraint that would be imparted when attempting to dispose the LiDAR sensor 1361 in the lamp chamber 1013.

In a case where the material of the light guide member 1362 has a low transparency with respect to the non-visible light used by the LiDAR sensor 1361 for information detection, it is preferable to dispose the light guide member 1362 so as to avoid a part of the detection surface 1361a of the LiDAR sensor 1361 through which the non-visible light passes. This eliminates the need for processing of removing the information related to the reflection by the reflected by the light guide member 1362 from the information detected by the LiDAR sensor 1361.

Figure 6:
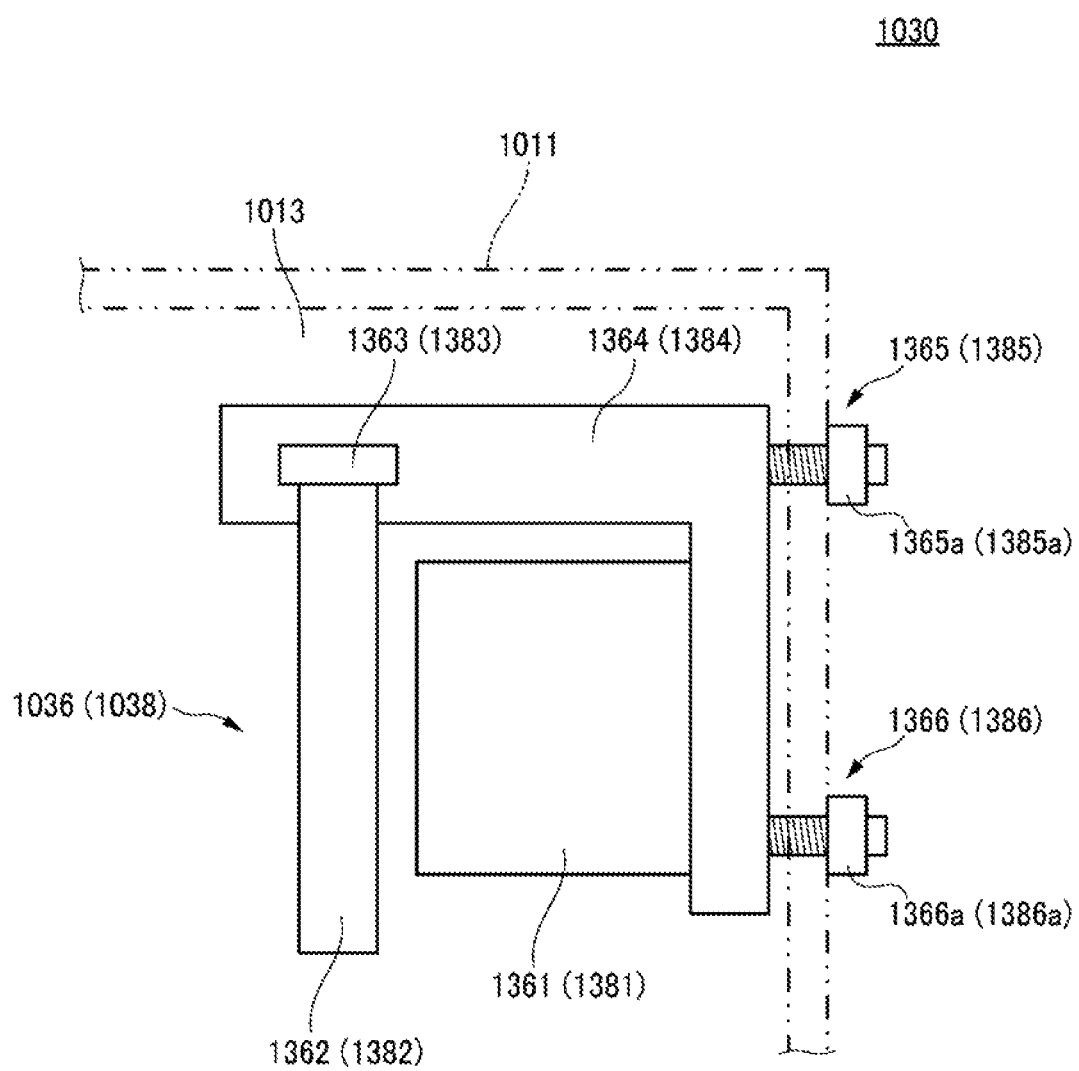
FIG. 6 schematically illustrates configurations of a support member and an adjustment mechanism in the left front lamp device according to the third embodiment.

As illustrated in FIG. 6, the first sensor unit 1036 includes a support member 1364. The support member 1364 is disposed in the lamp chamber 1013. The support member 1364 supports the LiDAR sensor 1361, the light guide member 1362, and the light source 1363. The relative positions of the LiDAR sensor 1361, the light guiding member 1362, and the light source 1363 are maintained by the supporting member 1364.

The first sensor unit 1036 includes a horizontal adjustment screw 1365. The horizontal adjustment screw 1365 is an example of an adjustment mechanism. Horizontal adjustment screw 1365 extends through the housing 1011. The horizontal adjustment screw 1365 is coupled to the support member 1364 via a joint (not illustrated). A head portion 1365a of the horizontal adjustment screw 1365 is disposed outside the housing 1011. When the head portion 1365a is rotationally operated by a predetermined tool, the joint converts the rotation of the horizontal adjusting screw 1365 into a movement for changing the attitude of the support member 1364 in the horizontal plane. It should be noted that the "horizontal plane" used herein does not have to coincide with a strict horizontal plane. Since the construction of the joint itself is well known, a detailed description thereof will be omitted.

The first sensor unit 1036 includes a vertical adjustment screw 1366. The vertical adjustment screw 1366 is one example of an adjustment mechanism. The vertical adjustment screw 1366 extends through the housing 1011. The vertical adjustment screw 1366 is coupled to the support member 1364 via a joint (not illustrated). A head portion 1366a of the vertical adjustment screw 1366 is disposed outside the housing 1011. When the head portion 1366a is rotationally operated by a predetermined tool, the joint converts the rotation of the vertical adjustment screw 1366 into a motion that changes the attitude of the support member 1364 in the vertical plane. It should be noted that the "vertical plane" used herein need not coincide with a strict vertical plane. Since the construction of the joint itself is well known, a detailed description thereof will be omitted.

The attitude of the support member 1364 is adjusted in order to adjust at least one of the detection reference position of the LiDAR sensor 1361 and the light emitting direction from the light guide member 1362. As described above, the relative positions of the LiDAR sensor 1361, the light guide member 1362, and the light source 1363 are maintained by the support member 1364. Accordingly, the above-described adjustment and the adjustment for maintaining the effect of reducing the visibility of the LiDAR sensor 1361 by the light guide member 1362 need not be individually performed.

The horizontal adjustment screw 1365 may be replaced with an actuator capable of adjusting at least one of a position and an attitude of the support member 1364 in the horizontal plane. The vertical adjustment screw 1366 may be replaced with an actuator capable of adjusting at least one of a position and an attitude of the support member 1364 in the vertical plane.

The configuration of the first sensor unit 1036 including the light guide member 1362 and the light source 1363 is also applicable to other sensors that use infrared light for detecting information. Examples of such sensors include an infrared camera.

As illustrated in FIG. 5, the second sensor unit 1038 includes a millimeter wave radar 1381. The configuration of the millimeter wave radar 1381 is identical with that of the millimeter wave radar 1181 according to the first embodiment.

The second sensor unit 1038 includes a light guide member 1382 and a light source 1383. The light guide member 1382 is a transparent optical member. The light emitted from the light source 1383 enters the light guide member 1382 and is subjected to at least one of internal reflection, scattering, and diffusion. As a result, the light emitted from the light guide member 1382 passes through the translucent cover 1012 and is directed to the outside of the vehicle 100.

The light source 1383 is a lamp light source or a light emitting element configured to emit light having a predetermined wavelength. Examples of the lamp light source include an incandescent lamp, a halogen lamp, a discharge lamp, and a neon lamp. Examples of the light-emitting element include a light-emitting diode, a laser diode, and an EL element.

The light guide member 1382 is disposed so as to partially cover the detection surface 1381a of the millimeter wave radar 1381 from the side where the translucent cover 1012 (not illustrated) is disposed. When the light emitted from the light source 1383 enters the light guide member 1382, the light guide member 1382 appears to emit light in a color corresponding to the wavelength of the light from the outside of the vehicle 100. As a result, the visibility of the millimeter wave radar 1381 disposed therebehind is reduced.

As described above, the translucent cover 1012 has a first transparency to the visible light. The light guide member 1382 may have a second transparency to the visible light at least temporarily. The second transparency is lower than the first transparency. In other words, the light guide member 1382 is configured to form a low transparency portion by light emission.

As described above, it is difficult to secure the installation location where the millimeter wave radar 1381 can detect information in the lamp chamber 1013 without interference with the lamp while avoiding the sense of discomfort in appearance. However, according to the configuration of the present embodiment, since the visibility of the millimeter wave radar 1381 is reduced by the light guide member 1382, it is possible to alleviate at least the constraint relating to the sense of discomfort in appearance. Accordingly, it is possible to alleviate the layout-related constraint that would be imparted when attempting to dispose the millimeter wave radar 1381 in the lamp chamber 1013.

The color of the light emitted from the light guide member 1382 can be appropriately determined. Accordingly, it is possible to provide a lamp device which not only reduces the visibility of the millimeter wave radar 1381 but also exhibits a novel appearance during operation.

Further, the light guide member 1382 allows transmission of millimeter waves used for detection although it covers a part of the detection surface 1381a of the millimeter wave radar 1381. Accordingly, the light guide member 1382 does not prevent the millimeter wave radar 1381 from detecting information. This fact can also alleviate the layout-related constraint that would be imparted when attempting to dispose the millimeter wave radar 1381 in the lamp chamber 1013.

As illustrated in FIG. 6, the second sensor unit 1038 includes a support member 1384. The support member 1384 is disposed in the lamp chamber 1013. The support member 1384 supports the millimeter wave radar 1381, the light guide member 1382, and the light source 1383. The relative positional relationship among the millimeter wave radar 1381, the light guide member 1382, and the light source 1383 is maintained by the support member 1384.

The second sensor unit 1038 includes a horizontal adjustment screw 1385. The horizontal adjustment screw 1385 is an example of an adjustment mechanism. Horizontal adjustment screw 1385 extends through housing 1011. The horizontal adjustment screw 1385 is coupled to the support member 1384 via a joint (not illustrated). A head portion 1385a of the horizontal adjustment screw 1385 is disposed outside the housing 1011. When the head portion 1385a is rotationally operated by a predetermined tool, the joint converts the rotation of the horizontal adjusting screw 1385 into a movement for changing the attitude of the support member 1384 in the horizontal plane. It should be noted that the "horizontal plane" used herein does not have to coincide with a strict horizontal plane. Since the construction of the joint itself is well known, a detailed description thereof will be omitted.

The second sensor unit 1038 includes a vertical adjustment screw 1386. The vertical adjustment screw 1386 is an example of an adjustment mechanism. The vertical adjustment screw 1386 extends through the housing 1011. The vertical adjustment screw 1386 is coupled to the support member 1384 via a joint (not illustrated). A head portion 1386a of the vertical adjustment screw 1386 is disposed outside the housing 1011. When the head portion 1386a is rotationally operated by a predetermined tool, the joint converts the rotation of the vertical adjustment screw 1386 into a motion that changes the attitude of the support member 1384 in the vertical plane. It should be noted that the "vertical plane" used herein need not coincide with a strict vertical plane. Since the construction of the joint itself is well known, a detailed description thereof will be omitted.

The attitude of the support member 1384 is adjusted to adjust at least one of the detection reference position of the millimeter wave radar 1381 and the light emitting direction from the light guide member 1382. As described above, the relative positions of the millimeter wave radar 1381, the light guide member 1382, and the light source 1383 are maintained by the support member 1384. Accordingly, it is unnecessary to perform the above-described adjustment and the adjustment for maintaining the effect of reducing the visibility of the millimeter wave radar 1381 by the light guide member 1382 individually.

The horizontal adjustment screw 1385 may be replaced with an actuator capable of adjusting at least one of a position and an attitude of the support member 1384 in the horizontal plane. The vertical adjustment screw 1386 may be replaced with an actuator capable of adjusting at least one of a position and an attitude of the support member 1384 in the vertical plane.

In addition to or instead of the first sensor unit 1036, a configuration similar to the second sensor unit 1038 may be provided to detect information in an area including at least ahead of the vehicle 100. That is, in addition to or instead of the LiDAR sensor or the infrared camera, information of an area including at least ahead of the vehicle 100 can be acquired by the millimeter wave radar.

In addition to or instead of the second sensor unit 1038, a configuration similar to the first sensor unit 1036 may be provided to detect information in at least an area including on the left of the vehicle 100. That is, in addition to or instead of the millimeter wave radar, information in an area including at least ahead of the vehicle 100 can be acquired by at least one of a LiDAR sensor and an infrared camera.

The type and number of sensors for detecting information in an area including at least ahead of the vehicle 100 can be appropriately determined according to the specification of the left front lamp device 1030.

The type and number of sensors for detecting information in an area including at least on the left of the vehicle 100 can be appropriately determined according to the specification of the left front lamp device 1030.

The configuration of the left front lamp device 1030 is also applicable to the left rear lamp device. The left rear lamp device is mounted on the left rear corner portion LB of the vehicle 100 illustrated in FIG. 2. The basic configuration of the left rear lamp unit may be symmetric to the left front lamp device 1010 relative to the front-rear direction. However, the specifications of the first lamp unit 1014 and the second lamp unit 1015 may be appropriately changed. The specifications of the LiDAR sensor 1361 and the millimeter wave radar 1381 may also be appropriately changed.

The configuration of the left front lamp device 1030 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Next, a left front lamp device 1040 according to a fourth embodiment will be described with reference to FIG. 7. The left front lamp device 1040 is mounted on the left front corner portion LF of the vehicle 100 illustrated in FIG. 2. A right front lamp device having a configuration symmetrical with the left front lamp device 1040 relative to the left-right direction is mounted on the right front corner portion RF of the vehicle 100. The left front lamp device 1040 includes a first sensor unit 1046 and a second sensor unit 1048. Any other configurations are the same as those of the left front lamp device 1010 according to the embodiment. Repetitive explanations for those will be omitted.

The first sensor unit 1046 includes a LiDAR sensor 1461. The configuration of the LiDAR sensor 1461 is identical with that of the LiDAR sensor 1161 according to the first embodiment.

Figure 8:
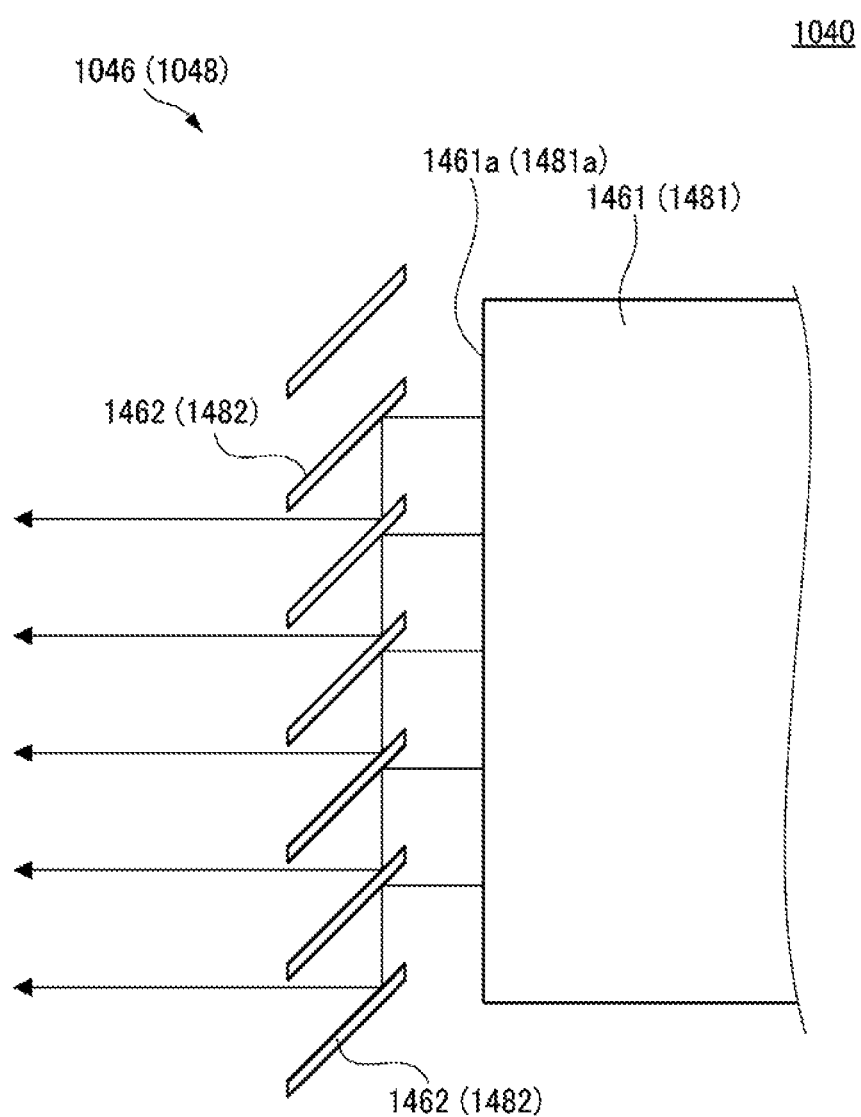
FIG. 8 schematically illustrates configurations of the first sensor unit and the second sensor unit in the left front lamp device according to the fourth embodiment.

The first sensor unit 1046 includes a plurality of louvers 1462. As illustrated in FIG. 8, each louver 1462 is an optical member having a surface that can reflect non-visible light emitted from the LiDAR sensor 1461. The non-visible light reflected by each louver 1462 passes through the translucent cover 1012 and is directed to the outside of the vehicle 100. Return light from an object located outside the vehicle 100 is reflected by the louvers 1462 and incident on the detection surface 1461a of the LiDAR sensor 1461.

Figure 7:
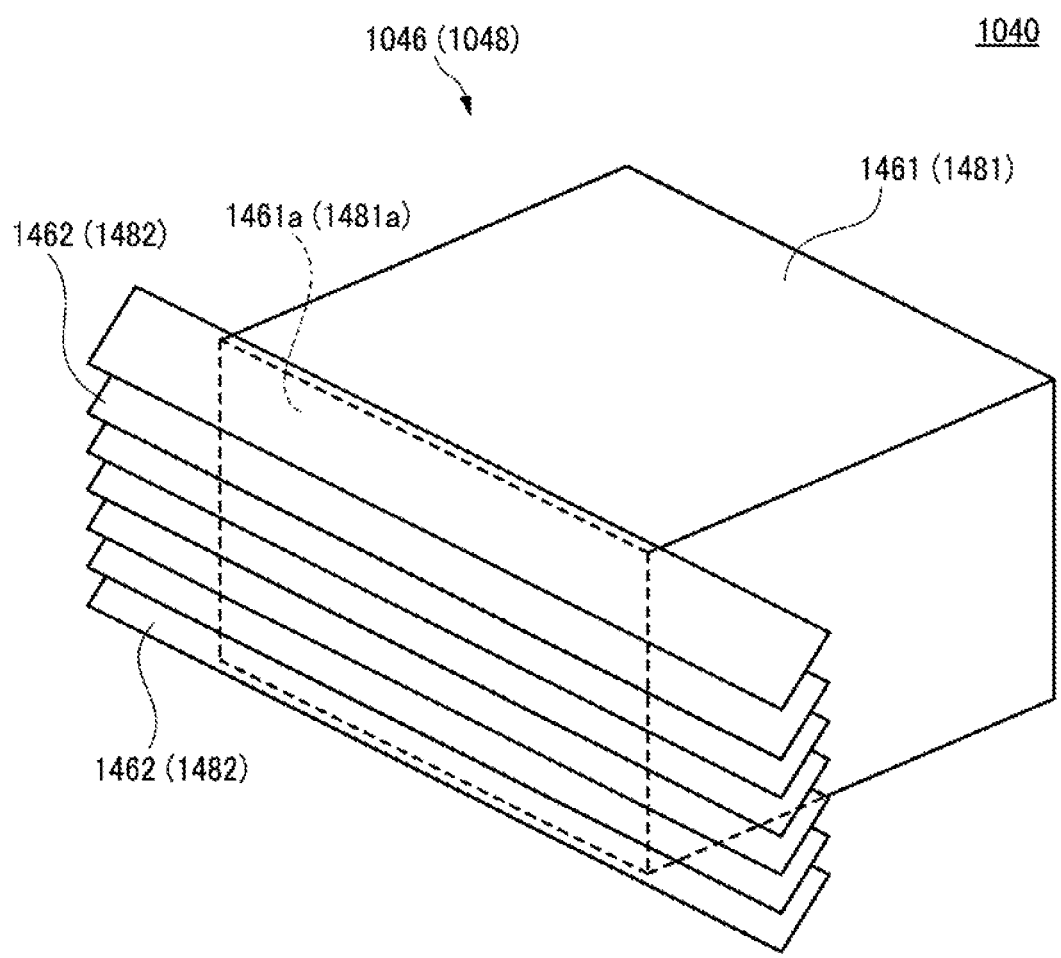
FIG. 7 schematically illustrates configurations of a first sensor unit and a second sensor unit in a left front lamp device according to a fourth embodiment.

As illustrated in FIG. 7, the louvers 1462 are disposed so as to cover the detection surface 1461a of the LiDAR sensor 1461 from the side where the translucent cover 1012 (not illustrated) is disposed. Each louver 1462 has an opaque appearance when viewed from the outside of the vehicle 100. Accordingly, the visibility of the LiDAR sensor 1461 disposed therebehind is reduced.

As described above, the translucent cover 1012 has a first transparency to the visible light. Each louver 1462 may have a second transparency to the visible light. The second transparency is lower than the first transparency. Each louver 1462 is an example of a low transparency portion. The LiDAR sensor 1461 detects external information of the vehicle 100 by using reflection from the low transparency portion.

As described above, it is difficult to secure an installation location where the LiDAR sensor 1461 can detect information in the lamp chamber 1013 without interference with the lamp while avoiding a sense of discomfort in appearance. However, according to the configuration of the present embodiment, since the visibility of the LiDAR sensor 1461 is reduced by the louvers 1462, it is possible to alleviate at least the constraint relating to the sense of discomfort in appearance. Accordingly, it is possible to reduce the layout-related constraint that would be imparted when attempting to dispose the LiDAR sensor 1461 in the lamp chamber 1013.

Further, the louvers 1462 allow passage by reflection of the invisible light used for detecting although they cover the detection surface 1461a of the LiDAR sensor 1461. Accordingly, the louvers 1462 do not prevent the LiDAR sensor 1461 from detecting information. This may also alleviate the layout-related constraint that would be imparted when attempting to dispose the LiDAR sensor 1461 in the lamp chamber 1013.

Figure 9:
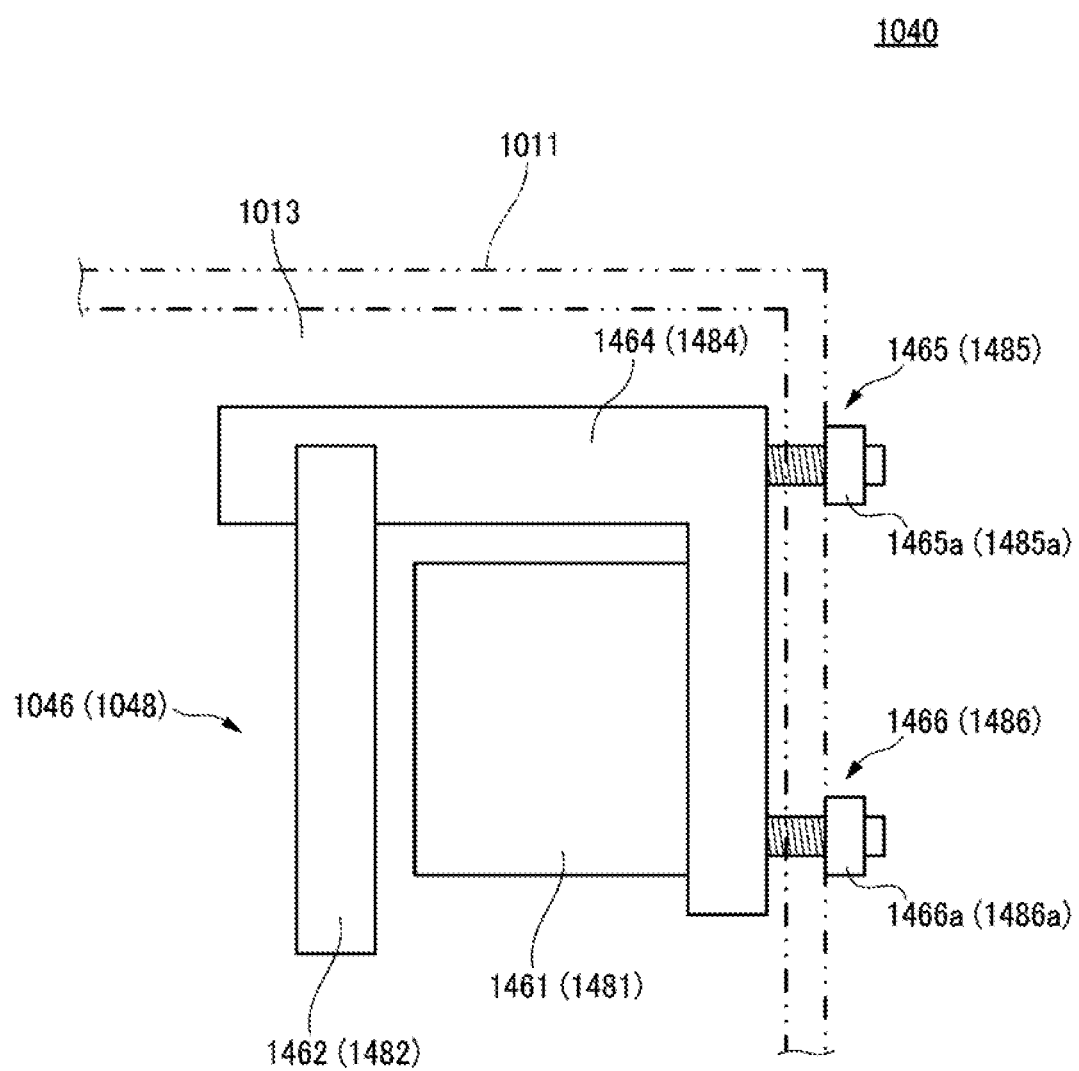
FIG. 9 schematically illustrates configurations of a support member and an adjustment mechanism in the left front lamp device according to the fourth embodiment.

As illustrated in FIG. 9, the first sensor unit 1046 includes a support member 1464. The support member 1464 is disposed in the lamp chamber 1013. The support member 1464 supports the LiDAR sensor 1461 and the louvers 1462. The relative positions of the LiDAR sensor 1461 and the louvers 1462 are maintained by the support member 1464.

The first sensor unit 1046 includes a horizontal adjustment screw 1465. The horizontal adjustment screw 1465 is an example of an adjustment mechanism. The horizontal adjustment screw 1465 extends through the housing 1011. The horizontal adjustment screw 1465 is coupled to the support member 1464 via a joint (not illustrated). A head portion 1465a of the horizontal adjustment screw 1465 is disposed outside the housing 1011. When the head portion 1465a is rotationally operated by a predetermined tool, the joint converts the rotation of the horizontal adjustment screw 1465 into a motion that changes the attitude of the support member 1464 in the horizontal plane. It should be noted that the "horizontal plane" used herein does not have to coincide with a strict horizontal plane. Since the construction of the joint itself is well known, a detailed description thereof will be omitted.

The first sensor unit 1046 includes a vertical adjustment screw 1466. The vertical adjustment screw 1466 is an example of an adjustment mechanism. The vertical adjustment screw 1466 extends through the housing 1011. The vertical adjustment screw 1466 is coupled to the support member 1464 via a joint (not illustrated). A head portion 1466a of the vertical adjustment screw 1466 is disposed outside the housing 1011. When the head portion 1466a is rotationally operated by a predetermined tool, the joint converts the rotation of the vertical adjustment screw 1466 into a motion that changes the attitude of the support member 1464 in the vertical plane. It should be noted that the "vertical plane" used herein need not coincide with a strict vertical plane. Since the construction of the joint itself is well known, a detailed description thereof will be omitted.

The attitude of the support member 1464 is adjusted in order to adjust at least one of the detection reference position of the LiDAR sensor 1461 and the light reflecting direction from each louver 1462. As described above, the relative positions of the LiDAR sensor 1461 and the louvers 1462 are maintained by the support member 1464. Accordingly, the above-mentioned adjustment and the adjustment for maintaining the effect of reducing the visibility of the LiDAR sensor 1461 by the louvers 1462 need not be individually performed.

The horizontal adjustment screw 1465 may be replaced with an actuator capable of adjusting at least one of a position and an attitude of the support member 1464 in the horizontal plane. The vertical adjustment screw 1466 may be replaced with an actuator capable of adjusting at least one of a position and an attitude of the support member 1464 in the vertical plane.

The configuration of the first sensor unit 1046 with the louvers 1462 is also applicable to other sensors that use infrared light for detecting information. Examples of such sensors include an infrared camera.

The second sensor unit 1048 includes a millimeter wave radar 1481. The configuration of the millimeter wave radar 1481 is identical with that of the millimeter wave radar 1181 according to the first embodiment.

The second sensor unit 1048 includes a plurality of louvers 1482. As illustrated in FIG. 8, each louver 1482 is an optical member having a surface capable of reflecting the millimeter wave emitted from the millimeter wave radar 1481. The millimeter wave reflected by each louver 1482 passes through the translucent cover 1012 and is directed to the outside of the vehicle 100. The reflection wave from an object located outside the vehicle 100 is reflected by each louver 1482 and incident on the detection surface 1481a of the millimeter wave radar 1481.

As illustrated in FIG. 7, the louvers 1482 are disposed so as to cover the detection surface 1481a of the millimeter wave radar 1481 from the side where the translucent cover 1012 (not illustrated) is disposed. Each louver 1482 has an opaque appearance when viewed from the outside of the vehicle 100. Accordingly, the visibility of the millimeter wave radar 1481 disposed therebehind is reduced.

As described above, the translucent cover 1012 has a first transparency to the visible light. Each louver 1482 may have a second transparency to the visible light. The second transparency is lower than the first transparency. Each louver 1482 is an example of a low transparency portion. The millimeter wave radar 1481 detects external information of the vehicle 100 by using reflection by the low transparency portion.

As described above, it is difficult to secure the installation location where the millimeter wave radar 1481 can detect information in the lamp chamber 1013 without interference with the lamp while avoiding the sense of discomfort in appearance. However, according to the configuration of the present embodiment, since the visibility of the millimeter wave radar 1481 is reduced by the louvers 1482, it is possible to alleviate at least the constraint relating to the sense of discomfort in appearance. Accordingly, it is possible to alleviate the layout-related constraint that would be imparted when attempting to dispose the millimeter wave radar 1481 in the lamp chamber 1013.

Further, the louvers 1482 allow passage by reflection of the millimeter wave used for detection although they cover the detection surface 1481*a* of the millimeter wave radar 1481. Accordingly, the louvers 1482 do not prevent the millimeter wave radar 1481 from detecting information. This fact can also alleviate the layout-related constraint that would be imparted when attempting to dispose the millimeter wave radar 1481 in the lamp chamber 1013.

As illustrated in FIG. 9, the second sensor unit 1048 includes a support member 1484. The support member 1484 is disposed in the lamp chamber 1013. The support member 1484 supports the millimeter wave radar 1481 and the louvers 1482. The relative positional relationship between the millimeter wave radar 1481 and each louver 1482 is maintained by the support member 1484.

The second sensor unit 1048 includes a horizontal adjustment screw 1485. The horizontal adjustment screw 1485 is an example of an adjustment mechanism. Horizontal adjustment screw 1485 extends through housing 1011. The horizontal adjustment screw 1485 is coupled to the support member 1484 via a joint (not illustrated). A head portion 1485*a* of the horizontal adjustment screw 1485 is disposed outside the housing 1011. When the head portion 1485*a* is rotationally operated by a predetermined tool, the joint converts the rotation of the horizontal adjusting screw 1485 into a motion for changing the attitude of the support member 1484 in the horizontal plane. It should be noted that the "horizontal plane" used herein does not have to coincide with a strict horizontal plane. Since the construction of the joint itself is well known, a detailed description thereof will be omitted.

The second sensor unit 1048 includes a vertical adjustment screw 1486. The vertical adjustment screw 1486 is an example of an adjustment mechanism. The vertical adjustment screw 1486 extends through the housing 1011. The vertical adjustment screw 1486 is coupled to the support member 1484 via a joint (not illustrated). A head portion 1486*a* of the vertical adjustment screw 1486 is disposed outside the housing 1011. When the head portion 1486*a* is rotationally operated by a predetermined tool, the joint converts the rotation of the vertical adjustment screw 1486 into a motion that changes the attitude of the support member 1484 in the vertical plane. It should be noted that the "vertical plane" used herein need not coincide with a strict vertical plane. Since the construction of the joint itself is well known, a detailed description thereof will be omitted.

The attitude of the support member 1484 is adjusted to adjust at least one of the detection reference position of the millimeter wave radar 1481 and the light reflecting direction from each louver 1482. As described above, the relative positional relationship between the millimeter wave radar 1481 and each louver 1482 is maintained by the supporting member 1484. Accordingly, it is not necessary to individually perform the above-described adjustment and the adjustment for maintaining the effect of reducing the visibility of the millimeter wave radar 1481 by the louvers 1482.

The horizontal adjustment screw 1485 may be replaced with an actuator capable of adjusting at least one of a position and an attitude of the support member 1484 in the horizontal plane. The vertical adjustment screw 1486 may be replaced with an actuator capable of adjusting at least one of a position and an attitude of the support member 1484 in the vertical plane.

In addition to or instead of the first sensor unit 1046, a configuration similar to the second sensor unit 1048 may be provided for detecting information in an area including at least ahead of the vehicle 100. That is, in addition to or instead of the LiDAR sensor or the infrared camera, information of an area including at least ahead of the vehicle 100 can be acquired by the millimeter wave radar.

In addition to or instead of the second sensor unit 1048, a configuration similar to the first sensor unit 1046 may be provided to detect information in at least an area including on the left of the vehicle 100. That is, in addition to or instead of the millimeter wave radar, information in an area including at least ahead of the vehicle 100 can be acquired by at least one of a LiDAR sensor and an infrared camera.

The type and number of sensors for detecting information in an area including at least ahead of the vehicle 100 can be appropriately determined according to the specification of the left front lamp device 1040.

The type and number of sensors for detecting information in an area including at least on the left of the vehicle 100 can be appropriately determined according to the specification of the left front lamp device 1040.

The configuration of the left front lamp device 1040 is also applicable to the left rear lamp device. The left rear lamp device is mounted on the left rear corner portion LB of the vehicle 100 illustrated in FIG. 2. The basic configuration of the left rear lamp unit may be symmetric to the left front lamp device 1010 relative to the front-rear direction. However, the specifications of the first lamp unit 1014 and the second lamp unit 1015 may be appropriately changed. The specifications of the LiDAR sensor 1461 and the millimeter wave radar 1481 may also be appropriately changed.

The configuration of the left front lamp unit 1040 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Next, with reference to FIG. 10, a left front lamp device 1050 according to a fifth embodiment will be described. The left front lamp device 1050 is mounted on the left front corner portion LF of the vehicle 100 illustrated in FIG. 2. A right front lamp device having a configuration symmetrical with the left front lamp device 1050 relative to the left-right direction is mounted on the right front corner portion RF of the vehicle 100. The left front lamp device 1050 includes a sensor unit 1056. Any other configurations are the same as those of the left front lamp device 1010 according to the embodiment. Repetitive explanations for those will be omitted.

The sensor unit 1056 includes a LiDAR sensor 1561. The configuration of the LiDAR sensor 1561 is identical with that of the LiDAR sensor 1161 according to the first embodiment. In other words, the LiDAR sensor 1561 detects information of an area including at least the front of the vehicle 100.

Figure 11:
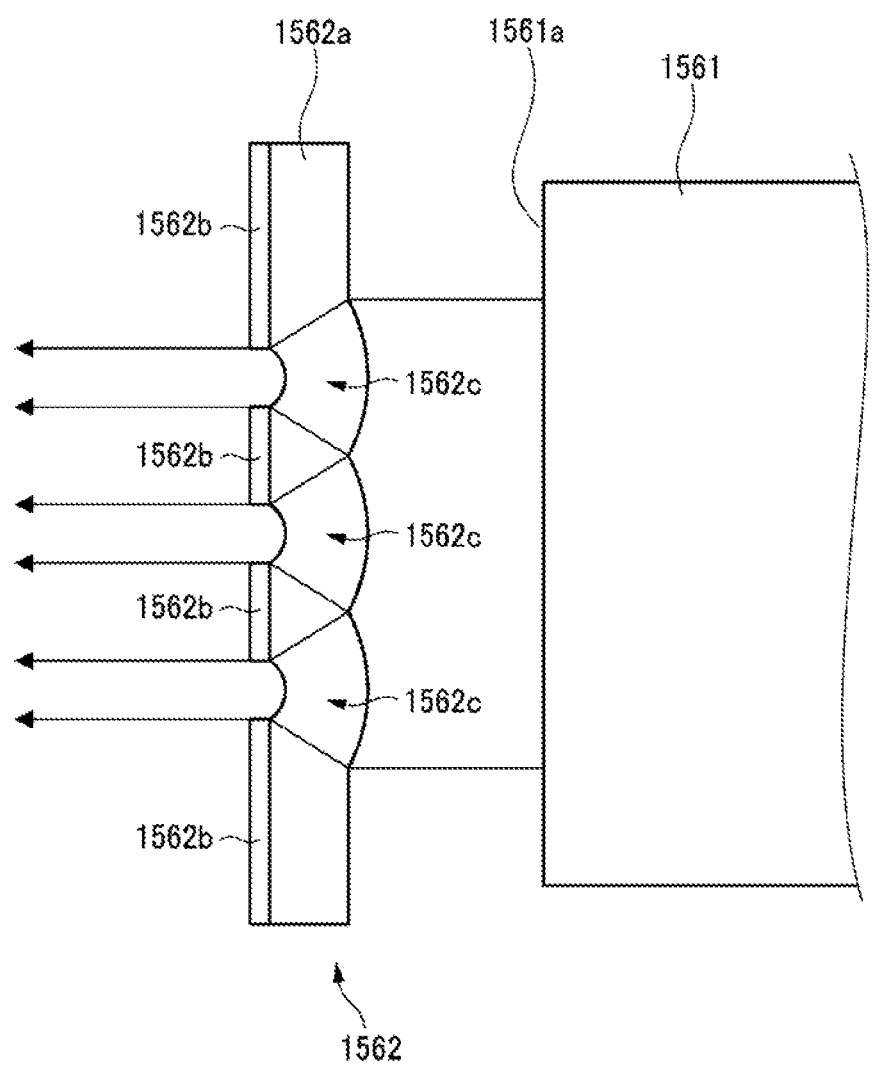
FIG. 11 schematically illustrates a configuration of the sensor unit in the left front lamp device according to the fifth embodiment.

The sensor unit 1056 includes an optical member 1562. The optical member 1562 has a configuration in which a metal film 1562*b* is formed on a surface of a substrate 1562*a*. The substrate 1562*a* is made of a material having transparency to non-visible light used by the LiDAR sensor 1561 to detect the information. The metal film 1562*b* is formed by a method such as vapor deposition, adhesion, hot stamping, or the like. As illustrated in FIG. 11, the substrate 1562a has a light collecting portion 1562c. The light collecting portion 1562c has a configuration capable of collecting the non-visible light emitted from the LiDAR sensor 1561. The non-visible light collected by the light collecting portion 1562c is emitted from a gap formed between the metal films 1562b. The non-visible light emitted from the optical member 1562 passes through the translucent cover 1012 and is directed toward the outside of the vehicle 100.

Figure 10:
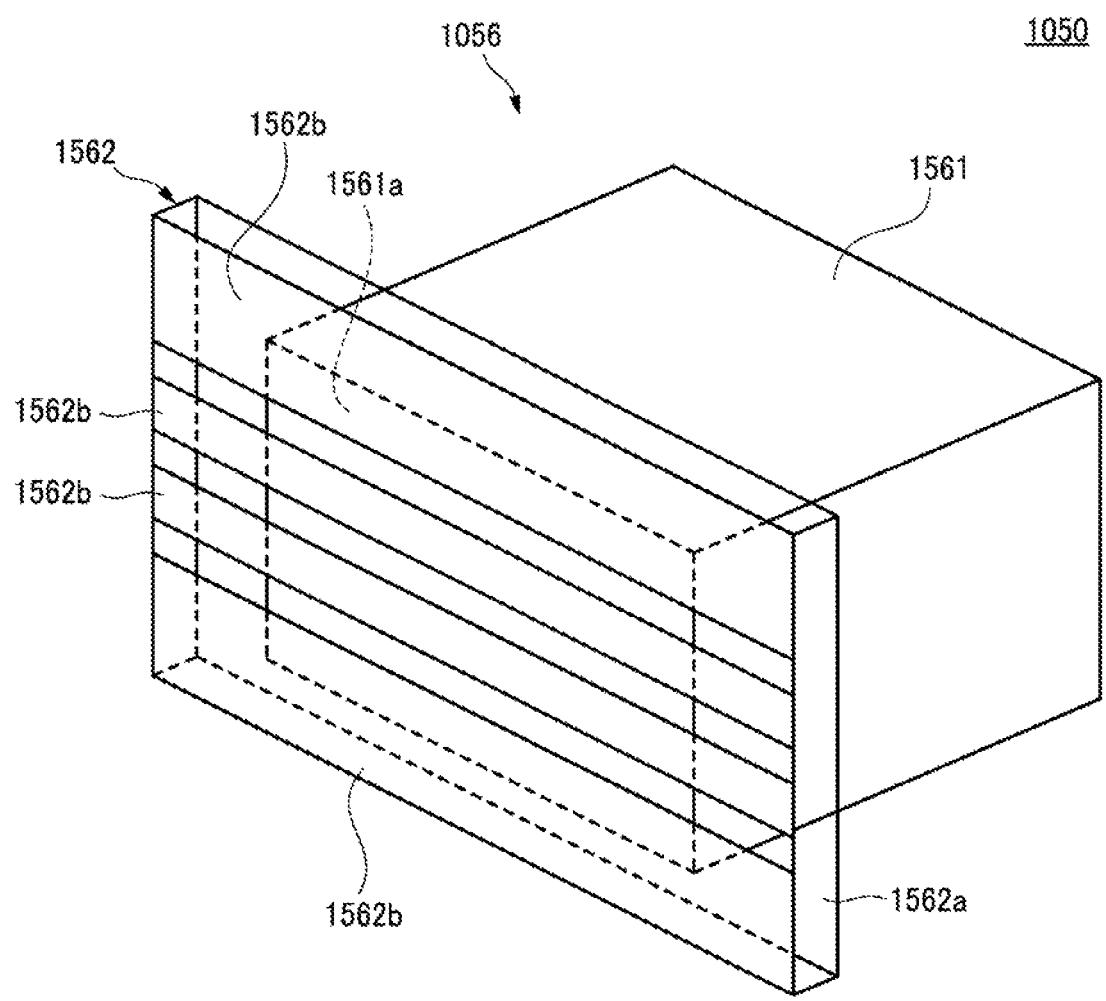
FIG. 10 schematically illustrates a configuration of a sensor unit in a left front lamp device according to a fifth embodiment.

As illustrated in FIG. 10, the metallic film 1562b is disposed so as to partially cover the detection surface 1561a of the LiDAR sensor 1561 from the side where the translucent cover 1012 (not illustrated) is disposed. The metal film 1562b has an opaque appearance when viewed from the outside of the vehicle 100. Accordingly, the visibility of the LiDAR sensor 1561 disposed therebehind is reduced. The metal film 1562b is an example of a low transparency portion.

As described above, it is difficult to secure an installation location where the LiDAR sensor 1561 can detect information in the lamp chamber 1013 without interference with the lamp while avoiding a sense of discomfort in appearance. However, according to the configuration of the present embodiment, since the visibility of the LiDAR sensor 1561 is reduced by the metallic film 1562b, it is possible to alleviate at least the constraint on the sense of discomfort in appearance. Accordingly, it is possible to reduce the layout-related constraint that would be imparted when attempting to dispose the LiDAR sensor 1561 in the lamp chamber 1013.

In addition, the light collecting portion 1562c allows passage of non-visible light used for detection although the metallic film 1562b covers a part of the detection surface 1561a of the LiDAR sensor 156. Accordingly, the optical member 1562 does not prevent the LiDAR sensor 1561 from detecting information. This may also alleviate the layout-related constraint that would be imparted when attempting to dispose the LiDAR sensor 1561 in the lamp chamber 1013.

Figure 12:
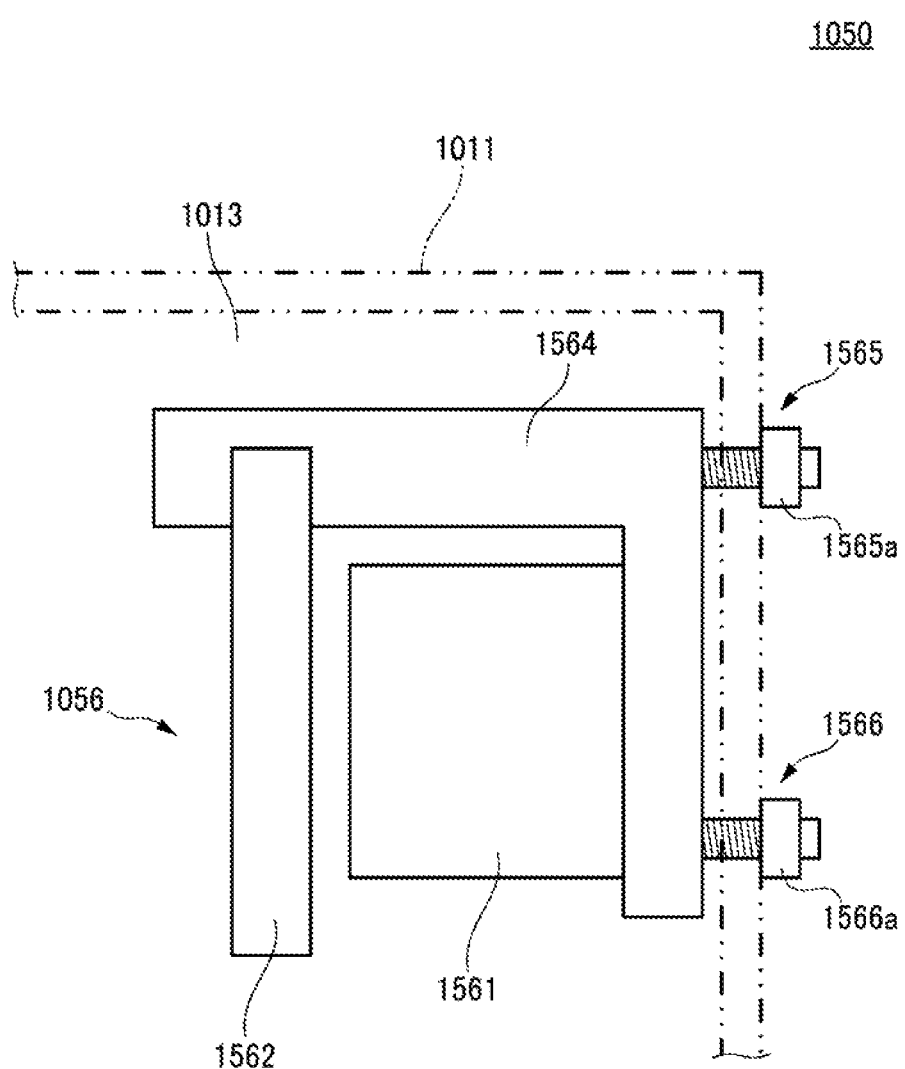
FIG. 12 schematically illustrates configurations of a support member and an adjustment mechanism in the left front lamp device according to the fifth embodiment.

As illustrated in FIG. 12, the sensor unit 1056 includes a support member 1564. The support member 1564 is disposed in the lamp chamber 1013. The support member 1564 supports the LiDAR sensor 1561 and the optical member 1562. The relative positions of the LiDAR sensor 1561 and the optical member 1562 are maintained by the support member 1564.

The sensor unit 1056 includes a horizontal adjustment screw 1565. The horizontal adjustment screw 1565 is an example of an adjustment mechanism. Horizontal adjustment screw 1565 extends through housing 1011. The horizontal adjustment screw 1565 is coupled to the support member 1564 via a joint (not illustrated). A head portion 1565a of the horizontal adjustment screw 1565 is disposed outside the housing 1011. When the head portion 1565a is rotationally operated by a predetermined tool, the joint converts the rotation of the horizontal adjusting screw 1565 into a motion for changing the attitude of the support member 1564 in the horizontal plane. It should be noted that the "horizontal plane" used herein does not have to coincide with a strict horizontal plane. Since the construction of the joint itself is well known, a detailed description thereof will be omitted.

The sensor unit 1056 includes a vertical adjustment screw 1566. The vertical adjustment screw 1566 is an example of an adjustment mechanism. The vertical adjustment screw 1566 extends through the housing 1011. The vertical adjustment screw 1566 is coupled to the support member 1564 via a joint (not illustrated). A head portion 1566a of the vertical adjustment screw 1566 is disposed outside the housing 1011. When the head portion 1566a is rotationally operated by a predetermined tool, the joint converts the rotation of the vertical adjustment screw 1566 into a motion that changes the attitude of the support member 1564 in the vertical plane. It should be noted that the "vertical plane" used herein need not coincide with a strict vertical plane. Since the construction of the joint itself is well known, a detailed description thereof will be omitted.

The attitude of the support member 1564 is adjusted to adjust at least one of the detection reference position of the LiDAR sensor 1561 and the light emitting direction from the optical member 1562. As described above, the relative positions of the LiDAR sensor 1561 and the optical member 1562 are maintained by the support member 1564. Accordingly, the above-described adjustment and the adjustment for maintaining the effect of reducing the visibility of the LiDAR sensor 1561 by the optical member 1562 need not be individually performed.

The horizontal adjustment screw 1565 may be replaced with an actuator capable of adjusting at least one of a position and an attitude of the support member 1564 in the horizontal plane. The vertical adjustment screw 1566 may be replaced with an actuator capable of adjusting at least one of a position and an attitude of the support member 1564 in the vertical plane.

The configuration of sensor unit 1056 with optical member 1562 is also applicable to other sensors that use infrared light to detect information. Examples of such sensors include an infrared camera.

The type and number of sensors for detecting information in an area including at least ahead of the vehicle 100 can be appropriately determined according to the specification of the left front lamp device 1050.

In addition to or instead of the sensor unit 1056, a configuration similar to the sensor unit 1056 may be provided to detect information in an area including at least on the left of the vehicle 100. That is, the information of the region including at least the front of the vehicle 100 can be acquired by at least one of the LiDAR sensor and the infrared camera.

The type and number of sensors for detecting information in an area including at least on the left of the vehicle 100 can be appropriately determined according to the specification of the left front lamp device 1050.

The configuration of the left front lamp device 1050 is also applicable to the left rear lamp device. The left rear lamp device is mounted on the left rear corner portion LB of the vehicle 100 illustrated in FIG. 2. The basic configuration of the left rear lamp unit may be symmetric to the left front lamp device 1010 relative to the front-rear direction. However, the specifications of the first lamp unit 1014 and the second lamp unit 1015 may be appropriately changed. The specifications of the LiDAR sensor 1561 may also be appropriately changed.

The configuration of the left front lamp device 1050 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Figure 13:
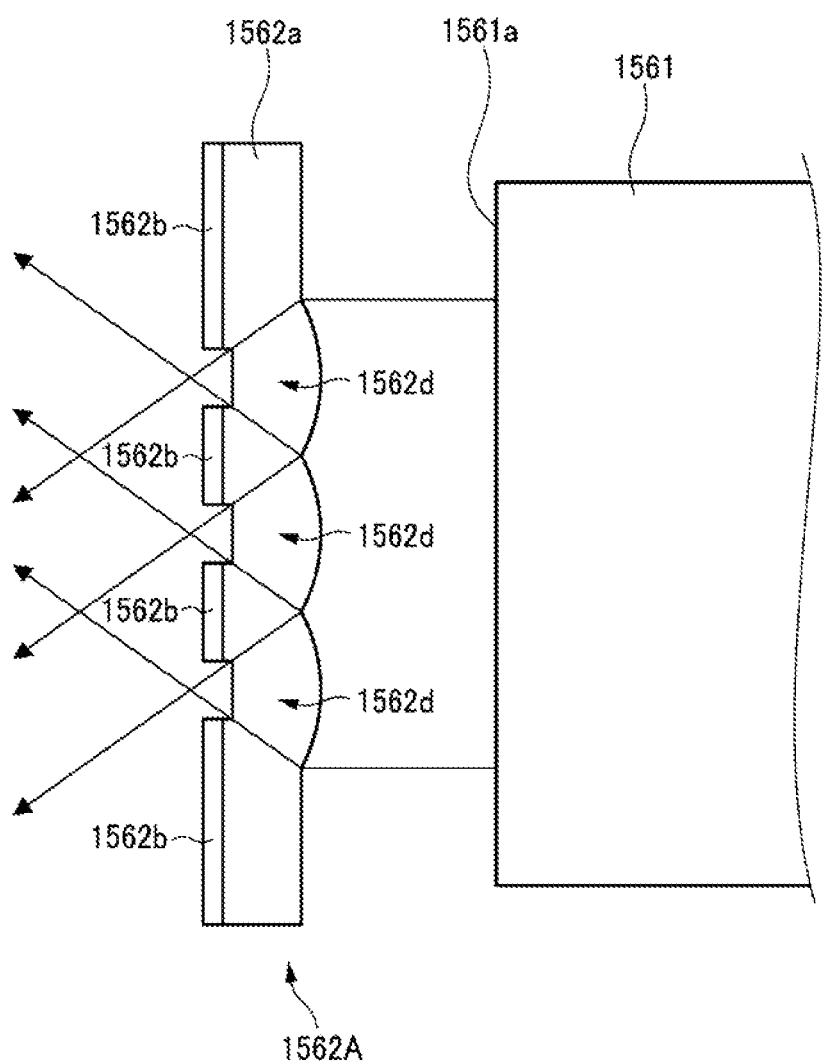
FIG. 13 illustrates a modified example of the left front lamp device according to the fifth embodiment.

FIG. 13 illustrates a modification of the left front lamp device 1050 according to the fifth embodiment. In this example, an optical member 1562A is provided in place of the above-described optical member 1562. The optical member 1562A includes a light diffusing portion 1562d instead of the above-described light collecting portion 1562c. Even with such a configuration, the visibility of the LiDAR sensor 1561 can be reduced by the metallic film 1562b while allowing the passage of the non-visible light used by the LiDAR sensor 1561 for detecting the information.

The first to fifth embodiments described above are merely examples for facilitating understanding of the presently disclosed subject matter. The configurations according to the first to fifth embodiments can be appropriately modified or improved without departing from the gist of the presently disclosed subject matter.

The configurations described with reference to the first embodiment to the fifth embodiment can be combined or replaced with each other depending on the type of sensor to be used.

Figure 14:
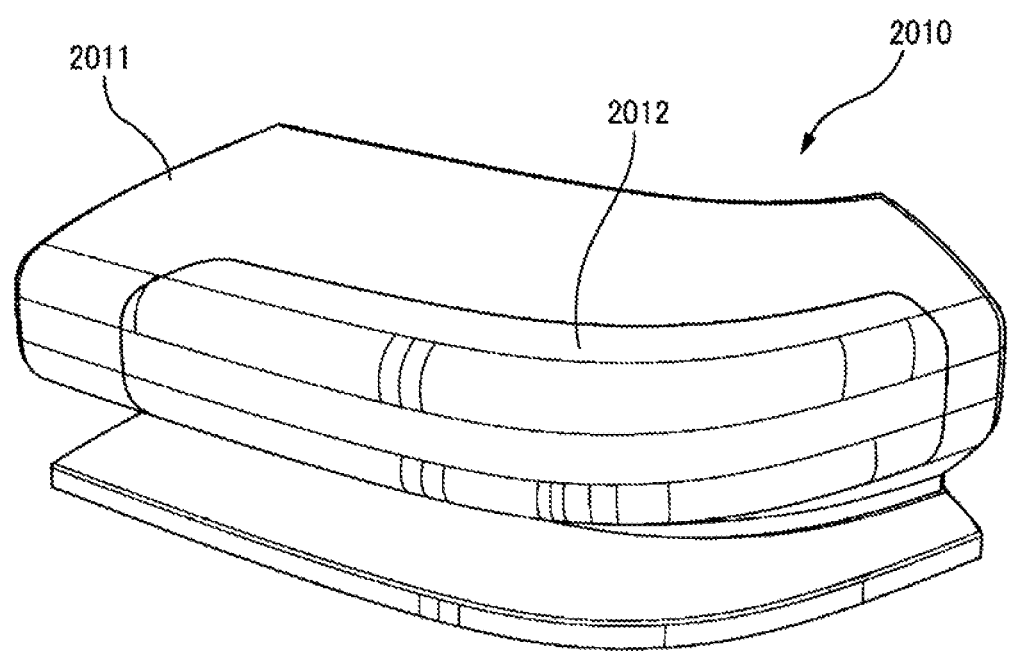
FIG. 14 illustrates an appearance of a left front sensor system according to a sixth embodiment.

FIG. 14 illustrates an appearance of a left front sensor system 2010 according to a sixth embodiment. The left front sensor system 2010 is mounted on the left front corner portion LF of the vehicle 100 illustrated in FIG. 2. A right front sensor system having a configuration symmetrical with the left front sensor system 2010 relative to the left-right direction is mounted on the right front corner portion RF of the vehicle 100.

Figure 15:
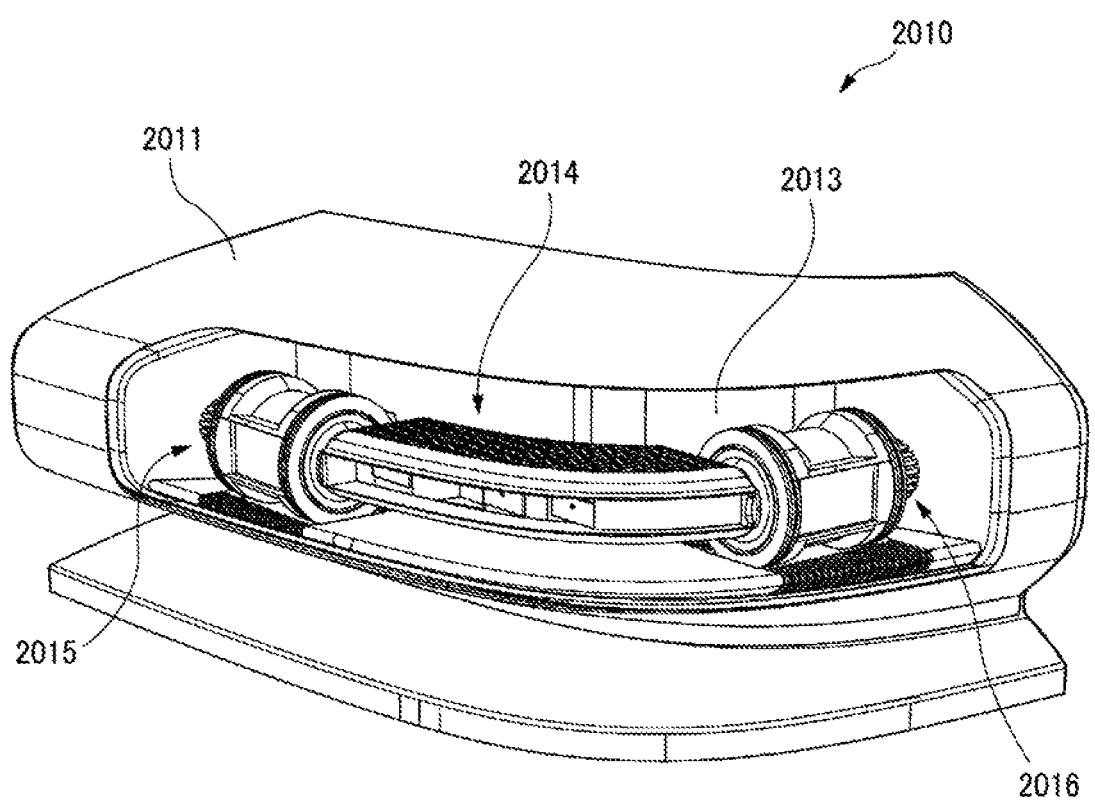
FIG. 15 illustrates an appearance of a portion of the left front sensor system of FIG. 14.

The left front sensor system 2010 includes a housing 2011 and a translucent cover 2012. FIG. 15 illustrates a portion of the left front sensor system 2010 wherein the translucent cover 2012 has been removed from the state illustrated in FIG. 14. The housing 2011 and the translucent cover 2012 define a housing chamber 2013.

The left front sensor system 2010 includes a lamp unit 2014, a first sensor unit 2015, and a second sensor unit 2016. The lamp unit 2014, the first sensor unit 2015, and the second sensor unit 2016 are arranged in the housing chamber 2013.

FIG. 16 illustrates an appearance of a portion of the left front sensor system 2010 in the state illustrated in FIG. 15, as viewed from a position ahead of the vehicle 100.

The lamp unit 2014 includes a light source 2141. As the light source 2141, a lamp light source or a light emitting element can be used. Examples of the lamp light source include an incandescent lamp, a halogen lamp, a discharge lamp, and a neon lamp. Examples of the light-emitting element include a light-emitting diode, a laser diode, and an organic EL element. In the present embodiment, four light sources 2141 are provided. However, the number of the light sources 2141 may be appropriately determined according to the specification of the left front sensor system 2010.

The lamp unit 2014 includes a reflector 2142. The reflector 2142 is configured to reflect the light emitted from the light source in a predetermined direction. In the present embodiment, a reflector 2142 is provided for each of the four light sources 2141. However, the relationship between the number of the light sources 2141 and the number of the reflectors 2142 may be appropriately determined according to the specification of the left front sensor system 2010.

The lamp unit 2014 includes a lamp housing 2143. The lamp housing 2143 houses the light source 2141 and the reflector 2142.

The first sensor unit 2015 includes a first LiDAR sensor 2151. The first LiDAR sensor 2151 has a configuration for emitting non-visible light and a configuration for detecting return light as a result of the non-visible light being reflected by an object existing at least ahead of the vehicle 100. The front of the vehicle 100 is an example of the outside of the vehicle. As required, the first LiDAR sensor 2151 may include a scan device that sweeps the non-visible light to change the light emitting direction (i.e., the detecting direction). In the present embodiment, infrared light having a wavelength of 905 nm is used as the non-visible light.

The first LiDAR sensor 2151 can acquire the distance to the object associated with the returned light, for example, based on the time period from the time when the non-visible light is emitted in a certain direction to the time when the returned light is detected. Further, by accumulating such distance information in association with the detecting position, it is possible to acquire information as to the shape of the object associated with the returned light. Additionally or alternatively, information as to an attribute such as the material of the object associated with the returned light can be acquired based on the difference in wavelength between the emitted light and the returned light.

In other words, the first LiDAR sensor 2151 is a sensor for detecting information of at least an area ahead of the vehicle 100. The first LiDAR sensor 2151 outputs signals corresponding to attributes of the detected return light, such as intensities and wavelengths. The above-mentioned information is acquired by appropriately processing signals outputted from the first LiDAR sensor 2151 by an information processing unit (not illustrated). The information processing unit may be provided in the left front sensor system 2010, or may be installed in the vehicle 100.

The first sensor unit 2015 includes a first sensor housing 2152. The first sensor housing 2152 houses the first LiDAR sensor 2151.

FIG. 17 illustrates an appearance of a portion of the left front sensor system 2010 in the state illustrated in FIG. 15, as viewed from a position on the left of the vehicle 100.

The second sensor unit 2016 includes a second LiDAR sensor 2161. The second LiDAR sensor 2161 has a configuration for emitting non-visible light and a configuration for detecting return light as a result of the non-visible light being reflected by an object existing at least on the left of the vehicle 100. The left side of the vehicle 100 is an example of an outside of the vehicle. As required, the second LiDAR sensor 2161 may include a scan device that sweeps the non-visible light to change the light emitting direction (i.e., the detecting direction). In the present embodiment, infrared light having a wavelength of 905 nm is used as the non-visible light.

The second LiDAR sensor 2161 can acquire the distance to the object associated with the returned light, for example, based on the time period from the time when the non-visible light is emitted in a certain direction to the time when the returned light is detected. Further, by accumulating such distance information in association with the detecting position, it is possible to acquire information as to the shape of the object associated with the returned light. Additionally or alternatively, information as to an attribute such as the material of the object associated with the returned light can be acquired based on the difference in wavelength between the emitted light and the returned light.

That is, the second LiDAR sensor 2161 is a sensor for detecting information of at least an area on the left of the vehicle 100. The second LiDAR sensor 2161 outputs signals corresponding to attributes of the detected return light, such as intensities and wavelengths. The above-mentioned information is acquired by appropriately processing signals outputted from the second LiDAR sensor 2161 by an information processing unit (not illustrated). The information processing unit may be provided in the left front sensor system 2010, or may be installed in the vehicle 100.

The second sensor unit 2016 includes a second sensor housing 2162. The second sensor housing 2162 houses the second LiDAR sensor 2161.

As illustrated in FIG. 16, the left front sensor system 2010 has a pair of first light emitting units 2017. The pair of first light emitting units 2017 is disposed at a position in the housing chamber 2013 at which the detecting operation of the first LiDAR sensor 2151 is not obstructed. Specifically, the pair of first light emitting units 2017 is provided in the first sensor housing 2152. The pair of first light emitting units 2017 and the first LiDAR sensor 2151 are arranged in a direction corresponding to the left-right direction of the vehicle 100 when viewed from a position ahead of the vehicle 100.

As illustrated in FIG. 17, the left front sensor system 2010 includes a pair of second light emitting units 2018. The pair of second light emitting units 2018 is disposed at a position in the housing chamber 2013 at which the detecting operation of the second LiDAR sensor 2161 is not obstructed. Specifically, the pair of second light emitting units 2018 is provided in the second sensor housing 2162. The pair of second light emitting units 2018 and the second LiDAR sensor 2161 are arranged in a direction corresponding to the front-rear direction of the vehicle 100 when viewed from a position on the left of the vehicle 100.

FIG. 18 illustrates an appearance of a portion of the left front sensor system 2010 as viewed from a position above the vehicle 100. Each first light emitting unit 2017 includes a first light source 2171 and a first light guide member 2172. Each second light emitting unit 2018 includes a second light source 2181 and a second light guiding member 2182.

The first light source 2171 is a lamp light source or a light emitting element that emits light having a predetermined wavelength. Examples of the lamp light source and the light emitting element are as described above. The first light guide member 2172 is an optical component configured to receive light at one end face thereof, to subject the incident light to at least one of internal reflection, diffusion, and scattering, and then to emit the light from another end face thereof.

As illustrated in FIGS. 16 and 18, the first light guide member 2172 extends along an outer face of the first sensor housing 2152. The light emitted from the first light source 2171 is incident on a rear end face of the first light guide member 2172. The incident light is emitted from an end face forming an outer peripheral face of the first light guide member 2172 by way of the internal reflection or the like. Accordingly, when the first light source 2171 is turned on, it is obtained an appearance as if the entire outer peripheral face of the first light guide member 2172 emits light. The first light guide member 2172 is an example of a light emitting member.

The second light source 2181 is a lamp light source or a light emitting element that emits light having a predetermined wavelength. Examples of the lamp light source and the light emitting element are as described above. The second light guide member 2182 is an optical component configured to receive light at one end face thereof, to subject the incident light to at least one of internal reflection, diffusion, and scattering, and then to emit the light from another end face thereof.

As illustrated in FIGS. 17 and 18, the second light guide member 2182 extends along an outer face of the second sensor housing 2162. The light emitted from the second light source 2181 is incident on a rear end face of the second light guide member 2182. The incident light is emitted from an end face forming an outer peripheral face of the second light guide member 2182 by way of the internal reflection or the like. Accordingly, when the second light source 2181 is turned on, it is obtained an appearance as if the entire outer peripheral face of the second light guide member 2182 emits light. The second light guide member 2182 is an example of a light emitting member.

As illustrated in FIG. 18, the left front sensor system 2010 includes a controller 2019. The controller 2019 includes a processor and a memory. Examples of the processor include a CPU and an MPU. The memory stores instructions executable by the processor. Examples of the memory include a ROM in which various instructions are stored, and a RAM having a work area in which various instructions executed by a processor are stored. The controller 2019 may be configured by a processor and a memory included in an ECU installed in the vehicle 100, or may be configured by a dedicated device such as an ASIC and an FPGA disposed in the housing chamber 2013.

The controller 2019 is configured to turn on the respective first light sources 2171 in cooperation with the operation of the first LiDAR sensor 2151. That is, the pair of first light emitting units 2017 emits light in cooperation with the operation of the first LiDAR sensor 2151. More specifically, the first light sources 2171 are turned on while the first LiDAR sensor 2151 detects the external information of the vehicle 100. The first light source 2171 may be turned on when the first LiDAR sensor 2151 is activated or deactivated. The mode of lighting, that is, the mode of light emission of the first light guide member 2172, such as colors, constant light emission, blinking, increase or decrease of brightness, can be appropriately determined according to the operation mode of the first LiDAR sensor 2151.

The controller 2019 is configured to turn on the second light sources 2181 in cooperation with the operation of the second LiDAR sensor 2161. That is, the pair of second light emitting units 2018 emits light in cooperation with the operation of the second LiDAR sensor 2161. More specifically, the second light sources 2181 are turned on while the second LiDAR sensor 2161 detects the external information of the vehicle 100. The second light source 2181 may be turned on when the second LiDAR sensor 2161 is activated or deactivated. The mode of lighting, that is, the mode of light emission of the second light guide member 2182, such as colors, constant light emission, blinking, and increase or decrease in brightness, can be appropriately determined according to the operation mode of the second LiDAR sensor 2161.

From the viewpoint of efficiently acquiring the external information of the vehicle, the corner portion of the vehicle where the lamp is disposed is advantageous as a location where the LiDAR sensor is disposed. However, the LiDAR sensor has a relatively large dimension and a very different appearance from the lamp. Accordingly, when an attempt is made to dispose the LiDAR sensor in the vicinity of the lamp, it is inevitable to cause a sense of discomfort in appearance. In order to alleviate such an sense of discomfort, a method of covering the LiDAR sensor with an opaque cover or the like is generally employed.

In the configuration of the present embodiment, the first LiDAR sensor 2151 and the second LiDAR sensor 2161 are disposed in the housing chamber 2013 defined by the translucent covers 2012, so that they can be visually recognized with intention. Further, the first light guide member 2172 which emits light in cooperation with the operation of the first LiDAR sensor 2151 and the second light guide member 2182 which emits light in cooperation with the operation of the second LiDAR sensor 2161 are disposed in the housing chamber 2013. As a result, it is possible to provide a new marketability with a novel appearance that intentionally emphasizes the presence of the LiDAR sensor. In addition, since it is released from the constraint of the necessity of suppressing the presence of the LiDAR sensor, the degree of freedom of disposition of the LiDAR sensor can be enhanced.

In a case where the first light guide member 2172 and the second light guide member 2182 are configured to emit light at all times, they can be used as a daytime lighting lamp or a clearance lamp.

Preferably, the first light sources 2171 are turned on when the vehicle 100 performs the driving support operation using the first LiDAR sensor 2151. The driving support operation means a control processing which at least partially performs at least one of a driving operation (steering wheel operation, acceleration, deceleration), monitoring of the driving environment, and backup of the driving operation. That is, it includes not only the partial driving support such as braking function for collision avoidance and assisting function for lane-keeping, but also a full self-driving operation. The mode of lighting, that is, the light emission mode of the first light guide member 2172 may be changed in accordance with the level of driving support.

Similarly, the second light sources 2181 are turned on when the vehicle 100 is performing the driving support operation using the second LiDAR sensor 2161. The driving support operation means a control processing which at least partially performs at least one of a driving operation (steering wheel operation, acceleration, deceleration), monitoring of the driving environment, and backup of the driving operation. That is, it includes not only the partial driving support such as braking function for collision avoidance and assisting function for lane-keeping, but also a full self-driving operation. The mode of lighting, that is, the light emission mode of the second light guide member 2182 may be changed in accordance with the level of driving support.

According to such a configuration, the fact that the vehicle 100 is in the driving support operation can be recognized even from the outside of the vehicle 100, so that a new marketability can be provided. If social recognition of such a function is promoted, the light emission can give safety feeling to pedestrians and other drivers.

In the present embodiment, the first light guide member 2172 emits light in cooperation with the operation of the first LiDAR sensor 2151, and the second light guide member 2182 emits light in cooperation with the operation of the second LiDAR sensor 2161.

The light guide member is an optical component that has a relatively high degree of freedom in selecting a shape and can easily secure a wide light emitting area. Accordingly, it is possible to easily and flexibly realize a light emitting mode capable of emphasizing the presence of the LiDAR sensor.

In the present embodiment, both the first sensor unit 2015 and the second sensor unit 2016 are provided with the LiDAR sensors. However, at least one of the first sensor unit 2015 and the second sensor unit 2016 may be configured to include another sensor capable of detecting the external information of the vehicle 100. Examples of such a sensor include a millimeter wave radar, an ultrasonic sonar, a visible light camera, and an infrared camera.

Either of the first sensor unit 2015 and the second sensor unit 2016 may be omitted. Alternatively, at least one sensor unit may be provided in addition to the first sensor unit 2015 and the second sensor unit 2016. Examples of the sensor included in the sensor unit include a millimeter wave radar, an ultrasonic sonar, a visible light camera, and an infrared camera.

The configuration of the left front sensor system 2010 is also applicable to the left rear sensor system. The left rear sensor system is mounted on the left rear corner portion LB of the vehicle 100 illustrated in FIG. 2. The basic configuration of the left rear sensor system may be symmetric with the left-front sensor system 2010 relative to the front-rear direction. However, the specifications of the lamp unit 2014, the first sensor unit 2015, and the second sensor unit 2016 may be appropriately changed.

The configuration of the left front sensor system 2010 is also applicable to the right rear sensor system. The right rear sensor system is mounted on the right rear corner portion RB of the vehicle 100 illustrated in FIG. 2. The basic configuration of the right rear sensor system is symmetrical with the left rear sensor system described above relative to the left-right direction.

In the present embodiment, the lamp unit 2014 is provided in the housing chamber 2013. However, the lamp unit 2014 may be omitted from the left front sensor system 2010. From the viewpoint of enhancing the degree of freedom of the sensor arrangement, the location of the sensor system is not limited to the corner portions of the vehicle 100.

Figure 19A:
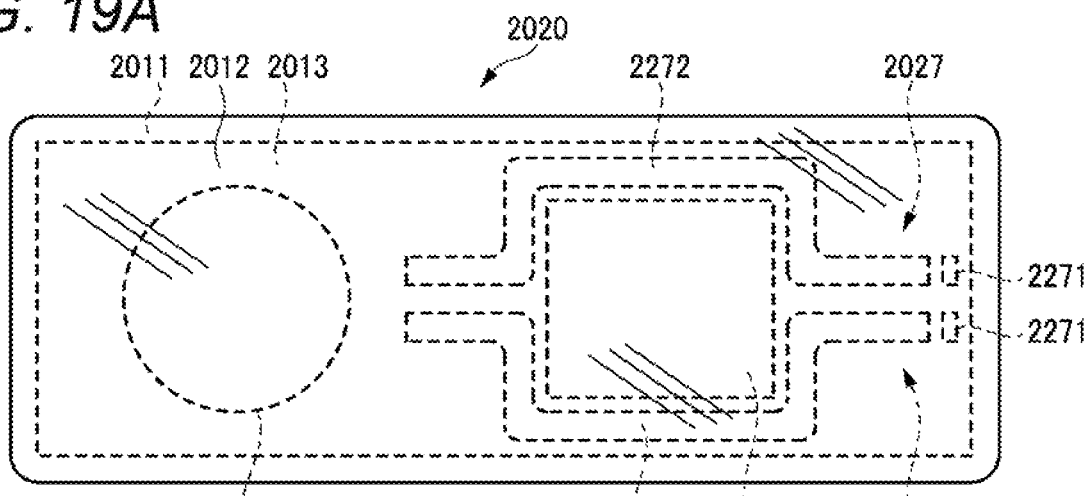
FIG. 19A illustrates an appearance of a left front sensor system according to a seventh embodiment.

FIG. 19A schematically illustrates an appearance of a left front sensor system 2020 according to a seventh embodiment as viewed from a position ahead of the vehicle 100. The left front sensor system 2020 is mounted on the left front corner portion LF of the vehicle 100 illustrated in FIG. 2. A right front lamp device having a configuration symmetrical with the left front sensor system 2020 relative to the left-right direction is mounted on the right front corner portion RF of the vehicle 100. The left front sensor system 2020 includes a sensor unit 2025 and a pair of light emitting units 2027. Since the other configurations are identical with those of the left front sensor system 2010 according to the sixth embodiment, repetitive explanations for those will be omitted.

The sensor unit 2025 is disposed in the housing chamber 2013 defined by the housing 2011 and the translucent cover 2012. The sensor unit 2025 includes any of the LiDAR sensor, the millimeter wave radar, the ultrasonic sonar, the visible light camera, and the infrared camera as mentioned above.

The pair of light emitting units 2027 is disposed at a position in the housing chamber 2013 at which the detecting operation of the sensor in the sensor unit 2025 is not obstructed. Specifically, the pair of light emitting units 2027 is provided at a position that appears to surround the sensor unit 2025 when viewed from the outside of the vehicle 100.

Each light emitting unit 2027 includes a light source 2271 and a light guiding member 2272. The light source 2271 is a lamp light source or a light emitting element that emits light having a predetermined wavelength. Examples of the lamp light source and the light emitting element are as described above. The light guide member 2272 is an optical component configured to receive light at one end face thereof, to subject the incident light to at least one of internal reflection, diffusion, and scattering, and then to emit the light from another end face thereof. It should be noted that the light source 2271 does not necessarily have to be disposed in the housing chamber 2013.

The light emitted from the light source 2271 is incident from an incident end face of the light guide member 2272. The incident light is emitted from an emission end face forming an outer face of the light guide member 2272 by way of the internal reflection or the like. Accordingly, when the light source 2271 is turned on, it is obtained an appearance as if the entire outer peripheral face of the light guide member 2272 emits light. The light guide member 2272 is an example of a light emitting member.

The controller 2019 is configured to turn on each light source 2271 in cooperation with the operation of the sensor in the sensor unit 2025. That is, the pair of light emitting units 2027 emits light in cooperation with the operation of the sensor. Specifically, each light source 2271 is turned on while the sensor is detecting the external information of the vehicle 100. The light source 2271 may be turned on when the sensor is activated or deactivated. The mode of lighting, that is, the mode of light emission of the light guide member 2272, such as color, constant light emission, blinking, increase or decrease of brightness, can be appropriately determined according to the operation mode of the sensor.

In the configuration of the present embodiment, the sensor unit 2025 is disposed in the housing chamber 2013 defined by the translucent covers 2012, so that they can be visually recognized with intention. In addition, the light guide member 2272 that emits light in cooperation with the operation of the sensor in the sensor unit 2025 is disposed in the housing chamber 2013. As a result, it is possible to provide a new marketability with a novel appearance that intentionally emphasizes the presence of the sensor. In addition, since it is released from the constraint of the necessity of suppressing the presence of the sensor for acquiring the external information of the vehicle 100, the degree of freedom of disposition of such a sensor can be enhanced.

In particular, in the present embodiment, the pair of light guide members 2272 is provided at a position that appears to surround the sensor unit 2025 when viewed from the outside of the vehicle 100. As a result, it is possible to provide an appearance that further emphasizes the presence of the sensor.

In a case where the pair of light guide members 2272 always emits light, they can also be used as a daytime lighting lamp or a clearance lamp. Alternatively, it can be used in conjunction with a daytime lighting lamp or a clearance lamp (not illustrated) that can be disposed in the housing chamber 2013.

Preferably, each light source 2271 is turned on when the vehicle 100 performs the driving support operation using the sensor in the sensor unit 2025. The mode of lighting, that is, the light emission mode of each light emitting unit 2027 may be changed according to the level of driving support.

According to such a configuration, the fact that the vehicle 100 is in the driving support operation can be recognized even from the outside of the vehicle 100, so that a new marketability can be provided. If social recognition of such a function is promoted, the light emission can give safety feeling to pedestrians and other drivers.

In the present embodiment, each light guide member 2272 emits light in cooperation with the operation of the sensor in the sensor unit 2025.

The light guide member is an optical component that has a relatively high degree of freedom in selecting a shape and can easily secure a wide light emitting area. Accordingly, it is possible to easily and flexibly realize a light emitting mode capable of emphasizing the presence of the sensor.

Note that one of the pair of light emitting units 2027 can be omitted in a case where a desired presence enhancement effect on the sensor can be obtained.

Figure 19B:
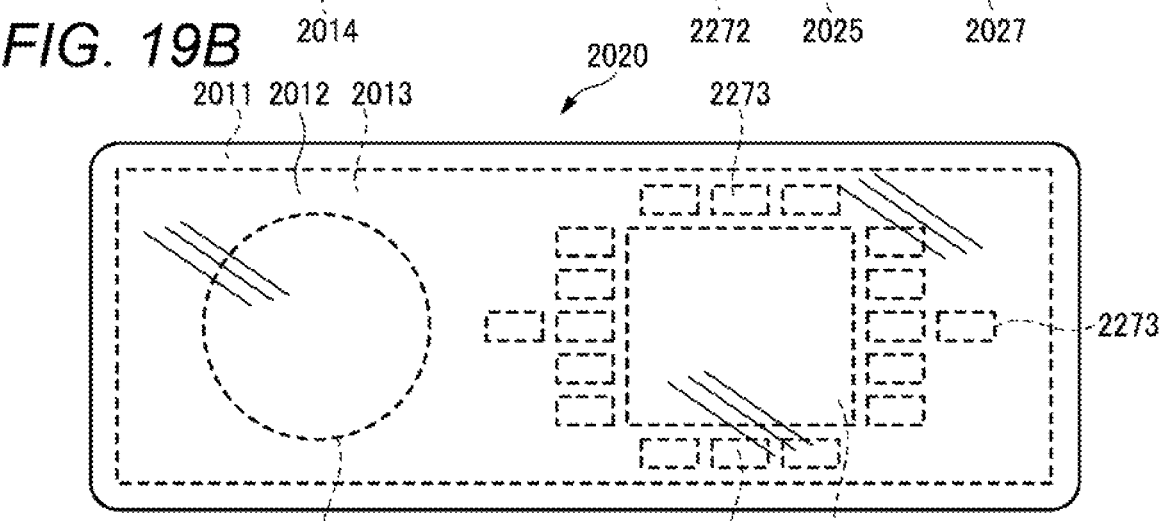
FIG. 19B illustrates a modified example of a left front sensor system according to the seventh embodiment.

As illustrated in FIG. 19B, the pair of light emitting units 2027 can be replaced with a plurality of light sources 2273. Each light source 2273 is a lamp light source or a light emitting element that emits light including a predetermined wavelength. Examples of the lamp light source and the light emitting element are as described above. Each light source 2273 is an example of a light emitting member.

In the present modification, the light sources 2273 are arranged at positions in the housing chamber 2013 at which the detecting operation of the sensor in the the sensor unit 2025 is not obstructed. More specifically, the light sources 2273 are provided at positions that appear to surround the sensor unit 2025 when viewed from the outside of the vehicle 100.

In this case, the controller 2019 is configured to turn on each light source 2273 in cooperation with the operation of the sensor in the sensor unit 2025. That is, the light sources 2273 emit light in cooperation with the operation of the sensor. Specifically, each light source 2273 is turned on while the sensor is detecting the external information of the vehicle 100. The light source 2273 may be turned on when the sensor is activated or deactivated. The mode of lighting, that is, the mode of light emission of each light source 2273, such as color, constant light emission, blinking, increase or decrease of brightness, can be appropriately determined according to the operation mode of the sensor.

In the case of the present modification, since it is unnecessary to consider a change in the traveling direction of the light by the light guide member, it is possible to easily and flexibly determine the arrangement of the light sources for realizing the light emitting mode capable of emphasizing the presence of the sensor.

It should be noted that a portion of the light sources 2273 may be omitted in a case where a desired presence enhancement effect on the sensor is obtained.

Figure 20A:
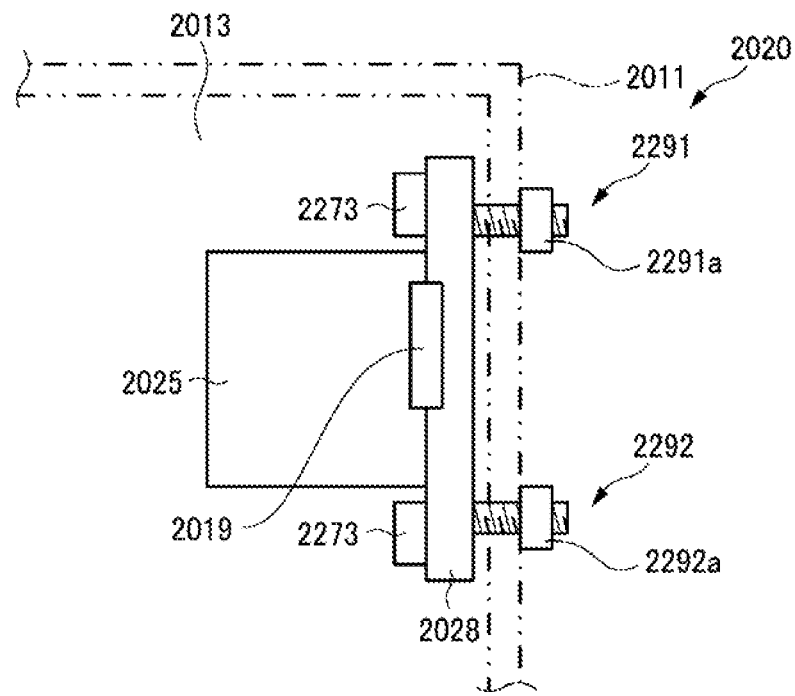
FIG. 20A illustrates a modified example of the left front sensor system according to the seventh embodiment.

In this example, the configuration illustrated in FIG. 20A can be adopted. The left front sensor system 2020 may include a support member 2028. The support member 2028 is disposed in the housing chamber 2013. The support member 2028 supports the controller 2019, the sensor unit 2025, and the light sources 2273. The relative positional relationship among the controller 2019, the sensor unit 2025, and the light sources 2273 is maintained by the support member 2028.

According to such a configuration, the controller 2019, the sensor unit 2025, and the light sources 2273 involved in the cooperative operation can be modularized and disposed in the housing chamber 2013.

Figure 20B:
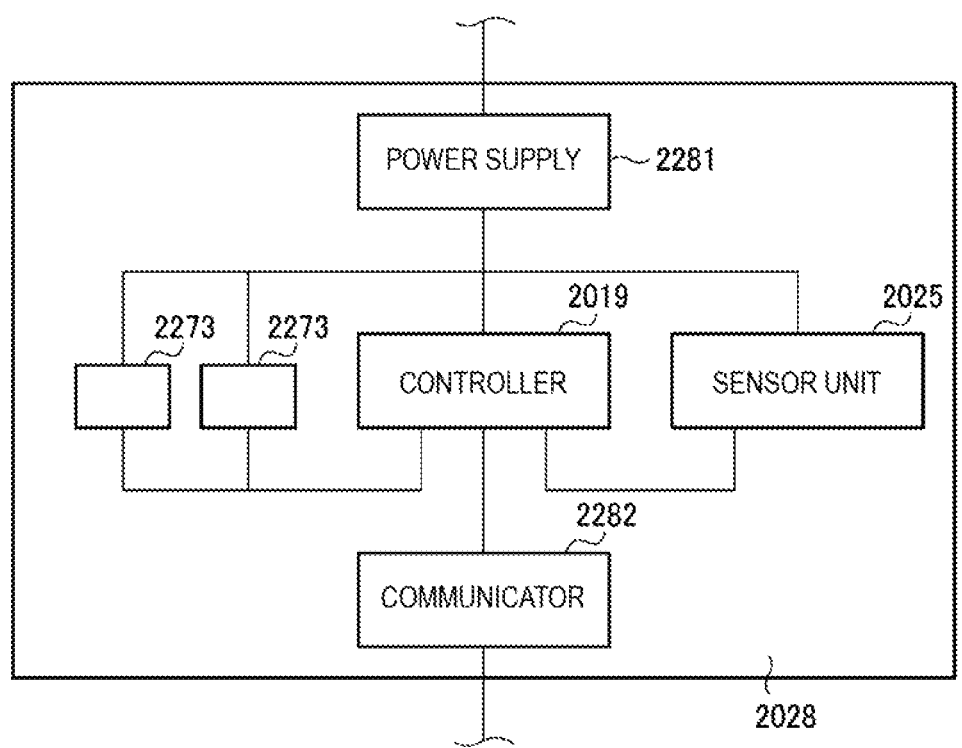
FIG. 20B illustrates a modified example of the left front sensor system according to the seventh embodiment.

More specifically, as illustrated in FIG. 20B, a power supply 2281 and a communicator 2282 are provided on the support member 2028.

The power supply 2281 receives electric power from a power source (not illustrated) installed in the vehicle 100. The power supply 2281 is configured to supply the electric power to at least the controller 2019, the sensor unit 2025, and the light sources 2273.

The controller 2019 is communicably coupled to a control device (not illustrated) installed in the vehicle 100 via a communicator 2282. The controller 2019 is configured to receive a control signal from the control device via the communicator 2282, and to control the operation of the sensor unit 2025 and the light sources 2273 based on the control signal.

As illustrated in FIG. 20A, the left front sensor system 2020 includes a horizontal adjustment screw 2291. The horizontal adjustment screw 2291 is an example of an adjustment mechanism. The horizontal adjustment screw 2291 extends through housing 2011. The horizontal adjustment screw 2291 is coupled to the support member 2028 via a joint (not illustrated). A head portion 2291a of the horizontal adjustment screw 2291 is disposed outside the housing 2011. When the head portion 2291*a* is rotationally operated by a predetermined tool, the joint converts the rotation of the horizontal adjusting screw 2291 into a motion for changing the attitude of the support member 2028 in the horizontal plane. It should be noted that the "horizontal plane" used herein does not have to coincide with a strict horizontal plane. Since the construction of the joint itself is well known, a detailed description thereof will be omitted.

The left front sensor system 2020 includes a vertical adjustment screw 2292. The vertical adjustment screw 2292 is an example of an adjustment mechanism. The vertical adjustment screw 2292 extends through the housing 2011. The vertical adjustment screw 2292 is coupled to the support member 2028 via a joint (not illustrated). A head portion 2292*a* of the vertical adjustment screw 2292 is disposed outside the housing 2011. When the head portion 2292*a* is rotationally operated by a predetermined tool, the joint converts the rotation of the vertical adjustment screw 2292 into a motion that changes the attitude of the support member 2028 in the vertical plane. It should be noted that the "vertical plane" used herein need not coincide with a strict vertical plane. Since the construction of the joint itself is well known, a detailed description thereof will be omitted.

The attitude of the support member 2028 is adjusted in order to adjust at least one of the detection reference position of the sensor in the sensor unit 2025 and the light emitting direction from each light source 2273. As described above, the relative positions of the sensor unit 2025 and the light sources 2273 are maintained by the support member 2028. Accordingly, when one of the adjustments is made, the result is reflected on the other.

The horizontal adjustment screw 2291 may be replaced with an actuator capable of adjusting at least one of a position and an attitude of the support member 2028 in the horizontal plane. The vertical adjustment screw 2292 may be replaced with an actuator capable of adjusting at least one of a position and an attitude of the support member 2028 in the vertical plane.

Figure 19C:
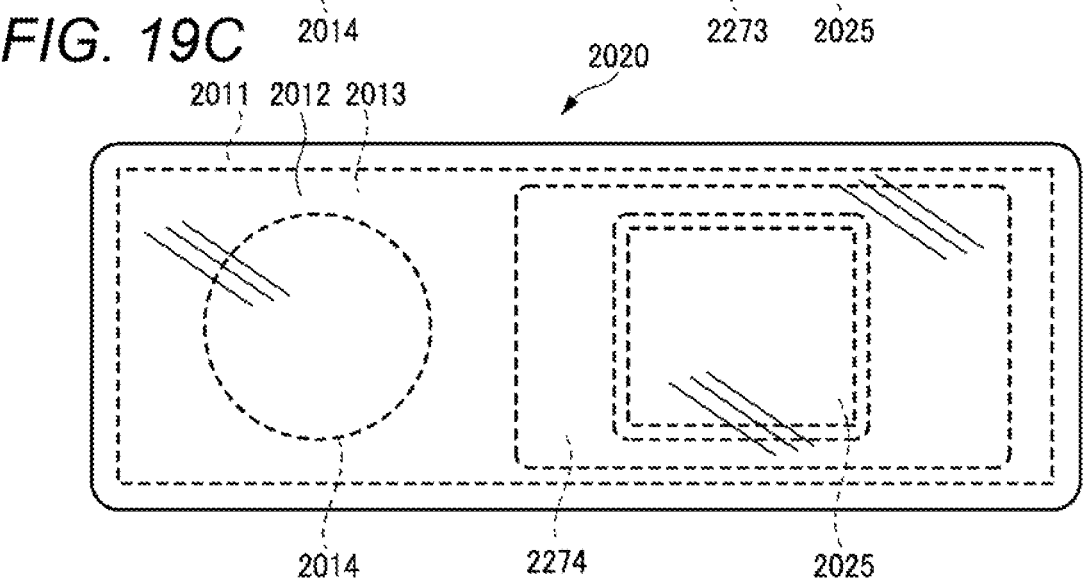
FIG. 19C illustrates a modified example of a left front sensor system according to the seventh embodiment.

As illustrated in FIG. 19C, the pair of light emitting units 2027 can be replaced with an EL panel 2274. The EL panel is a surface-emitting light source capable of emitting light including a predetermined wavelength. The EL panel 2274 may be an organic EL panel or an inorganic EL panel. The EL panel 2274 is an example of a light emitting member.

In the present modification, the EL panel 2274 is disposed at a position in the housing chamber 2013 at which the detecting operation of the sensor in the sensor unit 2025 is not obstructed. Specifically, the EL panel 2274 is provided at a position that appears to surround the sensor unit 2025 when viewed from the outside of the vehicle 100.

In this case, the controller 2019 is configured to turn on the EL panel 2274 in cooperation with the operation of the sensors of the sensor unit 2025. That is, the EL panel 2274 emits light in conjunction with the operation of the sensor. More specifically, the EL panel 2274 is turned on while the sensor is detecting the external information of the vehicle 100. The EL panel 2274 may be turned on when the sensor is activated or deactivated. The mode of lighting, that is, the mode of light emission of the EL panel 2274, such as color, constant light emission, blinking, increase or decrease of brightness, can be appropriately determined according to the operation mode of the sensor.

The EL panel is an optical component that has a relatively high degree of freedom in selecting a shape and can easily secure a wide light emitting area. In addition, it is not necessary to take into account a change in the traveling direction of light as in the case of the light guide member. Accordingly, also in the present example, the configuration for realizing the light emission mode capable of emphasizing the presence of the sensor can be easily and flexibly determined.

The configuration of the left front sensor system 2020 is also applicable to the left rear sensor system. The left rear sensor system is mounted on the left rear corner portion LB of the vehicle 100 illustrated in FIG. 2. The basic configuration of the left rear sensor system may be symmetric with the left-front sensor system 2020 relative to the front-rear direction. However, the specifications of the lamp unit 2014 and the sensor unit 2025 may be appropriately changed.

The configuration of the left front sensor system 2020 is also applicable to the right rear sensor system. The right rear sensor system is mounted on the right rear corner portion RB of the vehicle 100 illustrated in FIG. 2. The basic configuration of the right rear sensor system is symmetrical with the left rear sensor system described above relative to the left-right direction.

In the present embodiment, the lamp unit 2014 is provided in the housing chamber 2013. However, the lamp unit 2014 may be omitted from the left front sensor system 2020. From the viewpoint of enhancing the degree of freedom of the sensor arrangement, the location of the sensor system is not limited to the corner portions of the vehicle 100.

Figure 21A:
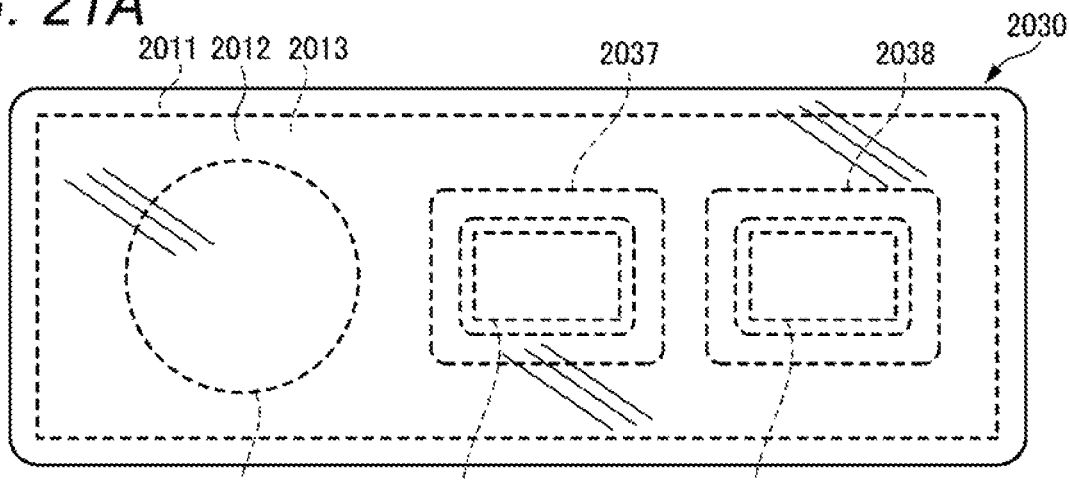
FIG. 21A illustrates an appearance of a left front sensor system according to an eighth embodiment.

FIG. 21A schematically illustrates an appearance of a left front sensor system 2030 according to an eighth embodiment as viewed from a position ahead of the vehicle 100. The left front sensor system 2030 is mounted on the left front corner portion LF of the vehicle 100 illustrated in FIG. 2. A right front lamp device having a configuration symmetrical with the left front sensor system 2030 relative to the left-right direction is mounted on the right front corner portion RF of the vehicle 100. The left front sensor system 2030 includes a first sensor unit 2035, a second sensor unit 2036, a first light emitting unit 2037, and a second light emitting unit 2038. Since the other configurations are identical with those of the left front sensor system 2010 according to the sixth embodiment, repetitive explanations for those will be omitted.

The first sensor unit 2035 and the second sensor unit 2036 are disposed in the housing chamber 2013 defined by the housing 2011 and the translucent cover 2012. Each of the first sensor unit 2035 and the second sensor unit 2036 includes any of the LiDAR sensor, the millimeter wave radar, the ultrasonic sonar, the visible light camera, and the infrared camera as mentioned above.

The first light emitting unit 2037 is disposed at a position in the housing chamber 2013 where the detecting operation by the sensor in the first sensor unit 2035 is not obstructed. Specifically, the first light emitting unit 2037 is provided at a position which appears to surround the first sensor unit 2035 when viewed from the outside of the vehicle 100. The first light emitting unit 2037 may have any of the configuration described with reference to FIG. 19A, the configuration described with reference to FIG. 19B, and the configuration described with reference to FIG. 19C.

The second light emitting unit 2038 is disposed at a position in the housing chamber 2013 where the detecting operation by the sensor in the first sensor unit 2036 is not obstructed. Specifically, the second light emitting unit 2038 is provided at a position that appears to surround the second sensor unit 2036 when viewed from the outside of the vehicle 100. The second light emitting unit 2038 may have any of the configuration described with reference to FIG.

19A, the configuration described with reference to FIG. 19B, and the configuration described with reference to FIG. 19C.

In the configuration of the present embodiment, the first sensor unit 2035 and the second sensor unit 2036 are disposed in the housing chamber 2013 defined by the translucent cover 2012, so that they are visually recognized with intention. Furthermore, a first light emitting unit 2037 that emits light in cooperation with the operation of the sensor of the first sensor unit 2035 and a second light emitting unit 2038 that emits light in cooperation with the operation of the sensor of the second sensor unit 2036 are arranged in the housing chamber 2013. As a result, it is possible to provide a new marketability with a novel appearance that intentionally emphasizes the presence of a plurality of sensors. In addition, since it is released from the constraint of the necessity of suppressing the presence of the sensors for acquiring the external information of the vehicle 100, the degree of freedom of disposition of such sensors can be enhanced.

In particular, in the present embodiment, the first light emitting unit 2037 and the second light emitting unit 2038 are provided at positions that appear to individually surround the first sensor unit 2035 and the second sensor unit 2036 when viewed from the outside of the vehicle 100. As a result, it is possible to provide an appearance that further emphasizes the presence of the sensors.

When the first light emitting unit 2037 and the second light emitting unit 2038 are configured to emit light at all times, they can be used as daytime lighting lamps or clearance lamps. The function assigned to the first light emitting unit 2037 and the function assigned to the second light emitting unit 2038 may be the same or different. For example, both the first light emitting unit 2037 and the second light emitting unit 2038 may be used as either the daytime lighting lamps or the clearance lamps. Alternatively, the first light emitting unit 2037 may be used as one of the daylight lamp and the clearance lamp, and the second light emitting unit 2038 may be used as the other.

In this example, two sensor units are arranged in the housing chamber 2013. However, depending on the specification of the left front sensor system 2030, three or more sensor units may be disposed in the housing chamber 2013. In this case, as many light emitting units as there are sensor units are provided at positions where each sensor unit appears to be individually surrounded.

Figure 21B:
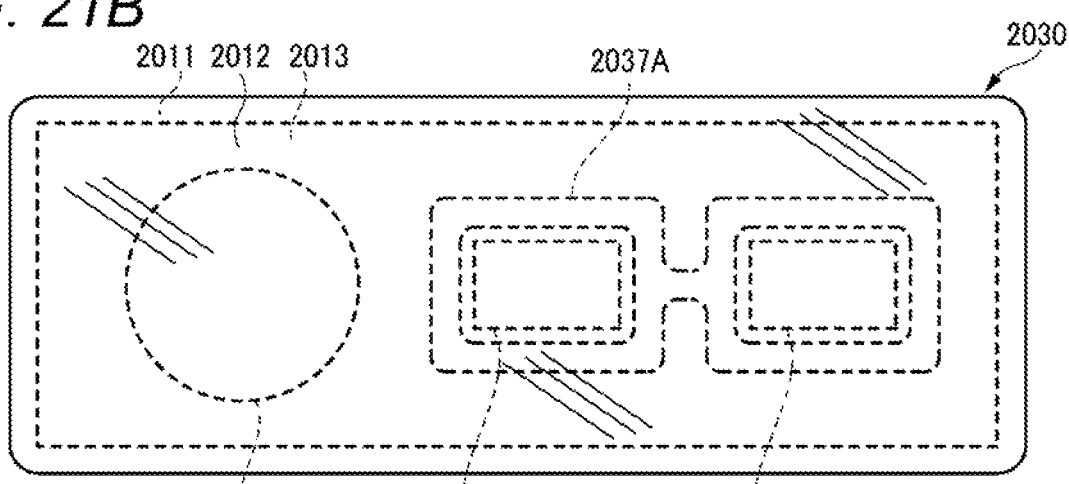
FIG. 21B illustrates a modified example of a left front sensor system according to the eighth embodiment.

As illustrated in FIG. 21B, the first light emitting unit 2037 and the second light emitting unit 2038 may be replaced with a light emitting unit 2037A. The light emitting unit 2037A is disposed at a position in the housing chamber 2013 where the detecting operation by the sensor in the first sensor unit 2035 and the detecting operation by the sensor in the second sensor unit 2036 are not obstructed. Specifically, the light emitting unit 2037A is provided at a position that appears to individually surround the first sensor unit 2035 and the second sensor unit 2036 when viewed from the outside of the vehicle 100. The light emitting unit 2037A can adopt any of the configuration described with reference to FIG. 19A, the configuration described with reference to FIG. 19B, and the configuration described with reference to FIG. 19C.

In a case where the light emitting unit 2037A is configured to emit light at all times, it can be used as a daytime lighting lamp or a clearance lamp. Alternatively, it can be used in conjunction with a daytime lighting lamp or a clearance lamp (not illustrated) that can be disposed in the housing chamber 2013.

In this example, two sensor units are arranged in the housing chamber 2013. However, depending on the specification of the left front sensor system 2030, three or more sensor units may be disposed in the housing chamber 2013. In this case, the light emitting unit 2037A is shaped and arranged such that each sensor unit appears to be individually surrounded.

Figure 21C:
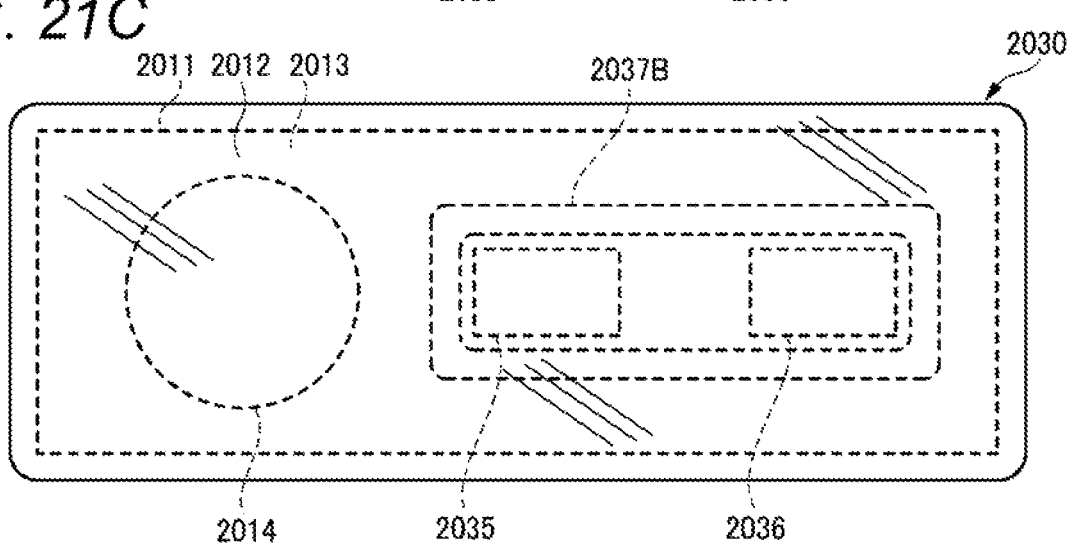
FIG. 21C illustrates a modified example of a left front sensor system according to the eighth embodiment.

As illustrated in FIG. 21C, the first light emitting unit 2037 and the second light emitting unit 2038 can be replaced with a light emitting unit 2037B. The light emitting unit 2037B is disposed at a position in the housing chamber 2013 where the detecting operation by the sensor in the first sensor unit 2035 and the detecting operation by the sensor in the second sensor unit 2036 are not obstructed. More specifically, the light emitting unit 2037B is provided at a position that appears to collectively surround the first sensor unit 2035 and the second sensor unit 2036 when viewed from the outside of the vehicle 100. The light emitting unit 2037B may have any of the configuration described with reference to FIG. 19A, the configuration described with reference to FIG. 19B, and the configuration described with reference to FIG. 19C.

In a case where the light emitting unit 2037B is configured to emit light at all times, it can be used as a daytime lighting lamp or a clearance lamp. Alternatively, it can be used in conjunction with a daytime lighting lamp or a clearance lamp (not illustrated) that can be disposed in the housing chamber 2013.

In this example, two sensor units are arranged in the housing chamber 2013. However, depending on the specification of the left front sensor system 2030, three or more sensor units may be disposed in the housing chamber 2013. In this case, the light emitting unit 2037A has a shape and an arrangement in which each sensor unit appears to be collectively surrounded.

The configuration of the left front sensor system 2030 is also applicable to the left rear sensor system. The left rear sensor system is mounted on the left rear corner portion LB of the vehicle 100 illustrated in FIG. 2. The basic configuration of the left rear sensor system may be symmetric with the left-front sensor system 2030 relative to the front-rear direction. However, the specifications of the lamp unit 2014, the first sensor unit 2035, and the second sensor unit 2036 can be appropriately changed.

The configuration of the left front sensor system 2030 is also applicable to the right rear sensor system. The right rear sensor system is mounted on the right rear corner portion RB of the vehicle 100 illustrated in FIG. 2. The basic configuration of the right rear sensor system is symmetrical with the left rear sensor system described above relative to the left-right direction.

In the present embodiment, the lamp unit 2014 is provided in the housing chamber 2013. However, the lamp unit 2014 may be omitted from the left front sensor system 2030. From the viewpoint of enhancing the degree of freedom of the sensor arrangement, the location of the sensor system is not limited to the corner portions of the vehicle 100.

The sixth to eighth embodiments described above are merely examples for facilitating understanding of the presently disclosed subject matter. The configurations according to the sixth embodiment to the eighth embodiment can be appropriately modified or improved without departing from the gist of the presently disclosed subject matter.

The configurations described with reference to the sixth embodiment to the eighth embodiment can be combined or replaced with each other depending on the type of sensor to be used.

Figure 22:
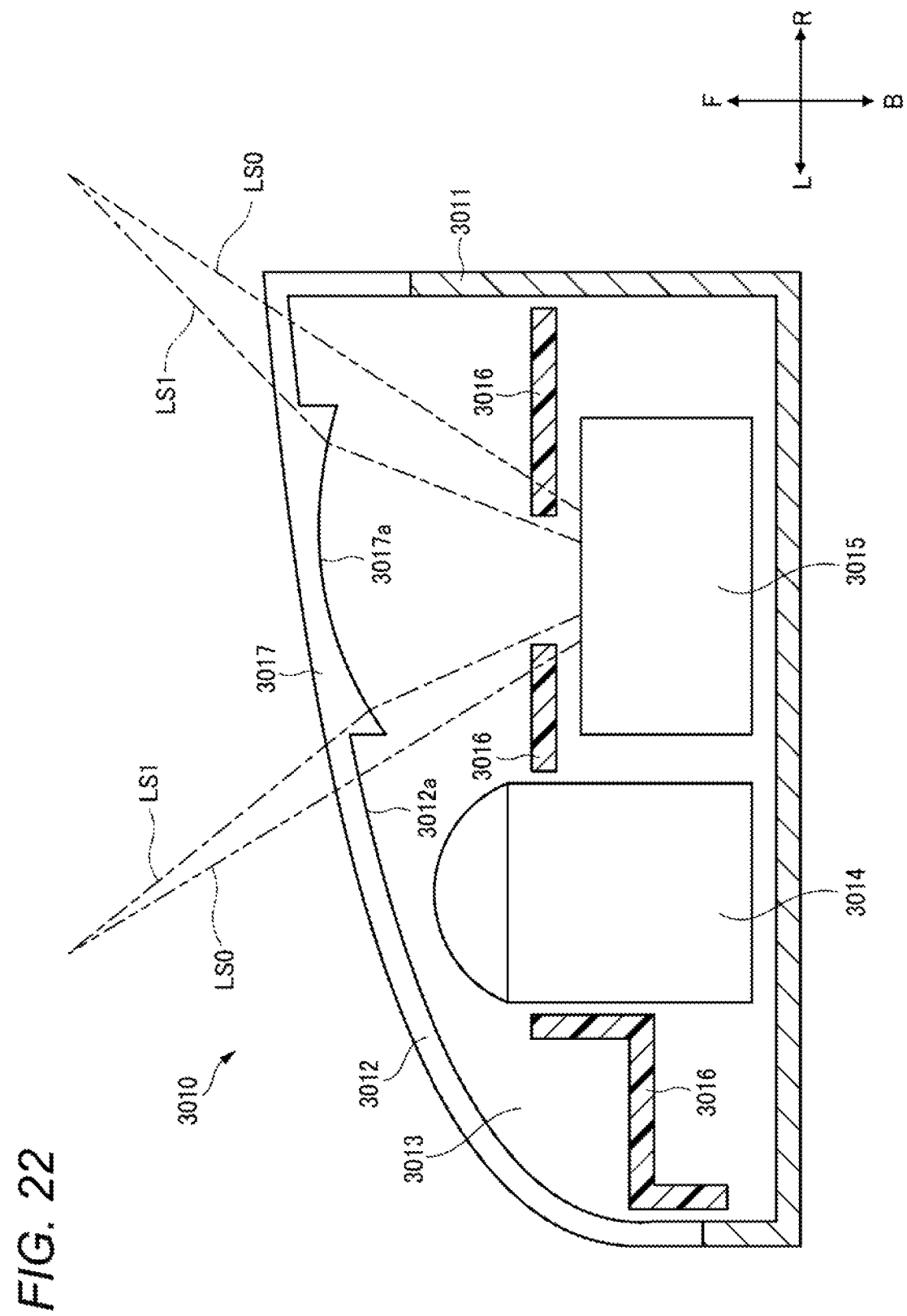
FIG. 22 schematically illustrates a configuration of a left front lamp device according to a ninth embodiment.

FIG. 22 schematically illustrates a configuration of a left front lamp device 3010 according to a ninth embodiment. The left front lamp device 3010 is mounted on the left front corner portion LF of the vehicle 100 illustrated in FIG. 2. A right front lamp device having a symmetrical configuration with the left front lamp device 3010 relative to the left-right direction is mounted on the right front corner portion RF of the vehicle 100.

The left front lamp device 3010 includes a housing 3011 and a translucent cover 3012. The translucent cover 3012 forms a portion of the outer face of the vehicle 100. The translucent cover 3012 defines a lamp chamber 3013 together with the housing 3011.

The left front lamp device 3010 includes a lamp unit 3014. The lamp unit 3014 is a lamp that emits light toward an area including ahead of the vehicle 100. The lamp unit 3014 is a headlamp, for example.

The left front lamp device 3010 includes a LiDAR sensor unit 3015. The LiDAR sensor unit 3015 is disposed in the lamp chamber 3013. That is, the lamp chamber 3013 is an example of a housing chamber.

The LiDAR sensor unit 3015 has a configuration for emitting non-visible light and a configuration for detecting return light as a result of the non-visible light being reflected by an object existing at least ahead of the vehicle 100. The front of the vehicle 100 is an example of the outside of the vehicle. As required, the LiDAR sensor unit 3015 may include a scan device that sweeps the non-visible light to change the light emitting direction (i.e., the detecting direction). In the present embodiment, infrared light having a wavelength of 905 nm is used as the non-visible light.

The LiDAR sensor unit 3015 can acquire the distance to the object associated with the returned light, for example, based on the time period from the time when the non-visible light is emitted in a certain direction to the time when the returned light is detected. Further, by accumulating such distance information in association with the detecting position, it is possible to acquire information as to the shape of the object associated with the returned light. Additionally or alternatively, information as to an attribute such as the material of the object associated with the returned light can be acquired based on the difference in wavelength between the emitted light and the returned light.

In other words, the LiDAR sensor unit 3015 is a sensor for detecting information of at least an area ahead of the vehicle 100. The LiDAR sensor unit 3015 outputs signals corresponding to the attributes of the detected return light, such as intensities and wavelengths. The above information is acquired by appropriately processing signals outputted from the LiDAR sensor unit 3015 by an information processing unit (not illustrated). The information processing unit may be provided in the left front lamp device 3010 or may be installed in the vehicle 100.

The lamp chamber 3013 is on example of a location of the LiDAR sensor unit 3015 that can efficiently acquire the external information of the vehicle 100. However, the LiDAR sensor unit 3015 is likely to have a relatively large dimension and to have a very different appearance from the lamp unit 3014. Accordingly, when the LiDAR sensor unit 3015 is disposed in the lamp chamber 3013, the layout would be further constrained.

As illustrated in FIG. 22, an extension member 3016 is provided in the lamp chamber 3013 in order to suppress the above-mentioned discomfort of the LiDAR sensor unit 3015. The "extension member" is a decorative component that covers a part of the structure disposed in the lamp chamber 3013 so as to make the structure invisible from the outside of the vehicle 100. The dashed chains line LS0 in the drawing indicate outer edges of an detectable area that the LiDAR sensor unit 3015 inherently has. Here, "detectable area" means an area on the path of detection light (emitted light and returned light) used by the LiDAR sensor unit 3015 to detect the information.

As is obvious from the drawing, a part of the detectable area that the LiDAR sensor unit 3015 inherently has interferes with the extension member 3016. For regions where interference occurs, desired detection of the information cannot be performed. On the other hand, a chain line LS1 in the drawing indicates an outer edge of a detecting area of the LiDAR sensor unit 3015 that has been adjusted so as to avoid interfering with the extension member 3016. In this case, in a case where the detection light is passed through the translucent cover 3012 without taking any measures, the detectable area is narrowed.

Accordingly, there arises a need to consider the arrangement of the LiDAR sensor units 3015 so that a desired detectable area can be secured while suppressing the sense of discomfort in appearance. However, the space available in the lamp chamber 3013 is limited, and it is also necessary to consider interference with the lamp unit 3014 and the like. Accordingly, it is difficult to arrange the LiDAR sensor unit 3015 at an appropriate location without increasing the size of the lamp chamber 3013.

In the present embodiment, a lens portion 3017 is provided on an inner face 3012a of the translucent cover 3012. The lens portion 3017 has a light control surface 3017a. The light control surface 3017a is concave. The light control surface 3017a is formed of a material that can refract and transmit non-visible light used by the LiDAR sensor unit 3015 to detect the information.

Accordingly, the light emitted from the LiDAR sensor unit 3015 passes through the translucent cover 3012 while being refracted by the light control surface 3017a. As a result, a detectable area equivalent to the inherent detectable area indicated by the dashed chain lines LS0 is obtained outside the vehicle 100. The returning light based on the information of the area is refracted again by the light control surface 3017a when passing through the translucent cover 3012 and returns to the LiDAR sensor unit 3015.

In other words, the light control surface 3017a intentionally changes the traveling direction of the detection light used by the LiDAR sensor unit 3015 for detecting the information so as to secure a desired detectable area for LiDAR sensor unit 3015. The lens portion 3017 capable of controlling the traveling direction of light in this manner is provided on the inner face 3012a of the translucent cover 3012 forming the outer face of the vehicle 100. Since the degree of freedom in selecting the arrangement and the shape of the lens portion 3017 at that position is relatively high, the layout-related constraint on the LiDAR sensor unit 3015 in the lamp chamber 3013 can be alleviated.

Figure 23:
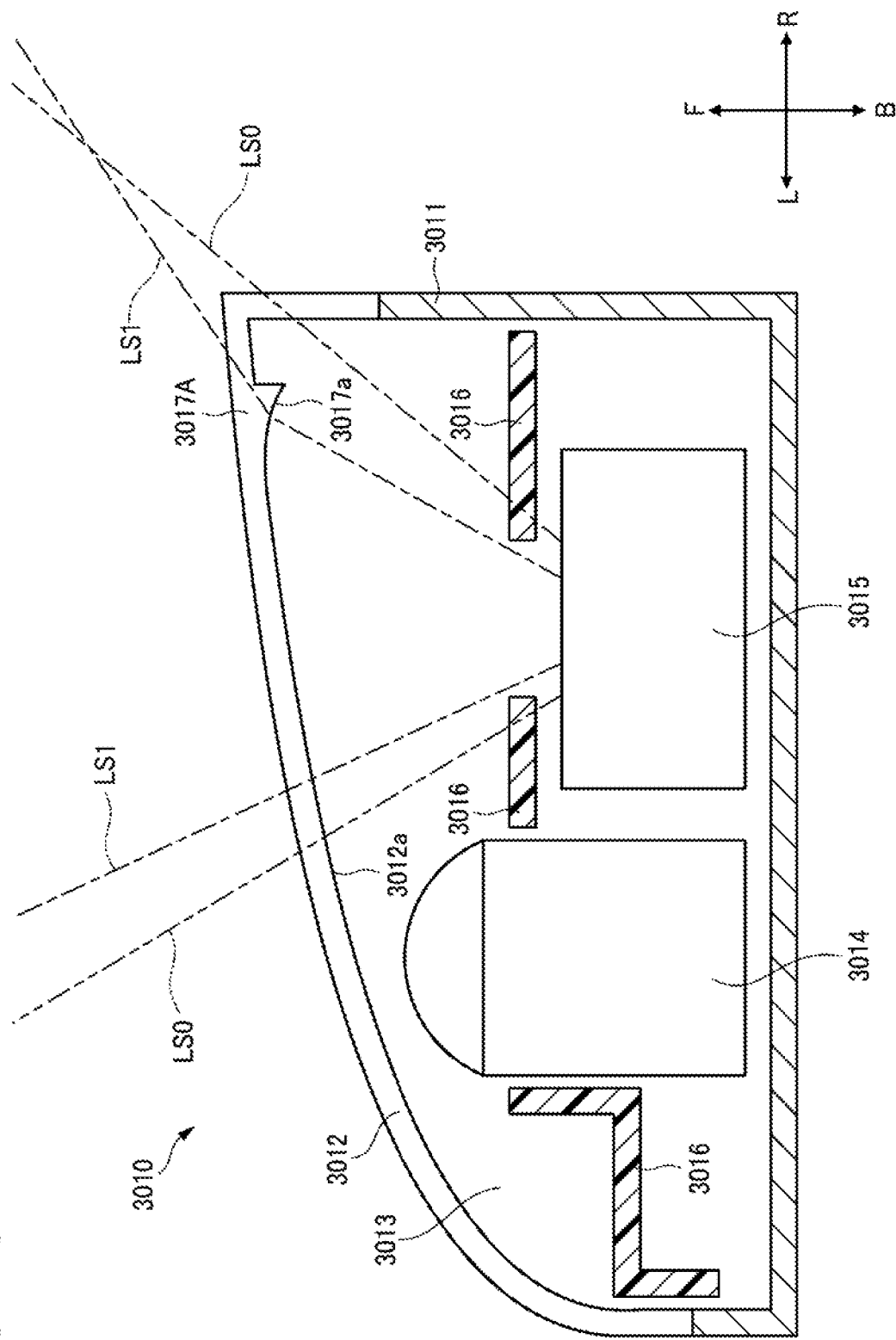
FIG. 23 schematically illustrates a modified example of the left front lamp device of FIG. 22.

There is no need for the LiDAR sensor unit 3015 to perform light control on all of the detection light used for detecting the information. The light control surface may be configured to perform light control on a portion of the detection light in accordance with a position and a range of a desired detectable area. FIG. 23 illustrates a lens portion 3017A according to a modified example having such a light control surface 3017a.

The position of the light control surface 3017a is determined so that the detectable area of the LiDAR sensor unit 3015 is located on the right of the inherent detectable area indicated by the dashed chain line LS0, that is, closer to the inside of the vehicle 100 relative to the left-right direction.

According to such a configuration, it is possible to secure a detectable area at a location closer to the inside of the vehicle relative to the left-right direction where it is relatively difficult to locate the detectable area, while alleviating the constraints on the layout of the LiDAR sensor unit 3015.

The configuration of the left front lamp device 3010 is also applicable to the left rear lamp device. The left rear lamp device is mounted on the left rear corner portion LB of the vehicle 100 illustrated in FIG. 2. The basic configuration of the left rear lamp device may be symmetrical with the left front lamp device 3010 relative to the front-rear direction. However, the specifications of the lamp unit 3014 and the LiDAR sensor unit 3015 may be appropriately changed.

The configuration of the left front lamp device 3010 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Detection light passing through an area located between the right chain line LS1 in FIG. 23 and the right dashed chain line LS0 in FIG. 23 cannot be used for detecting the information. Depending on the layout of the members in the lamp chamber 3013, it is possible to adopt a configuration that can efficiently utilize even such detection light.

Figure 24:
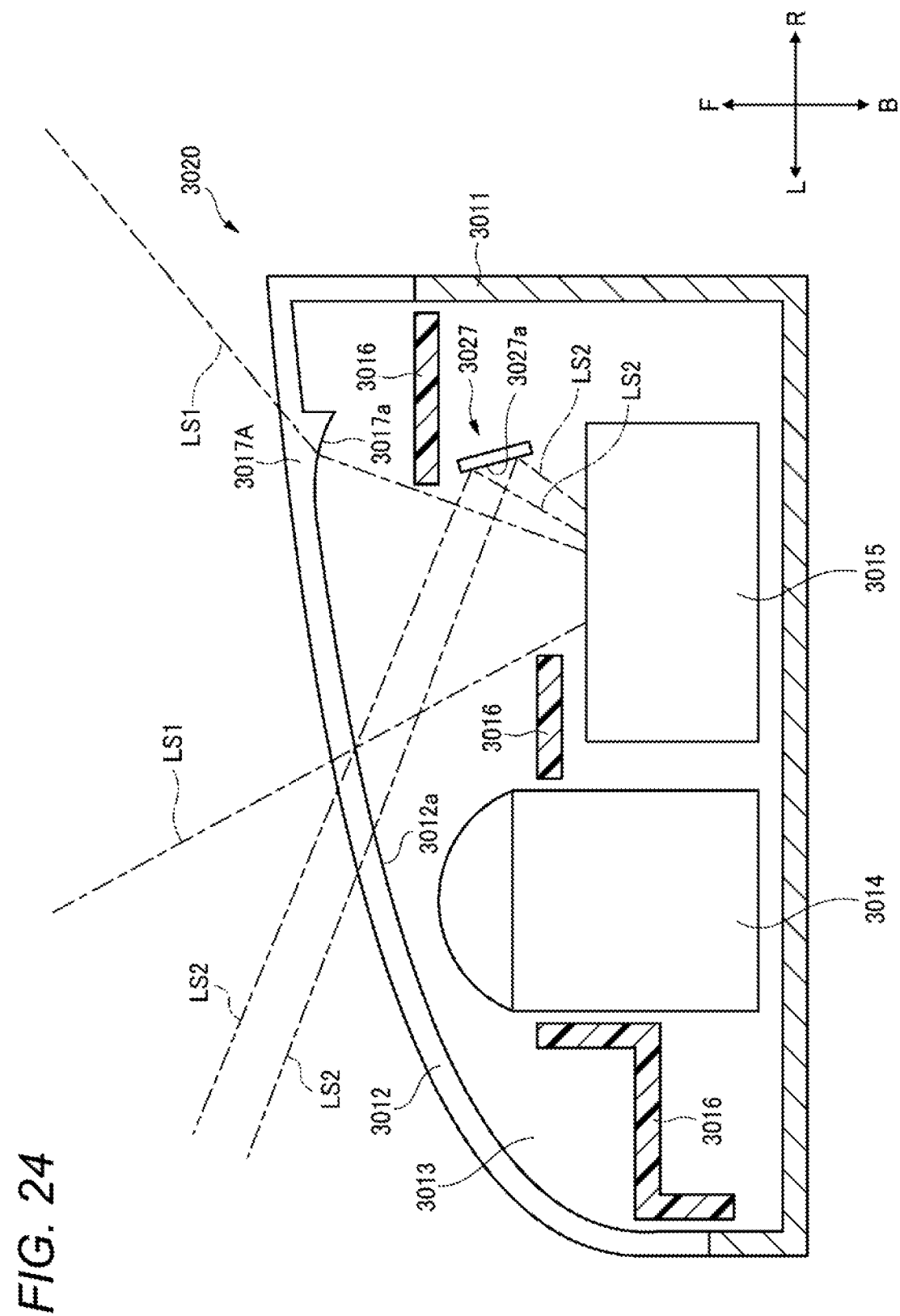
FIG. 24 schematically illustrates a configuration of a left front lamp device according to a tenth embodiment.

FIG. 24 illustrates a left front lamp device 3020 according to a tenth embodiment having such a configuration. The left front lamp device 3020 is mounted on the left front corner portion LF of the vehicle 100 illustrated in FIG. 2. A right front lamp device having a symmetrical configuration with the left front lamp device 3020 relative to the left-right direction is mounted on the right front corner portion RF of the vehicle 100. Components that are the same as or equivalent to those of the left front lamp device 3010 according to the ninth embodiment are assigned with the same reference numerals, and repetitive descriptions for those will be omitted.

The left front lamp device 3020 includes a reflector 3027. The reflector 3027 is disposed in a space located between the translucent cover 3012 and the LiDAR sensor unit 3015. The reflector 3027 has a light control surface 3027a. The light control surface 3027a is formed of a material that can reflect non-visible light used by the LiDAR sensor unit 3015 to detect the information.

Chain lines LS2 in FIG. 24 indicate outer edges of a part of the detectable area that the LiDAR sensor unit 3015 inherently has. Light emitted from the LiDAR sensor unit 3015 and passing through the area defined by the chain lines LS2 is reflected by the light control surface 3027a and passes through the translucent cover 3012. As a result, a detectable area that is different from the detectable area defined by the chain lines LS1 is obtained outside the vehicle 100. The returning light based on the information of the area is reflected by the light control surface 3027a after passing through the translucent cover 3012 and returns to the LiDAR sensor unit 3015.

In other words, the light control surface 3027a intentionally changes the traveling direction of the detection light used by the LiDAR sensor unit 3015 for detecting the information so as to secure a desired detectable area for LiDAR sensor unit 3015. The reflector 3027 capable of controlling the traveling direction of light in this manner is provided in the space located between the translucent cover 3012 and the LiDAR sensor unit 3015. Since the degree of freedom in selecting the arrangement and the shape of the reflector 3027 at that position is relatively high, the layout-related constraint on the LiDAR sensor unit 3015 in the lamp chamber 3013 can be alleviated.

In the case illustrated in FIG. 24, the detection light reflected by the light control surface 3027a of the reflector 3027 is excluded from the detectable area defined by the chain lines LS1 because it would otherwise interfere with the extension member 3016. Since such detection light can be reflected by the reflector 3027 to form another detectable area, the availability of the detection light of the LiDAR sensor unit 3015 can be enhanced.

As illustrated in the present example, depending on the position and range of the desired detectable area, a portion of the detection light reflected by the light control surface 3027a of the reflector 3027 may be subjected to further traveling direction control by the light control surface 3017a of the lens portion 3017A.

Depending on the desired position and range of the detectable area, the traveling direction of the detection light may be controlled only by the light control surface 3027a of the reflector 3027 without providing the lens portion 3017A.

The configuration of the left front lamp device 3020 is also applicable to the left rear lamp device. The left rear lamp device is mounted on the left rear corner portion LB of the vehicle 100 illustrated in FIG. 2. The basic configuration of the left rear lamp device may be symmetrical with the left front lamp device 3020 relative to the front-rear direction. However, the specifications of the lamp unit 3014 and the LiDAR sensor unit 3015 may be appropriately changed.

The configuration of the left front lamp device 3020 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

In the ninth embodiment and the tenth embodiment, the density of the detection light in the detectable area is uniform. For example, in a case where the information is detected by scanning the detection light, the scanning distance or the scanning angle (scanning pitch) per unit time within the detectable area is made constant. However, depending on the type of information desired, the detection light density can be locally changed within the detectable area. For example, in an area where more accurate information is required to be detected, the detection light density should be higher.

Figure 25:
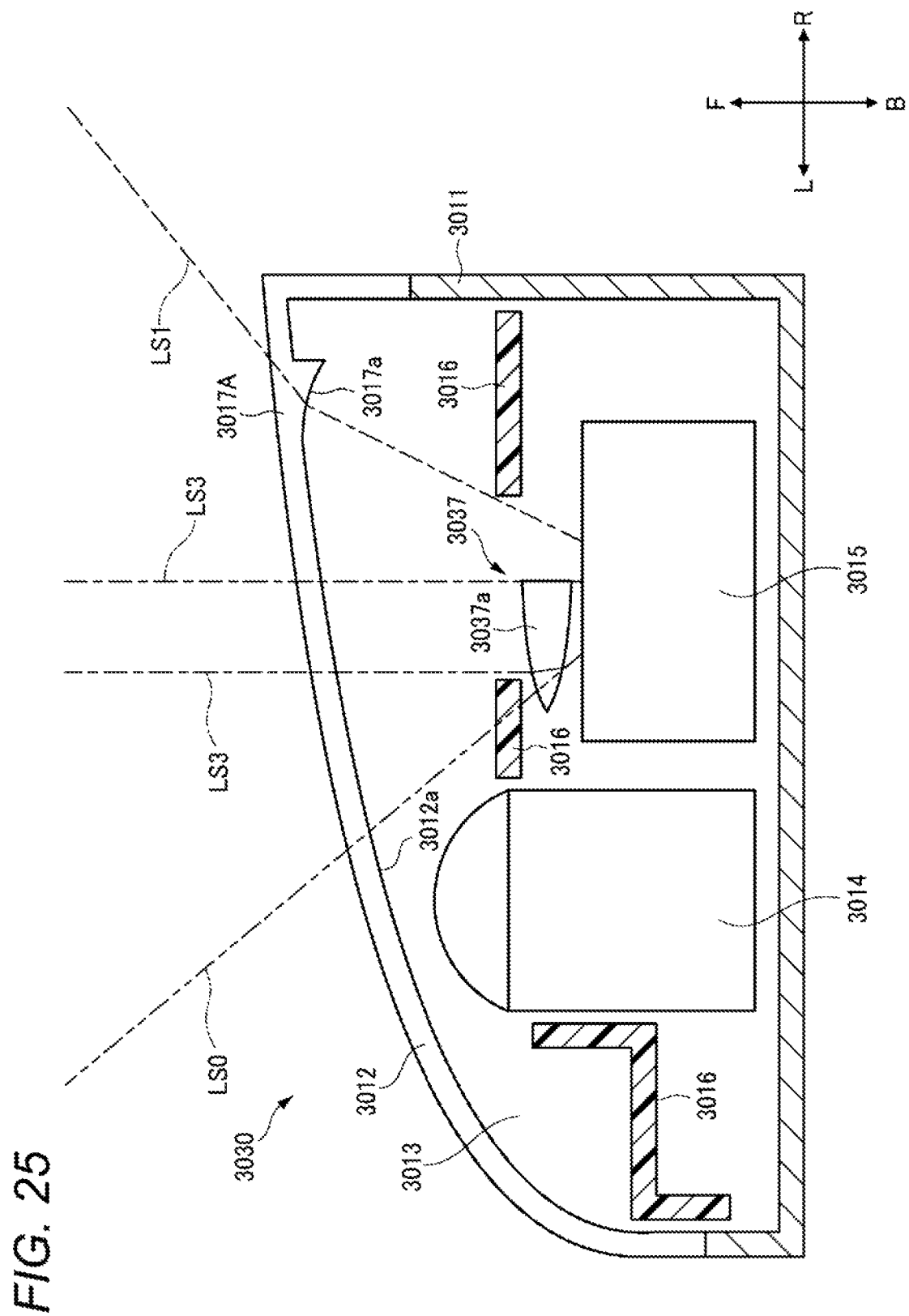
FIG. 25 schematically illustrates a configuration of a left front lamp device according to an eleventh embodiment.

FIG. 25 illustrates a left front lamp device 3030 according to an eleventh embodiment capable of performing such operation. The left front lamp device 3030 is mounted on the left front corner portion LF of the vehicle 100 illustrated in FIG. 2. A right front lamp device having a symmetrical configuration with the left front lamp device 3020 relative to the left-right direction is mounted on the right front corner portion RF of the vehicle 100. Components that are the same as or equivalent to those of the left front lamp device 3010 according to the ninth embodiment are assigned with the same reference numerals, and repetitive descriptions for those will be omitted.

The left front lamp device 3030 includes a lens 3037. The lens 3037 is disposed in a space located between the translucent cover 3012 and the LiDAR sensor unit 3015. The lens 3037 has a light control surface 3037a. The light control surface 3037a is convex. The light control surface 3037a is formed of a material that can refract and transmit non-visible light used by the LiDAR sensor unit 3015 to detect the information.

Accordingly, the light emitted from the LiDAR sensor unit 3015 passes through the translucent cover 3012 while being refracted by the light control surface 3037*a*. As a result, a detectable area indicated by the dashed chain lines LS3 is obtained outside the vehicle 100. The returning light based on the information of the area is refracted again by the light control surface 3037*a* when passing through the translucent cover 3012 and returns to the LiDAR sensor unit 3015.

In other words, the light control surface 3037*a* intentionally changes the traveling direction of the detection light used by the LiDAR sensor unit 3015 for detecting the information so as to secure a desired detectable area for LiDAR sensor unit 3015. The lens 3037 capable of controlling the traveling direction of light in this manner is provided in the space located between the translucent cover 3012 and the LiDAR sensor unit 3015. Since the degree of freedom in selecting the arrangement and the shape of the lens 3037 at that position is relatively high, the layout-related constraint on the LiDAR sensor unit 3015 in the lamp chamber 3013 can be alleviated.

The dashed chain line LS0 in FIG. 25 indicates an outer edge of an detectable area that the LiDAR sensor unit 3015 inherently has. That is, a part of the detectable area that the LiDAR sensor unit 3015 inherently has interferes with the extension member 3016 and unavailable. In the present embodiment, a part of such detection light is utilized to form a detectable area having a high detection light density, i.e., the area defined by the chain lines LS3. Accordingly, the availability of the detection light of the LiDAR sensor unit 3015 can be enhanced.

In a case where the LiDAR sensor unit 3015 includes a mechanism for scanning the detection light, the scanning distance or the scanning pitch per unit time of the mechanism need not be changed in order to form the detectable area with a high detection light density as described above. A state where the scanning pitch is apparently small can be established by merely causing the detection light to pass through the lens 3037 while maintaining the scanning pitch of the mechanism. Accordingly, the load related to the operation control of the LiDAR sensor unit 3015 can be reduced while forming the detectable range in which the detection light densities are not uniform.

Depending on the desired position and range of the detectable area, the traveling direction of the detection light may be controlled only by the light control surface 3037*a* of the lens 3037 without providing the lens portion 3017A.

The configuration of the left front lamp device 3030 is also applicable to the left rear lamp device. The left rear lamp device is mounted on the left rear corner portion LB of the vehicle 100 illustrated in FIG. 2. The basic configuration of the left rear lamp device may be symmetrical with the left front lamp device 3030 relative to the front-rear direction. However, the specifications of the lamp unit 3014 and the LiDAR sensor unit 3015 may be appropriately changed.

The configuration of the left front lamp device 3030 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Figure 26:
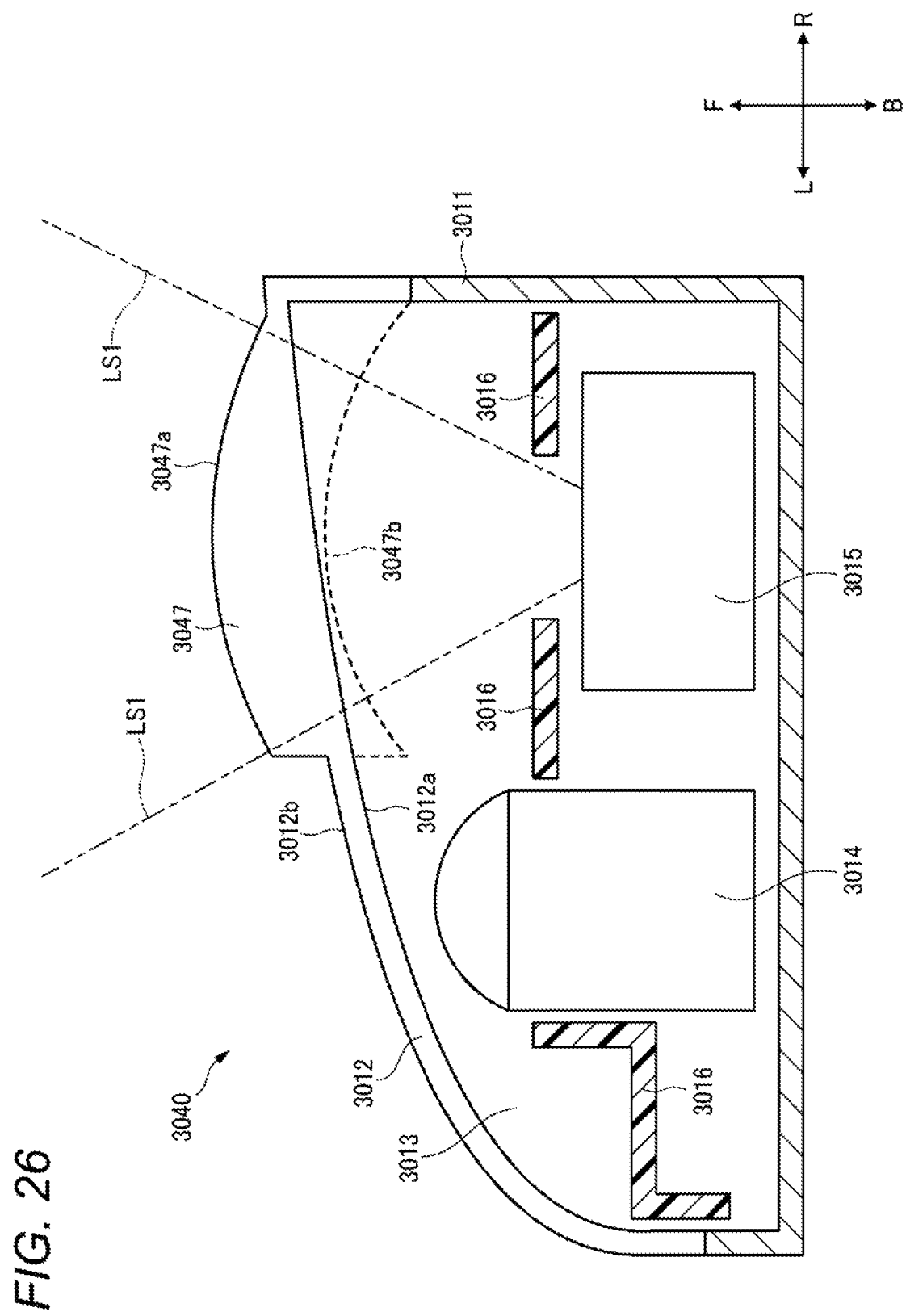
FIG. 26 schematically illustrates a configuration of a left front lamp device according to a twelfth embodiment.

FIG. 26 illustrates a left front lamp device 3040 according to a twelfth embodiment. The left front lamp device 3040 is mounted on the left front corner portion LF of the vehicle 100 illustrated in FIG. 2. A right front lamp device having a symmetrical configuration with the left front lamp device 3040 relative to the left-right direction is mounted on the right front corner portion RF of the vehicle 100. Components that are the same as or equivalent to those of the left front lamp device 3010 according to the ninth embodiment are assigned with the same reference numerals, and repetitive descriptions for those will be omitted.

The left front lamp device 3040 includes a lens portion 3047. The lens portion 3047 is provided on an outer face 3012*b* of the translucent cover 3012. The lens portion 3047 has a light control surface 3047*a*. The light control surface 3047*a* is a convex surface having an arcuate portion with a constant curvature. More specifically, the center of curvature of the arcuate portion coincides with the light source or the center of scan of the LiDAR sensor unit 3015. The light control surface 3047*a* is formed of a material capable of transmitting non-visible light used by the LiDAR sensor unit 3015 to detect the information.

The outer face 3012*b* of the translucent cover 3012 has a shape based on the design of the vehicle 100. The shape is independent of the light source or the center of scan of the LiDAR sensor unit 3015. Accordingly, when the detection light of the LiDAR sensor unit 3015 passes through the translucent cover 3012, the detection light is slightly refracted in accordance with the change of the medium. However, according to the configuration of the present embodiment, the light emitted from the LiDAR sensor unit 3015 passes through the light control surface 3047*a* without being refracted. The returning light based on the information of the detectable area passes through the light control surface 3047*a* again without being refracted, and returns to the LiDAR sensor unit 3015. Since distortion caused by the traveling of the detection light can be reduced, the detection accuracy of the LiDAR sensor unit 3015 can be enhanced.

The light control surface 3047*a* maintains the traveling direction of the detection light used by the LiDAR sensor unit 3015 to detect the information. However, as compared with a case where the light control surface 3047*a* is absent, the traveling direction of the detection light seems to be intentionally changed so that the detection accuracy of the LiDAR sensor unit 3015 is enhanced. The lens portion 3047 capable of controlling the traveling direction of light in this manner is provided on the outer face 3012*b* of the translucent cover 3012 forming the outer face of the vehicle 100. Since the degree of freedom in selecting the arrangement and the shape of the lens portion 3047 at that position is relatively high, the layout-related constraint on the LiDAR sensor unit 3015 in the lamp chamber 3013 can be alleviated.

In order to further suppress the distortion of the detection light caused by the passage of the translucent cover 3012, a light control surface 3047*b* may be additionally formed on the inner face 3012*a* of the translucent cover 3012, as indicated by the dashed line in FIG. 26. The light control surface 3047*b* is a concave surface having an arcuate portion with a constant curvature. More specifically, the center of curvature of the arcuate portion coincides with the light source or the center of scan of the LiDAR sensor unit 3015.

Instead of the light control surface 3047*a*, a configuration in which only the light control surface 3047*b* is provided on the translucent cover 3012 may be employed.

The configuration of the left front lamp device 3040 is also applicable to the left rear lamp device. The left rear lamp device is mounted on the left rear corner portion LB of the vehicle 100 illustrated in FIG. 2. The basic configuration of the left rear lamp device may be symmetrical with respect to the left front lamp device 3040 relative to the front-rear direction. However, the specifications of the lamp unit 3014 and the LiDAR sensor unit 3015 may be appropriately changed.

The configuration of the left front lamp device 3040 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Figure 27:
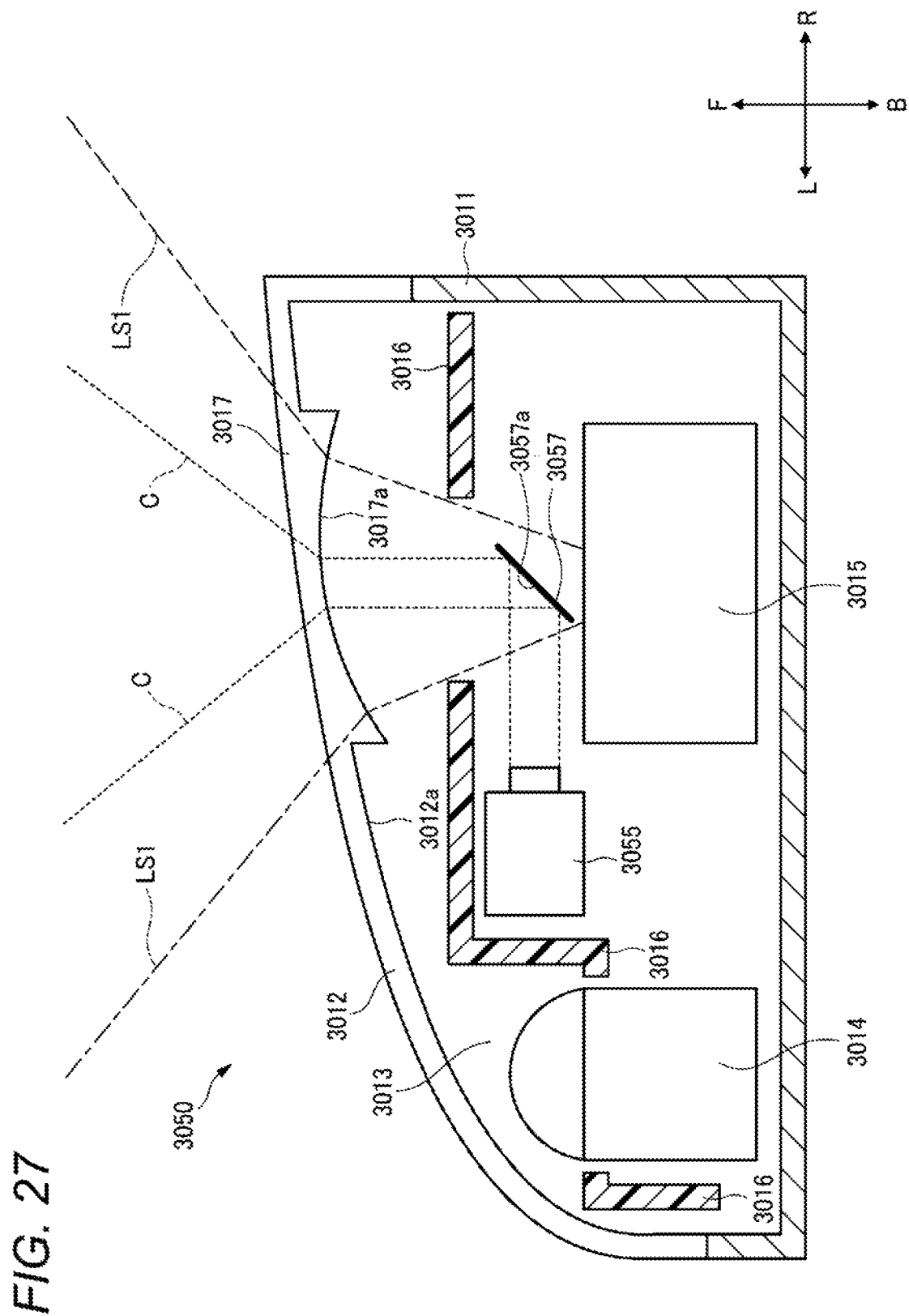
FIG. 27 schematically illustrates a configuration of a left front lamp device according to a thirteenth embodiment.

FIG. 27 illustrates a left front lamp device 3050 according to a thirteenth embodiment. The left front lamp device 3050 is mounted on the left front corner portion LF of the vehicle 100 illustrated in FIG. 2. A right front lamp device having a symmetrical configuration with the left front lamp device 3050 relative to the left-right direction is mounted on the right front corner portion RF of the vehicle 100. Components that are the same as or equivalent to those of the left front lamp device 3010 according to the ninth embodiment are assigned with the same reference numerals, and repetitive descriptions for those will be omitted.

The left front lamp device 3050 includes a camera unit 3055. The camera unit 3055 is disposed in the lamp chamber 3013. The camera unit 3055 is a device for acquiring image information of an area including ahead of the vehicle 100. That is, the camera unit 3055 is an example of a sensor unit. In FIG. 27, a range defined by dashed lines C represent a detectable area of the camera unit 3055.

The camera unit 3055 outputs a signal corresponding to the acquired image information. The image information is acquired by appropriately processing a signal outputted from the camera unit 3055 by an information processing unit (not illustrated). The information processing unit may be provided in the left front lamp device 3050 or may be installed in the vehicle 100.

The left front lamp device 3050 includes a beam splitter 3057. The beam splitter 3057 includes a light control surface 3057*a*. The light control surface 3057*a* is formed of a material that allows the LiDAR sensor unit 3015 to pass non-visible light used for information detection, and reflects visible light used for information detection by the camera unit 3055 in a predetermined direction.

Accordingly, the light emitted from the LiDAR sensor unit 3015 passes through the light control surface 3057*a* of the beam splitter 3057, and reaches the light control surface 3017*a* provided on the translucent cover 3012. The light passes through the translucent cover 3012 while being refracted by the light control surface 3017*a*. The return light based on the information of the detectable area is refracted again by the light control surface 3017*a* when passing through the translucent cover 3012, then passes through the light control surface 3057*a* and finally returns to the LiDAR sensor unit 3015.

On the other hand, light coming from the detectable area defined by the dashed lines C enters the lamp chamber 3013 while being refracted by the light control surface 3017*a* when passing through the translucent cover 3012. The light is reflected by the light control surface 3057*a* of the beam splitter 3057, and reaches the camera unit 3055.

In other words, the light control surface 3017*a* intentionally changes the traveling direction of the detection light used by the camera unit 3055 to detect the information so as to secure a desired detection range for the camera unit 3055. On the other hand, such a light control surface 3017*a* is shared by the LiDAR sensor unit 3015 and the camera unit 3055. The light control surface 3057*a* intentionally changes the traveling direction of the detection light used by the camera unit 3055 to detect the information so that a desired detection range can be secured for the camera unit 3055 without obstructing the information detection by the LiDAR sensor unit 3015. The beam splitter 3057 capable of controlling the traveling directions of light in this manner is provided in a space located between the translucent cover 3012 and the LiDAR sensor unit 3015. Since the degree of freedom in selecting the arrangement and the shape of the beam splitter 3057 at that position is relatively high, it is possible to alleviate the layout-related constraint on the sensors to be disposed in the lamp chamber so as to share the light control surface provided on the translucent cover 3012.

Depending on the arrangement of the LiDAR sensor unit 3015 and the camera unit 3055, the configuration of the beam splitter 3057 may be changed. That is, the light control surface 3057*a* may be formed of a material that allows visible light used for information detection by the camera unit 3055 to pass, and reflects non-visible light used for information detection by the LiDAR sensor unit 3015 in a predetermined direction.

The configuration of the left front lamp device 3050 is also applicable to the left rear lamp device. The left rear lamp device is mounted on the left rear corner portion LB of the vehicle 100 illustrated in FIG. 2. The basic configuration of the left rear lamp device may be symmetrical with respect to the left front lamp device 3050 relative to the front-rear direction. However, the specifications of the lamp unit 3014 and the LiDAR sensor unit 3015 may be appropriately changed.

The configuration of the left front lamp device 3050 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Figure 28:
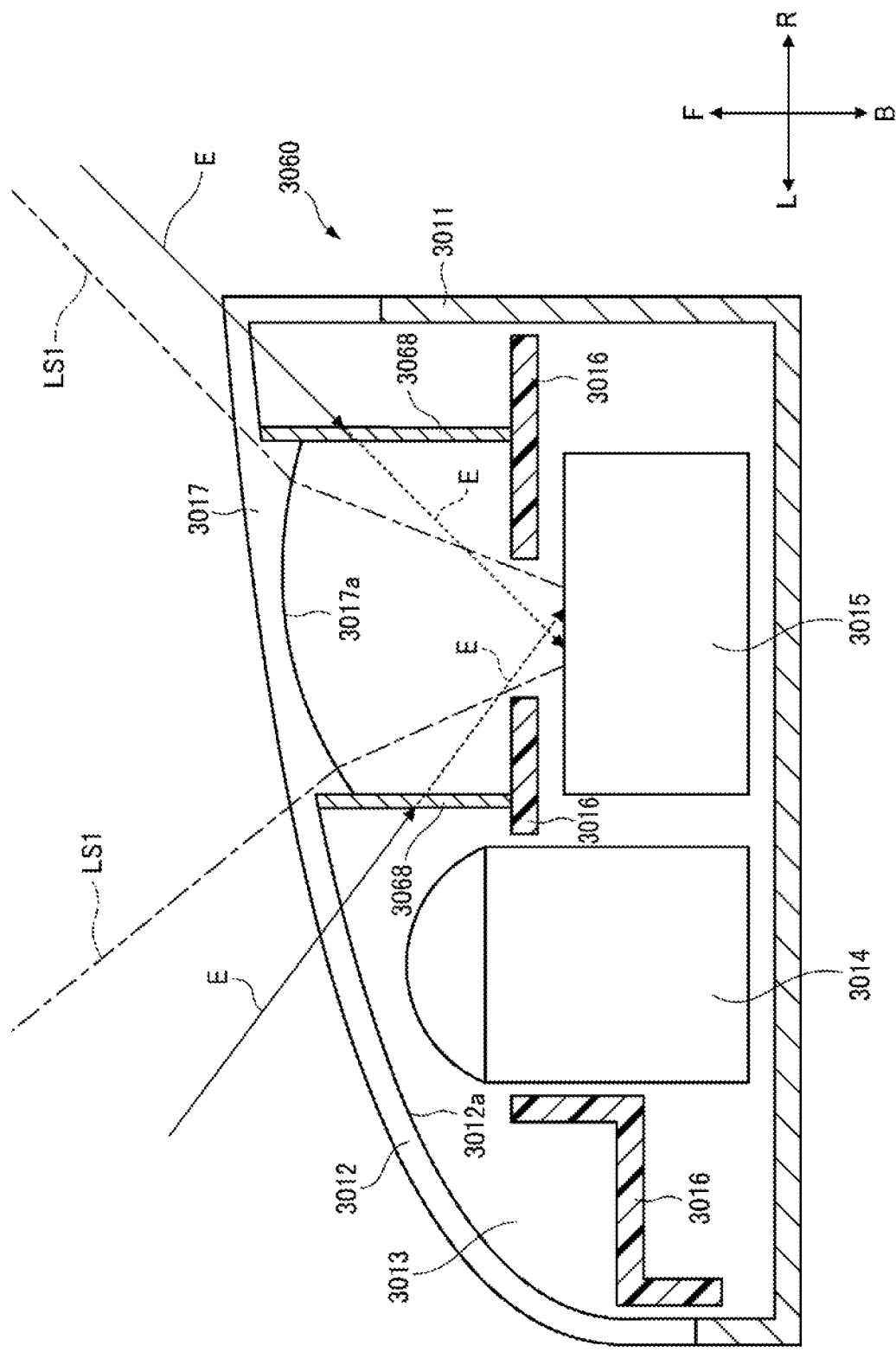
FIG. 28 schematically illustrates a configuration of a left front lamp device according to a fourteenth embodiment.

FIG. 28 illustrates a left front lamp device 3060 according to a fourteenth embodiment. The left front lamp device 3060 is mounted on the left front corner portion LF of the vehicle 100 illustrated in FIG. 2. A right front lamp device having a symmetrical configuration with the left front lamp device 3060 relative to the left-right direction is mounted on the right front corner portion RF of the vehicle 100. Components that are the same as or equivalent to those of the left front lamp device 3010 according to the ninth embodiment are assigned with the same reference numerals, and repetitive descriptions for those will be omitted.

The left front lamp device 3060 includes a light shielding member 3068. The light shielding member 3068 is disposed in the lamp chamber 3013. The light shielding member 3068 is disposed so as to surround at least a part of an optical path of the detecting light extending between the LiDAR sensor unit 3015 and the lens portion 3017. The light shielding member 3068 is formed of a material that suppresses or blocks passage of light having at least the same wavelength as the detection light. Examples of such materials include metal whose surface has been oxidized, and graphite.

Due to various causes, disturbance light E would reach the LiDAR sensor unit 3015 without passing through the light control surface 3017*a*. The disturbance light E may come from the outside of the translucent cover 3012, or may be generated by internal reflection of the translucent cover 3012. When the disturbance light E has the same wavelengths as the detection light and reaches the LiDAR sensor unit 3015 as indicated by the dashed lines in FIG. 28, information that should not be detected would be acquired. As illustrated by solid lines in FIG. 28, the light shielding member 3068 is provided so as to suppress or block the passage of such disturbance light E.

According to such a configuration, it is easy to prevent the LiDAR sensor unit 3015 from detecting erroneous information or deteriorating the accuracy of the detected information due to the disturbance light E.

The configuration of the left front lamp device 3060 is also applicable to the left rear lamp device. The left rear lamp device is mounted on the left rear corner portion LB of the vehicle 100 illustrated in FIG. 2. The basic configuration of the left rear lamp device may be symmetric with the left front lamp device 3060 relative to the front-rear direction. However, the specifications of the lamp unit 3014 and the LiDAR sensor unit 3015 may be appropriately changed.

The configuration of the left front lamp device 3060 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

Figure 29:
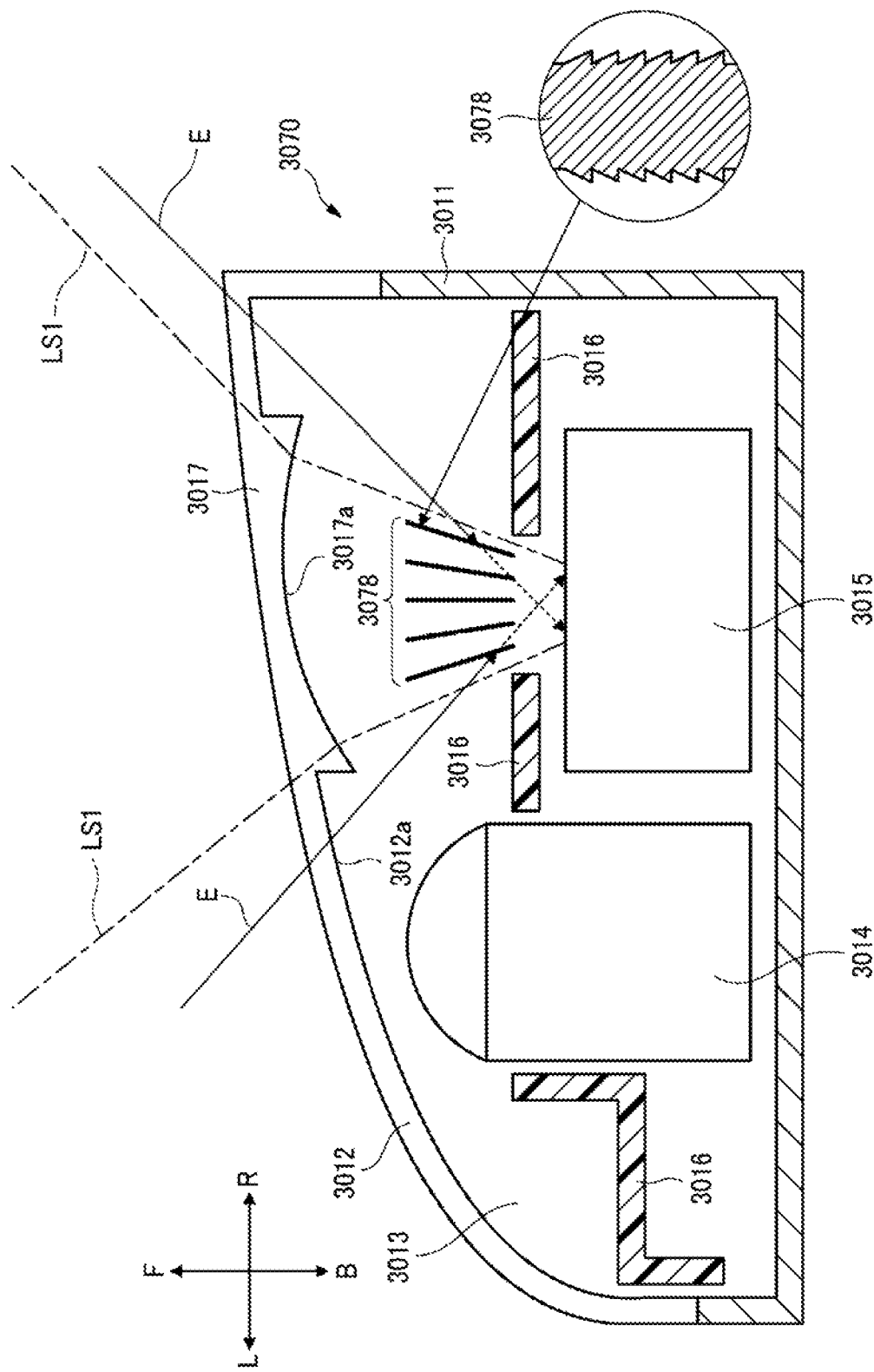
FIG. 29 schematically illustrates a configuration of a left front lamp device according to a fifteenth embodiment.

FIG. 29 illustrates a left front lamp device 3070 according to a fifteenth embodiment. The left front lamp device 3070 is mounted on the left front corner portion LF of the vehicle 100 illustrated in FIG. 2. A right front lamp device having a configuration symmetrical with the left front lamp device 3070 relative to the left-right direction is mounted on the right front corner portion RF of the vehicle 100. Components that are the same as or equivalent to those of the left front lamp device 3010 according to the ninth embodiment are assigned with the same reference numerals, and repetitive descriptions for those will be omitted.

The left front lamp device 3070 includes a plurality of light shielding members 3078. Each light shielding member 3078 is disposed in the lamp chamber 3013. The light shielding members 3078 are disposed on an optical path of the detecting light extending between the LiDAR sensor unit 3015 and the lens portion 3017. Each light shielding member 3078 extends along the traveling direction of the detection light. Each of the light shielding members 3078 is formed of a material that suppresses or blocks passage of light having at least the same wavelength as the detection light. Examples of such materials include metal whose surface has been oxidized, and graphite.

Due to various causes, disturbance light E would reach the LiDAR sensor unit 3015 without passing through the light control surface 3017a. The disturbance light E may come from the outside of the translucent cover 3012, or may be generated by internal reflection of the translucent cover 3012. When the disturbance light E has the same wavelengths as the detection light and reaches the LiDAR sensor unit 3015 as indicated by the dashed lines in FIG. 29, information that should not be detected would be acquired. As illustrated by solid lines in FIG. 29, each light shielding member 3078 is provided so as to suppress or block the passage of such disturbance light E without obstructing the travel of the detection light.

According to such a configuration, it is easy to prevent the LiDAR sensor unit 3015 from detecting erroneous information or deteriorating the accuracy of the detected information due to the disturbance light E.

As illustrated in an enlarged view, fine unevenness may be formed on the surface of each light shielding member 3078. The disturbance light E may be reflected by such a surface structure in a direction different from the traveling direction of the detection light. Even in a case where a part of the disturbance light E is reflected in the same direction as the traveling direction of the detection light, since the strength thereof is reduced, the LiDAR sensor unit 3015 can distinguish the information based on the detection light from the information based on the disturbance light E.

The configuration of the left front lamp device 3070 is also applicable to the left rear lamp device. The left rear lamp device is mounted on the left rear corner portion LB of the vehicle 100 illustrated in FIG. 2. The basic configuration of the left rear lamp device may be symmetric to the left front lamp device 3070 relative to the front-rear direction. However, the specifications of the lamp unit 3014 and the LiDAR sensor unit 3015 may be appropriately changed.

The configuration of the left front lamp device 3070 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

In the ninth embodiment to the fifteenth embodiment, the LiDAR sensor unit 3015 is disposed in the lamp chamber 3013. However, the lamp unit 3014 is not necessarily disposed in the housing chamber defined by the housing 3011 and the translucent cover 3012.

Figure 30:
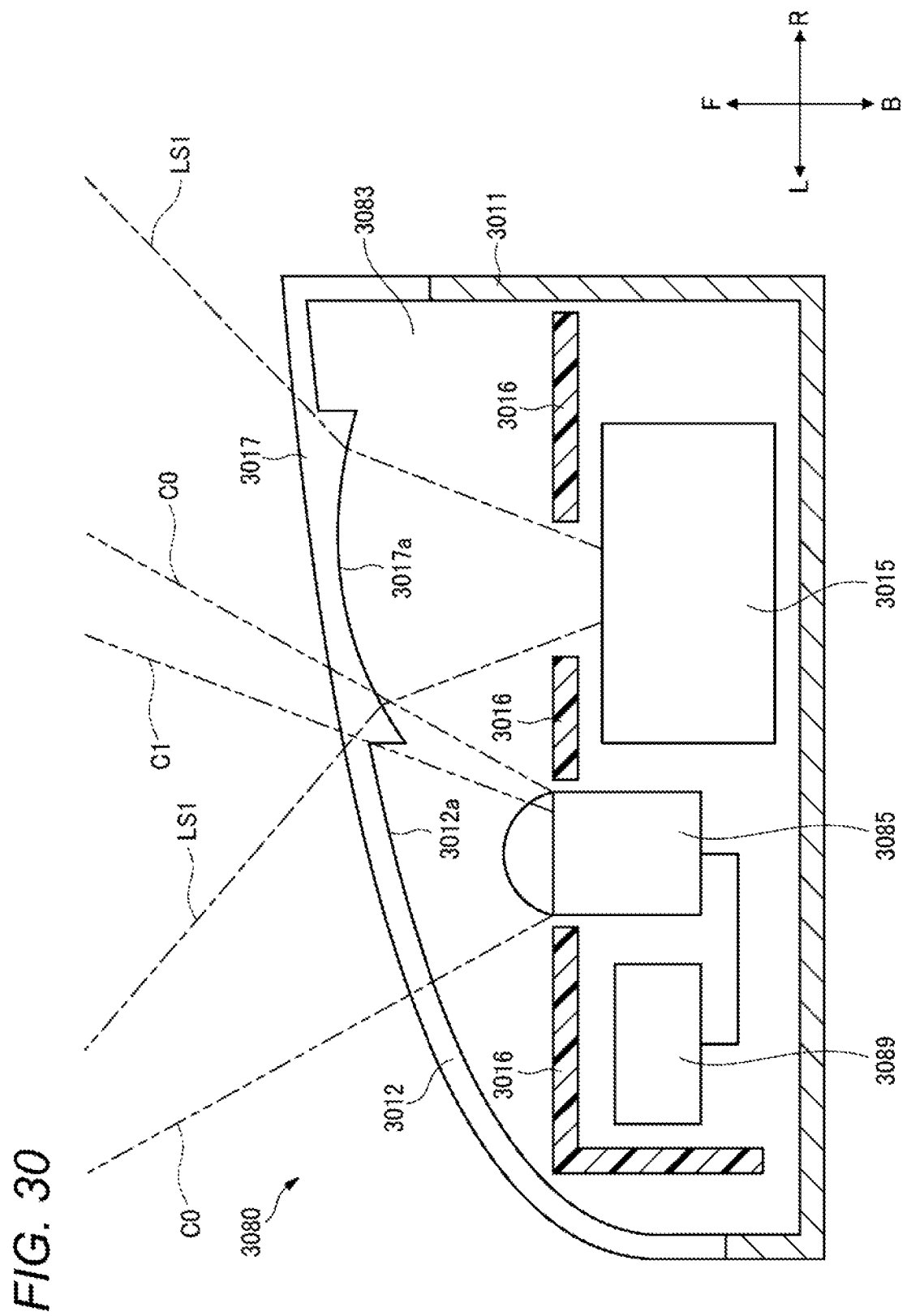
FIG. 30 schematically illustrates a configuration of a left front lamp device according to a sixteenth embodiment.

FIG. 30 illustrates a left front sensor device 3080 according to a sixteenth embodiment. The left front sensor device 3080 is mounted in the vicinity of the left front lamp device that is installed in the left front corner portion LF of the vehicle 100 illustrated in FIG. 2. In the vicinity of the right front lamp device in the right front corner portion RF of the vehicle 100, a right front sensor device having a configuration symmetrical with the left front sensor device 3080 relative to the left-right direction is mounted. Components that are the same as or equivalent to those of the left front lamp device 3010 according to the ninth embodiment are assigned with the same reference numerals, and repetitive descriptions for those will be omitted.

In the left front sensor device 3080, a housing chamber 3083 is defined by a housing 3011 and a translucent cover 3012. A LiDAR sensor unit 3015 and a camera unit 3085 are housed in the housing chamber 3083. The camera unit 3085 is a device for acquiring image information of an area including ahead of the vehicle 100. That is, the camera unit 3085 is an example of a sensor unit. In FIG. 30, a range defined by dashed chain lines CO represents a detectable area of the camera unit 3085.

The camera unit 3085 outputs a signal corresponding to the acquired image information. The image information is acquired by appropriately processing a signal outputted from the camera unit 3085 by an information processing unit (not illustrated). The information processing unit may be provided in the left front sensor device 3080, or may be installed in the vehicle 100.

The light control surface 3017a intentionally changes the traveling direction of the detection light used by the LiDAR sensor unit 3015 for detecting the information so as to secure a desired detectable area for LiDAR sensor unit 3015. The lens portion 3017 capable of controlling the traveling direction of light in this manner is provided on the inner face 3012a of the translucent cover 3012 forming the outer face of the vehicle 100. Since the degree of freedom in selecting the arrangement and the shape of the lens portion 3017 at that position is relatively high, the layout-related constraint on the LiDAR sensor unit 3015 in the housing chamber 3083 can be alleviated.

As illustrated in FIG. 30, the lens portion 3017 is located in a part of the detectable range of the camera unit 3085, which is a range defined by the right dashed chain line C0 and a dashed chain line C1. In the image corresponding to this portion, distortion corresponding to the shape of the lens portion 3017 is generated.

The left front sensor device 3080 includes a corrector 3089. The corrector 3089 can communicate with the camera unit 3085 and the information processing unit described above. The corrector 3089 may be configured by a dedicated device such as an ASIC or an FPGA, or may be a function realized by a processor and a memory included in the information processing unit described above.

The corrector 3089 is configured to perform processing for correcting image distortion caused by the lens portion 3017. Specifically, the processing for correcting image distortion is applied to a signal outputted from the camera unit 3085 or image information acquired by the information processing unit. Since the optical positional relationship between the camera unit 3085 and the lens portion 3017 is constant, a signal or information that needs to be corrected and a correction amount can be determined in advance. The corrector 3089 applies the predetermined correction amount to a predetermined correction target.

According to such a configuration, it is possible to alleviate the layout-related constraint caused by the presence of the light control surface used by the first sensor unit (in this example, the LiDAR sensor unit 3015) on the second sensor unit to be disposed in the housing chamber (in this example, the camera unit 3085).

The configuration of the left front sensor device 3080 is also applicable to the left rear sensor device. The left rear sensor device is mounted in the vicinity of the left rear lamp device that is installed in the left rear corner portion LB of the vehicle 100 illustrated in FIG. 2. The basic configuration of the left rear sensor device may be symmetric with the left-front sensor device 3080 relative to the front-rear direction. However, the specifications of the LiDAR sensor unit 3015 and the camera unit 3085 may be appropriately changed.

The configuration of the left front sensor device 3080 is also applicable to the right rear sensor device. The right rear sensor device is mounted in the vicinity of the right rear lamp device that is installed in the right rear corner portion RB of the vehicle 100 illustrated in FIG. 2. The basic configuration of the right rear sensor device is symmetrical with the above-mentioned left rear sensor device relative to the left-right direction.

The ninth to sixteenth embodiments described above are merely examples to facilitate understanding of the presently disclosed subject matter. The configurations according to the ninth embodiment to the sixteenth embodiment can be appropriately modified or improved without departing from the gist of the presently disclosed subject matter. The configurations described with reference to the ninth embodiment to the sixteenth embodiment can be combined or replaced with each other.

In the ninth embodiment to the sixteenth embodiment, the lens portion 3017 or the lens portion 3017A is provided on the inner face 3012a of the translucent cover 3012. However, an individual optical member having an equivalent optical function may be disposed in the lamp chamber 3013 or the housing chamber 3083.

In the ninth embodiment to the sixteenth embodiment, the light control surface 3017a of the lens portion 3017 or the lens portion 3017A is a continuous curved surface. However, the light control surface 3017a may be a surface arranged such that a large number of fine steps realize an equivalent optical function.

As for an embodiment in which the light control surface is not shared with the camera unit, the LiDAR sensor unit 3015 may be replaced with a millimeter wave radar unit. The millimeter wave is an example of detection light. The millimeter wave radar unit has a configuration for transmitting a millimeter wave and a configuration for receiving a reflection wave resulting from the millimeter wave being reflected by an object existing outside the vehicle 100. Examples of frequencies of millimeter waves include 24 GHz, 26 GHz, 76 GHz, and 79 GHz.

The millimeter wave radar unit can obtain the distance to the object associated with the reflected wave, for example, based on the time period from the time when the millimeter wave is transmitted in a certain direction to the time when the reflected wave is received. In addition, by accumulating such distance data in association with the detecting position, it is possible to acquire information as to the shape of the object associated with the reflection wave. That is, the millimeter wave radar unit is an example of a sensor unit that detects external information of the vehicle 100.

The millimeter wave radar unit outputs signals corresponding to the attributes of the detected reflection wave, such as intensities and wavelengths. The above information is obtained by appropriately processing a signal outputted from the millimeter wave radar unit by an information processing unit (not illustrated).

In the embodiment in which the light control surface is not shared with the camera unit, the portion where the lens portion 3017 or the lens portion 3017A is provided is not required to be transparent for the visible light range. An appropriate material can be selected according to the wavelength of the detection light used for detecting the information. For example, when a millimeter wave radar unit is used, polyethylene that does not transmit visible light and near infrared light can be selected.

In the above embodiments, the LiDAR sensor unit 3015 may be replaced with an infrared camera unit. The infrared camera unit is an example of a sensor unit that detects the external information of the vehicle 100.

Figure 31:
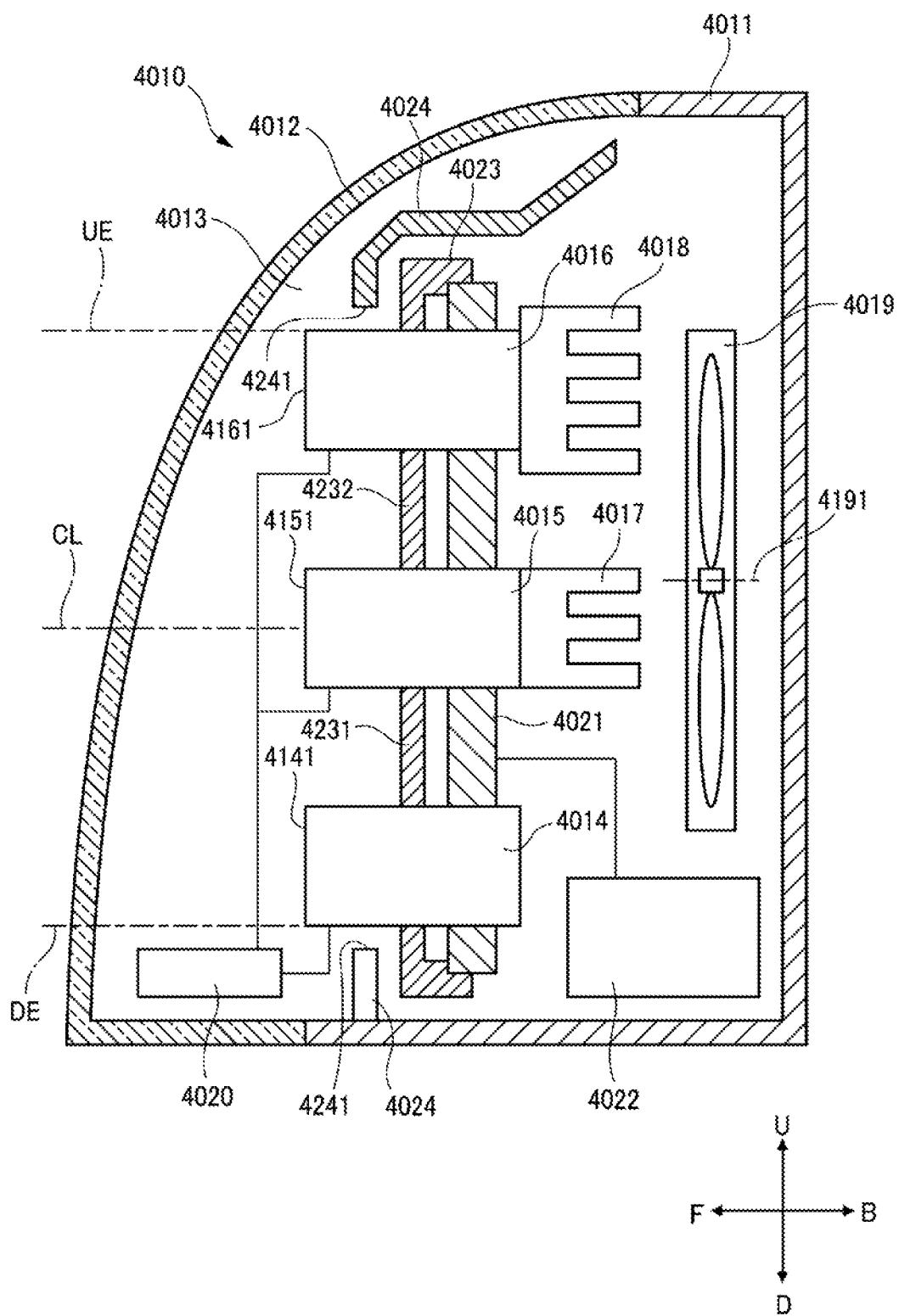
FIG. 31 schematically illustrates a configuration of a sensor system according to a seventeenth embodiment.

FIG. 31 schematically illustrates a configuration of a left front sensor system 4010 according to a seventeenth embodiment. The left front sensor system 4010 is mounted on the left front corner portion LF of the vehicle 100 illustrated in FIG. 2. A right front sensor system having a configuration symmetrical with the left front sensor system 4010 relative to the left-right direction is mounted on the right front corner portion RF of the vehicle 100.

For the present embodiment, the direction represented by the arrow U or the arrow D is defined as a first direction. For this embodiment, the direction orthogonal to the first direction, that is arrow L, arrow R, arrow F, or the direction represented by arrow B are defined as a second direction.

The left front sensor system 4010 includes a housing 4011 and a translucent cover 4012. The translucent cover 4012 forms a part of the outer face of the vehicle 100. The translucent cover 4012 defines a housing chamber 4013 together with the housing 4011.

The left front sensor system 4010 includes a camera unit 4014. The camera unit 4014 is disposed in the housing chamber 4013. The camera unit 4014 is a device for acquiring image information of an area including ahead of the vehicle 100. The front of the vehicle 100 is an example of the outside of the vehicle. That is, the camera unit 4014 is an example of a sensor unit.

The camera unit 4014 outputs a signal corresponding to the acquired image information. The image information is acquired by appropriately processing a signal outputted from the camera unit 4014 by an information processing unit (not illustrated). The information processing unit may be provided in the left front sensor system 4010, or may be installed in the vehicle 100.

The left front sensor system 4010 includes a millimeter wave radar unit 4015. The millimeter wave radar unit 4015 is disposed in the housing chamber 4013. The millimeter wave radar unit 4015 has a configuration for transmitting a millimeter wave and a configuration for receiving a reflection wave resulting from the millimeter wave being reflected by an object existing at least ahead of the vehicle 100. Examples of frequencies of millimeter waves include 24 GHz, 26 GHz, 76 GHz, and 79 GHz.

The millimeter wave radar unit 4015 can obtain the distance to the object associated with the reflected wave, for example, based on the time period from the time when the millimeter wave is transmitted in a certain direction to the time when the reflected wave is received. In addition, by accumulating such distance data in association with the detecting position, it is possible to acquire information as to the shape of the object associated with the reflection wave. That is, the millimeter wave radar unit 4015 is an example of a sensor unit.

The millimeter wave radar unit 4015 outputs signals corresponding to the attributes of the detected reflection wave, such as intensities and wavelengths. The above information is acquired by appropriately processing a signal outputted from the millimeter wave radar unit 4015 by an information processing unit (not illustrated). The information processing unit may be provided in the left front sensor system 4010, or may be installed in the vehicle 100.

The left front sensor system 4010 includes a LiDAR sensor unit 4016. The LiDAR sensor unit 4016 is disposed in the housing chamber 4013. The LiDAR sensor unit 4016 has a configuration for emitting non-visible light and a configuration for detecting return light as a result of the non-visible light being reflected by an object existing at least ahead of the vehicle 100. As required, the LiDAR sensor unit 4016 may include a scan device that sweeps the non-visible light to change the light emitting direction (i.e., the detecting direction). In the present embodiment, infrared light having a wavelength of 905 nm is used as the non-visible light.

The LiDAR sensor unit 4016 can acquire the distance to the object associated with the returned light, for example, based on the time period from the time when the non-visible light is emitted in a certain direction to the time when the returned light is detected. Further, by accumulating such distance information in association with the detecting position, it is possible to acquire information as to the shape of the object associated with the returned light. Additionally or alternatively, information as to an attribute such as the material of the object associated with the returned light can be acquired based on the difference in wavelength between the emitted light and the returned light.

That is, the LiDAR sensor unit 4016 is an example of a sensor unit. The LiDAR sensor unit 4016 outputs signals corresponding to the attributes of the detected return light, such as intensities and wavelengths. The above information is acquired by appropriately processing signals outputted from the LiDAR sensor unit 4016 by an information processing unit (not illustrated). The information processing unit may be provided in the left front sensor system 4010, or may be installed in the vehicle 100.

FIG. 32 illustrates a detection range CD of the camera unit 4014, a detection range MD of the millimeter wave radar unit 4015, and a detection range LD of the LiDAR sensor unit 4016. In the case of this example, the direction corresponding to the up-down direction of the vehicle 100 is the first direction, and the direction corresponding to the left-right direction of the vehicle 100 is the second direction. The detection range CD of the camera unit 4014 has a wider detection range in the second direction than the first direction. The detection range MD of the millimeter wave radar unit 4015 has a wider detection range in the second direction than the first direction. The detection range LD of the LiDAR sensor unit 4016 has a wider detection range in the second direction than the first direction.

As illustrated in FIG. 31, the camera unit 4014, the millimeter wave radar unit 4015, and the LiDAR sensor unit 4016 are arranged in a direction corresponding to the up-down direction of the vehicle 100 (first direction). The advantages of such a layout will now be described with reference to FIGS. 33 and 34.

Figure 33A:
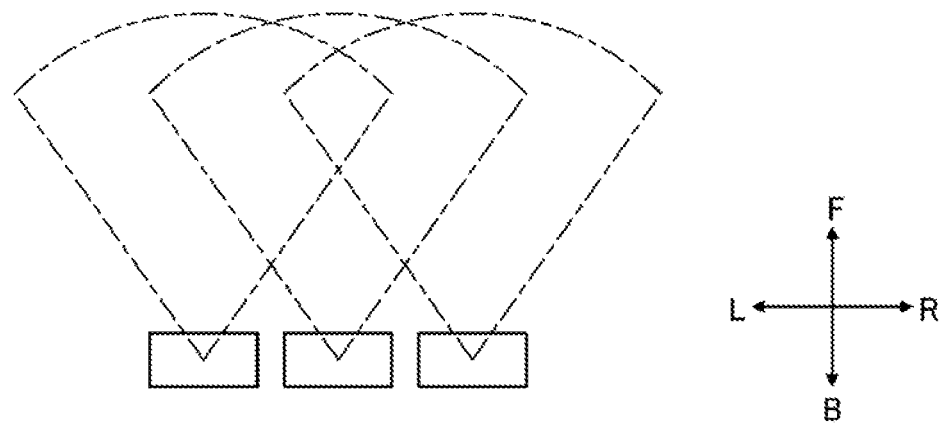
FIG. 33A is a diagram for explaining advantages of the arrangement of the sensor units in the left front sensor system of FIG. 31.

FIG. 33A illustrates an example in which a plurality of sensor units each having a wider detection range in the left-right direction of the vehicle 100 (second direction) than the direction corresponding to the up-down direction of the vehicle 100 as described above are arranged in the second direction. Since some of the detection ranges of the adjacent sensor units overlap with each other, it can be said that redundancy is high from the viewpoint of obtaining the external information of the vehicle 100 efficiently.

Figure 33B:
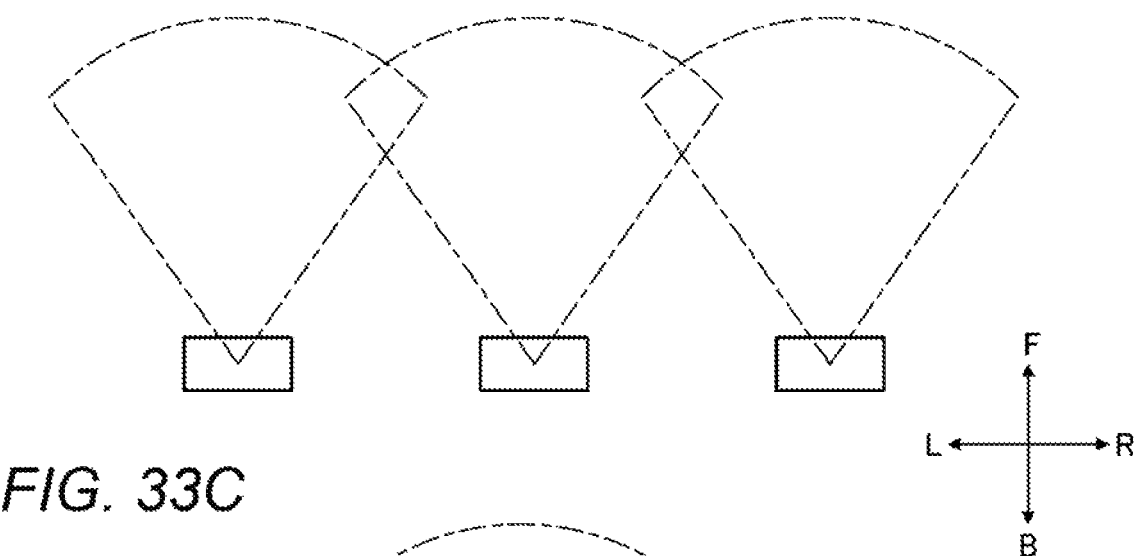
FIG. 33B is a diagram for explaining advantages of the arrangement of the sensor units in the left front sensor system of FIG. 31.

FIG. 33B illustrates an example of a configuration for suppressing such redundancy as much as possible. Since the detection range of each sensor unit is wider in the second direction, it is inevitable that the interval between the adjacent sensor units is increased. This leads to an increase in the size of the housing chamber.

Figure 33C:
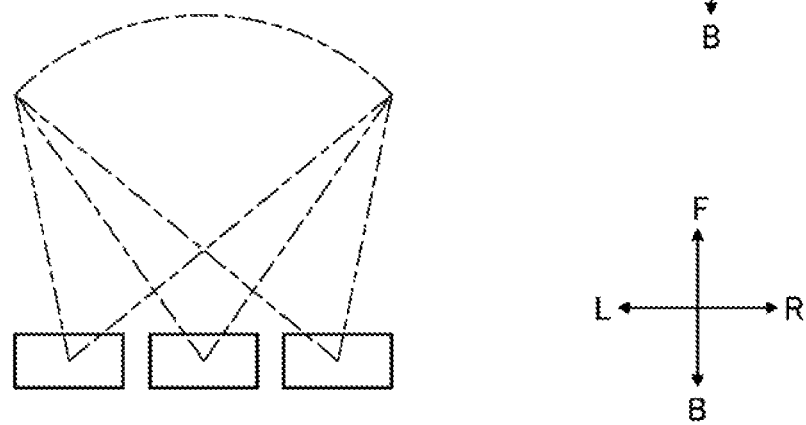
FIG. 33C is a diagram for explaining advantages of the arrangement of the sensor units in the left front sensor system of FIG. 31.

FIG. 33C illustrates an example of a configuration in which the detection ranges of the sensor units are made to coincide as much as possible. Since the detection range of each sensor unit is wider in the second direction, the sensor units located on the right and left of the center sensor unit require relatively large adjustment of the detection direction relative to the second direction.

FIG. 34A illustrates an example in which a plurality of sensor units each having the above detection range are arranged in the first direction. Since the detection range of each sensor unit is narrower in the first direction, the amount of overlap between some of the detection ranges of the adjacent sensor units can be relatively small.

FIG. 34B illustrates an example of a configuration for suppressing the above-mentioned redundancy as much as possible. Since the detection range of each sensor unit is narrower in the first direction, it is possible to avoid an increase in the distance between the adjacent sensor units. Accordingly, it is possible to suppress an increase in the size of the housing chamber.

FIG. 34C illustrates an example of a configuration in which the detection ranges of the sensor units are made to coincide as much as possible. Since the detection range of each sensor unit is narrower in the first direction, the amount of adjustment of the detection direction required in the first direction is relatively small for the sensor units located above and below the center sensor unit.

In other words, by arranging a plurality of sensor units in a direction in which the detection range is narrower, it is possible to avoid increasing the interval between the sensor units even if the overlap of the detection ranges of adjacent sensor units is reduced. On the other hand, when the detection ranges of adjacent sensor units are to be matched, the amount of adjustment of the detection direction required in each sensor unit can be reduced. Accordingly, it is possible to efficiently detect the external information of the vehicle 100 while alleviating the layout-related constrains caused when a plurality of sensor units are mounted on the vehicle 100.

In the present embodiment, a sensor unit having a higher heat generating property is disposed above a sensor unit having a lower heat generating property. "Sensor unit having a higher heat generating property" means a sensor unit which generates a higher amount of heat per unit time. Alternatively, it means a sensor unit that generates the same amount of heat per unit time but has a longer operating time. Alternatively, it means a sensor unit having a higher cumulative amount of heat generated between activation and deactivation of the left front sensor system 4010. For example, even in if a sensor unit generates a lower amount of heat per unit time, the sensor unit may have a higher cumulative amount of heat in a case where the sensor unit is operated with higher frequency.

Heat is likely to move upward. According to the above-described configuration, it is possible to suppress the influence of the heat generated by the sensor unit having a higher heat generating property on the sensor unit having a lower heat generating property. In addition, for example, the heat generated from a plurality of sensor units can be efficiently treated by intensively arranging a countermeasure configuration for heat in an upper portion of the housing chamber 4013.

Specifically, the millimeter wave radar unit 4015 is disposed above the camera unit 4014. That is, the heat generating property of the millimeter wave radar unit 4015 is higher than the heat generating property of the camera unit 4014.

Similarly, the LiDAR sensor unit 4016 is disposed above the millimeter wave radar unit 4015. In other words, the heat generating property of the LiDAR sensor unit 4016 is higher than the heat generating property of the millimeter wave radar unit 4015.

Moreover, the LiDAR sensor unit 4016 is disposed above the camera unit 4014. In other words, the heat generating property of the LiDAR sensor unit 4016 is higher than the heat generating property of the camera unit 4014.

By disposing the LiDAR sensor unit 4016 having a relatively higher heat generating property at a higher position in the housing chamber 4013, a more advantageous countermeasure for heat can be taken.

As illustrated in FIG. 31, the left front sensor system 4010 includes a heat sink 4017 and a heat sink 4018. The heat sink 4017 is thermally coupled to the millimeter wave radar unit 4015. The heatsink 4018 is thermally coupled to the LiDAR sensor unit 4016.

As used herein, the expression "A is thermally coupled to B" means a state in which heat transfer is enabled between A and B. If heat transfer is possible, A and B do not necessarily have to be in contact.

The heat sink 4018 thermally coupled to the LiDAR sensor unit 4016 has a higher heat dissipation than the heat sink 4017 thermally coupled to the millimeter wave radar unit 4015. "Heat sink having a higher heat dissipation property" means a heat sink having a higher amount of heat dissipated per unit time. Higher heat dissipation can be achieved by appropriately selecting the shape, surface area, material, and the like of the heat sink. In the example illustrated in FIG. 31, the surface area of the heat sink 4018 is greater than the surface area of the heat sink 4017.

That is, the heat sink having a higher heat dissipation property is disposed at a higher position. As a result, heat generated from a plurality of sensor units can be efficiently dissipated. In addition, as in the example illustrated in FIG. 31, when a heat sink having a smaller surface area is disposed at a lower position, it is possible to provide a space margin in a lower portion of the housing chamber 4013.

Particularly in the case of the present embodiment, a heat sink having a higher heat dissipation property is thermally coupled to a sensor unit having a higher heat generating property. As a result, heat generated from a plurality of sensor units can be dissipated particularly efficiently.

In the present embodiment, a heat sink is not coupled to the camera unit 4014. However, a heat sink may be thermally coupled to camera unit 4014. In this case, the heat dissipation property of this heat sink can be made smaller than the heat dissipation property of the heat sink 4017.

As illustrated in FIG. 31, the left front sensor system 4010 includes a cooling fan 4019. The cooling fan 4019 is a device for cooling the camera unit 4014, the millimeter wave radar unit 4015, and the LiDAR sensor unit 4016. In other words, the cooling fan 4019 is a common cooling device for the camera unit 4014, the millimeter wave radar unit 4015, and the LiDAR sensor unit 4016.

As described above, the left front sensor system 4010 according to the present embodiment is configured to have a higher heat generating property in the upper portion of the housing chamber 4013. Accordingly, in order to efficiently perform cooling, the cooling fan 4019 are disposed closer to an upper end of the arrangement of the camera unit 4014, the millimeter wave radar unit 4015, and the LiDAR sensor unit 4016.

More specifically, a rotational center 4191 of the cooling fan 4019 is in a location higher than a center position of the arrangement of the camera unit 4014, the millimeter wave radar unit 4015, and the LiDAR sensor unit 4016 in the up-down direction of the vehicle 100. In this embodiment, the center position is defined as a point on a straight line CL extending in the front-rear direction of the vehicle 100. The straight line CL is a straight line on which the distance to a tangent line UE extending in the front-rear direction of the vehicle 100 at an upper end of the uppermost sensor unit and the distance to a tangent line DE extending in the front-rear direction of the vehicle 100 at a lower end of the lowermost sensor unit are equal.

As illustrated in FIG. 32, the detection range CD of the camera unit 4014 has a detection reference point CP in the left-right direction of the vehicle 100. Similarly, the detection range MD of the millimeter wave radar unit 4015 has a detection reference point MP in the left-right direction of the vehicle 100, and the detection range LD of the LiDAR sensor unit 4016 has a detection reference point LP in the left-right direction of the vehicle 100. The detection reference point CP, the detection reference point MP, and the detection reference point LP are aligned in the up-down direction of the vehicle 100. In other words, the camera unit 4014, the millimeter wave radar unit 4015, and the LiDAR sensor unit 4016 do not have parallaxes relative to the left-right direction of the vehicle 100.

According to such a configuration, the information acquired from each of the camera unit 4014, the millimeter wave radar unit 4015, and the LiDAR sensor unit 4016 can be easily integrated with each other. Accordingly, it is possible to suppress an increase in processing load related to information integration in the controller.

As illustrated in FIG. 31, the left front sensor system 4010 includes a heater 4020. The heater 4020 is configured to provide heat to each of the camera unit 4014, the millimeter wave radar unit 4015, and the LiDAR sensor unit 4016.

Thus, even when the external environment temperature of the vehicle 100 is low, each sensor unit can be heated to a temperature at which the information detecting operation can be performed. Accordingly, information detection independent of the external environment temperature can be realized.

As illustrated in FIG. 31, the left front sensor system 4010 includes a support member 4021 and an adjustment mechanism 4022. The support member 4021 is a common member that supports the camera unit 4014, the millimeter wave radar unit 4015, and the LiDAR sensor unit 4016. The adjustment mechanism 4022 is a mechanism for adjusting at least one of the position and the posture of the support member 4021 with respect to the vehicle 100.

For example, the adjustment mechanism 4022 may be configured as a so-called aiming screw mechanism. The aiming screw mechanism may include an aiming screw that changes the attitude of the support member 4021 in a horizontal plane (in a plane including the left-right direction and the front-rear direction of the vehicle 100), and an aiming screw that changes the attitude of the support member 4021 in a vertical plane (in a plane including the up-down direction and the front-rear direction of the vehicle 100). Each of the aiming screws can be operated by a predetermined jig. Since the aiming screw mechanism itself is well known, a detailed description for the configuration thereof will be omitted. It should be noted that the above "horizontal plane" need not coincide with a strict horizontal plane. Likewise, the above "vertical plane" need not coincide with a strict vertical plane.

In the pre-shipment adjustment process for the left front sensor system 4010, the respective detecting reference positions of the camera unit 4014, the millimeter wave radar unit 4015, and the LiDAR sensor unit 4016 are adjusted. The adjustment is performed using an adjustment mechanism (not illustrated) provided for each sensor unit.

When the left front sensor system 4010 is mounted on the vehicle 100, the detection reference position of each sensor unit may deviate from a desired position due to tolerances of vehicle body parts or positional deviation of the housing 4011 with respect to the vehicle body. Accordingly, after the left front sensor system 4010 is mounted on the vehicle 100, the detection reference position of each sensor unit is readjusted.

In the present embodiment, the camera unit 4014, the millimeter wave radar unit 4015, and the LiDAR sensor unit 4016 are supported by the common support member 4021. Accordingly, the detection reference position of each sensor unit can be adjusted collectively through the operation of the adjustment mechanism 4022. Accordingly, even in a case where the number of sensor units mounted on the vehicle 100 increases, it is possible to reduce the workload for adjusting the detection reference position of each sensor unit relative to the vehicle 100.

Each of the above-mentioned aiming screws described as an example of the adjustment mechanism 4022 can be replaced by an actuator operated by an external operation signal. Additionally or alternatively, the adjustment mechanism 4022 may include an actuator for adjusting the position of the support member 4021 in the vertical plane. For example, it may include an actuator that adjusts the position of the support member 4021 in a direction corresponding to the left-right direction of the vehicle 100, and an actuator that adjusts the position of the support member 4021 in a direction corresponding to the up-down direction of the vehicle 100.

As illustrated in FIG. 31, the left front sensor system 4010 includes a first extension member 4023. The "extension member" is a decorative component that covers a part of the structure disposed in the housing chamber 4013 so as to make the structure invisible from the outside of the vehicle 100. FIG. 35 illustrates an appearance of a portion of the left front sensor system 4010 as viewed from a position ahead of the vehicle 100.

The first extension member 4023 includes a first portion 4231 disposed between the camera unit 4014 and the millimeter wave radar unit 4015. The presence of the first portion 4231 makes internal wirings or internal components located between the camera unit 4014 and the millimeter wave radar unit 4015 invisible from the outside of the vehicle 100. The first portion 4231 can also be used as a heat shielding member or a shock absorbing member. By appropriately selecting the position of the first portion 4231, it can also be used as a light shielding member for preventing the intrusion of internally reflected light into the camera unit 4014.

The first extension member 4023 has a second portion 4232 disposed between the millimeter wave radar unit 4015 and the LiDAR sensor unit 4016. The presence of the second portion 4232 makes internal wirings and internal components disposed between the millimeter wave radar unit 4015 and the LiDAR sensor unit 4016 invisible from the outside of the vehicle 100. The second portion 4232 can also be used as a heat shielding member or a shock absorbing member.

As illustrated in FIGS. 31 and 35, the left front sensor system 4010 includes a second extension member 4024. The second extension member 4024 has an opening 4241. The opening 4241 defines a space that allows the camera unit 4014, the millimeter wave radar unit 4015, and the LiDAR sensor unit 4016 to be displaced by the adjustment mechanism 4022. That is, the relative positions of the second extension member 4024 and the respective sensor units are variable.

The opening 4241 of the second extension member 4024 is disposed at a position closer to the outside of the vehicle 100 than the first extension member 4023. The first extension member 4023 has a portion that covers the opening 4241 when viewed from a side closer to the inside of the vehicle 100. The first extension member 4023 is fixed to the support member 4021. That is, the relative positions between the second extension member 4024 and the respective sensor units are not variable.

According to such a configuration, the internal wirings and the internal components located around the respective sensor units can be made invisible from the outside of the vehicle 100 while allowing the camera unit 4014, the millimeter wave radar unit 4015, and the LiDAR sensor unit 4016 to be displaced by the adjustment mechanism 4022.

The seventeenth embodiment described above is illustrative only to facilitate an understanding of the presently disclosed subject matter. The configurations according to the seventeenth embodiment can be appropriately modified or improved without departing from the gist of the presently disclosed subject matter.

In the seventeenth embodiment, a front end 4141 of the camera unit 4014, a front end 4151 of the millimeter wave radar unit 4015, and a front end 4161 of the LiDAR sensor unit 4016 are aligned in a direction corresponding to the up-down direction of the vehicle 100.

However, a configuration as illustrated in FIG. 36 may also be employed. Specifically, the front end 4151 of the millimeter wave radar unit 4015 is located behind the front end 4141 of the camera unit 4014 in the front-rear direction of the vehicle 100, i.e., closer to the inside of the vehicle 100. Similarly, the front end 4161 of the LiDAR sensor unit 4016 is located behind the front end 4151 of the millimeter wave radar unit 4015 in the front-rear direction of the vehicle 100, i.e., closer to the inside of the vehicle 100. That is, a sensor unit disposed at an upper position in the housing chamber 4013 is located behind in the front-rear direction of the vehicle 100 (closer to the inside of the vehicle 100) than a sensor unit disposed at a lower position in the housing chamber 4013.

The translucent cover 4012 defining the housing chamber 4013 generally has a shape curved such that an upper portion thereof is located closer to the inside of the vehicle 100. By arranging the sensor units in an offset manner so as to match with the shape, the space utilization efficiency of the housing chamber 4013 can be enhanced. As a result, the space corresponding to a lower rear portion of the housing chamber 4013 illustrated in FIG. 31 may be used as a space occupied by other components of the left front sensor system 4010 as a space in which the degree of freedom of layout is enhanced, or may be used as a space occupied by components of the vehicle 100 by changing the shape of the housing chamber 4013 as illustrated in FIG. 36.

The housing chamber 4013 in the seventeenth embodiment may be a lamp chamber in which a lamp unit is housed. In this case as well, since the sensor units included in the left front sensor system 4010 are arranged in the direction corresponding to the up-down direction of the vehicle 100, it is easy to secure a space in which the lamp unit is disposed.

In the seventeenth embodiment, three sensor units are housed in the housing chamber 4013, and their types are different from each other. However, the number of sensor units housed in the housing chamber 4013 may be any number of two or more. The type of the sensor unit housed in the housing chamber 4013 may be appropriately selected so as to allow duplication. When the sensor units housed in the housing chamber 4013 do not include the camera unit and the lamp unit, the translucent cover 4012 may not be transparent to visible light.

In the seventeenth embodiment, the detection range CD of the camera unit 4014, the detection range MD of the millimeter wave radar unit 4015, and the detection range LD of the LiDAR sensor unit 4016 all have a wider detection range in the direction perpendicular to the direction corresponding to the up-down direction of the vehicle 100. However, this condition may be satisfied for at least one of the sensor units included in the left front sensor system 4010. Even in this case, the advantages described with reference to FIGS. 33 and 34 can be obtained.

In the seventeenth embodiment, the detection range of the sensor units included in the left front sensor system 4010 is located at least ahead of the vehicle 100. Additionally or alternatively, the left front sensor system 4010 may include a plurality of sensor units having a detection range located at least on the left of the vehicle 100.

The configuration of the left front sensor system 4010 is also applicable to the left rear sensor system. The left rear sensor system is mounted on the left rear corner portion LB of the vehicle 100 illustrated in FIG. 2. The basic configuration of the left rear sensor system may be symmetric with the left-front sensor system 4010 relative to the front-rear direction. However, the specification of each sensor unit can be appropriately changed.

The configuration of the left front sensor system 4010 is also applicable to the right rear sensor system. The right rear sensor system is mounted on the right rear corner portion RB of the vehicle 100 illustrated in FIG. 2. The basic configuration of the right rear sensor system is symmetrical with the left rear sensor system described above relative to the left-right direction.

Figure 37:
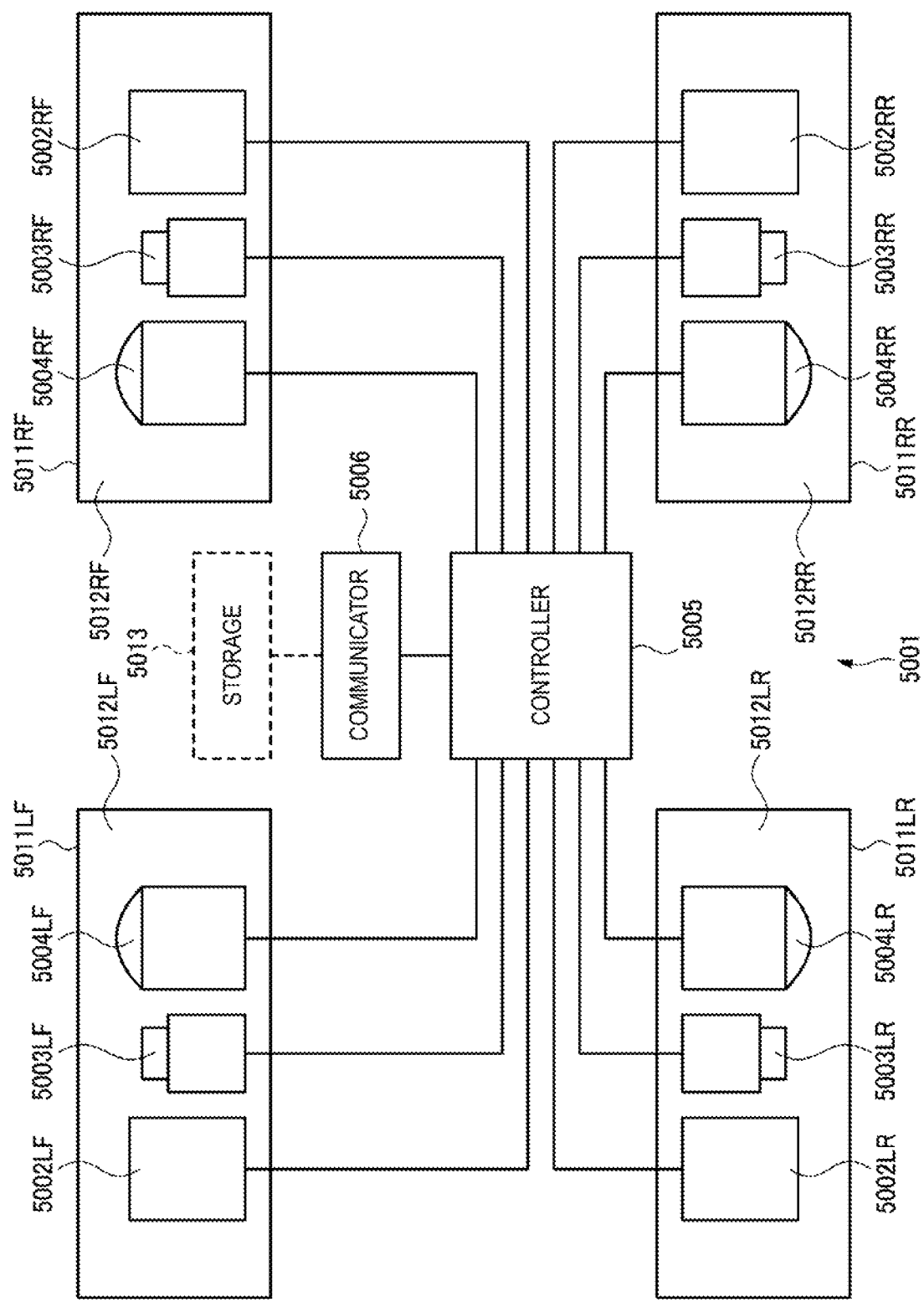
FIG. 37 schematically illustrates a configuration of a sensor system according to an eighteenth embodiment.

FIG. 37 schematically illustrates a configuration of a sensor system 5001 according to an eighteenth embodiment. The sensor system 5001 includes a left front lighting device 5011LF, a right front lighting device 5011RF, a left rear lighting device 5011LR, and a right rear lighting device 5011RR. The sensor system 5001 is mounted on the vehicle 100 illustrated in FIG. 2. The left front lighting device 5011LF is mounted on the left front corner portion LF of the vehicle 100. The right front lighting device 5011RF is mounted on the right front corner portion RF of the vehicle 100. The left rear lighting device 5011LR is mounted on the left rear corner portion LB of the vehicle 100. The right rear lighting device 5011RR is mounted on the right rear corner portion RB of the vehicle 100.

The left front lighting device 5011LF includes a housing and a translucent cover for defining a left front lamp chamber 5012LF. The right front lighting device 5011RF includes a housing and a translucent cover for defining a right front lamp chamber 5012RF. The left rear lighting device 5011LR includes a housing and a translucent cover for defining a left rear lamp chamber 5012LR. The right rear lighting device 5011RR includes a housing and a translucent cover for defining a right rear lamp chamber 5012RR.

The sensor system 5001 includes a left front LiDAR sensor 5002LF, a left front camera 5003LF, and a left front lamp 5004LF. The left front LiDAR sensor 5002LF, the left front camera 5003LF, and the left front lamp 5004LF are disposed in the left front lamp chamber 5012LF of the left front lighting device 5011LF.

The sensor system 5001 includes a right front LiDAR sensor 5002RF, a right front camera 5003RF, and a right front lamp 5004RF. The right front LiDAR sensor 5002RF, the right front camera 5003RF, and the right front lamp 5004RF are disposed in the right front lamp chamber 5012RF of the right front lighting device 5011RF.

The sensor system 5001 includes a left rear LiDAR sensor 5002LR, a left rear camera 5003LR, and a left rear lamp 5004LR. The left rear LiDAR sensor 5002LR, the left rear camera 5003LR, and the left rear lamp 5004LR are disposed in the left rear lamp chamber 5012LR of the left rear lighting device 5011LR.

The sensor system 5001 includes a right rear LiDAR sensor 5002RR, a right rear camera 5003RR, and a right rear lamp 5004RR. The right rear LiDAR sensor 5002RR, the right rear camera 5003RR, and the right rear lamp 5004RR are disposed in the right rear lamp chamber 5012RR of the right rear lighting device 5011RR.

The sensor system 5001 includes a controller 5005. The controller 5005 includes a processor and a memory. Examples of the processor include a CPU and an MPU. The memory stores instructions executable by the processor. Examples of the memory include a ROM in which various instructions are stored, and a RAM having a work area in which various instructions executed by a processor are stored. The controller 5005 may be configured by a processor and a memory included in an ECU installed in the vehicle 100, or may be configured by a dedicated device such as an ASIC and an FPGA.

The controller 5005 is configured to be capable of communicating with each of the left front LiDAR sensor 5002LF, the right front LiDAR sensor 5002RF, the left rear LiDAR sensor 5002LR, and the right rear LiDAR sensor 5002RR. The communication may be performed electrically or optically via a wired connection, or may be performed contactless via wireless communication.

Each of the left front LiDAR sensor 5002LF, the right front LiDAR sensor 5002RF, the left rear LiDAR sensor 5002LR, and the right rear LiDAR sensor 5002RR has a configuration for emitting non-visible light, and a configuration for detecting return light as a result of the non-visible light being reflected by an object existing outside the vehicle 100. That is, each of the left front LiDAR sensor 5002LF, the right front LiDAR sensor 5002RF, the left rear LiDAR sensor 5002LR, and the right rear LiDAR sensor 5002RR is a sensor for detecting the external information of the vehicle 100. In the present embodiment, infrared light having a wavelength of 905 nm is used as the non-visible light.

Each of the left front LiDAR sensor 5002LF, the right front LiDAR sensor 5002RF, the left rear LiDAR sensor 5002LR, and the right rear LiDAR sensor 5002RR can obtain the distance to the object associated with the returned light, for example, based on the time period from the time when the non-visible light is emitted in a certain direction to the time when the returned light is sensed. Further, by accumulating such distance information in association with the detecting position, it is possible to acquire information as to the shape of the object associated with the returned light. Additionally or alternatively, information as to an attribute such as the material of the object associated with the returned light can be acquired based on the difference in wavelength between the emitted light and the returned light.

Each of the left front LiDAR sensor 5002LF, the right front LiDAR sensor 5002RF, the left rear LiDAR sensor 5002LR, and the right rear LiDAR sensor 5002RR is configured to output detection signals corresponding to the attributes of the detected return light, such as intensities and wavelengths. The above-described information is acquired by appropriately processing the detection signals outputted from the left front LiDAR sensor 5002LF, the right front LiDAR sensor 5002RF, the left rear LiDAR sensor 5002LR, and the right rear LiDAR sensor 5002RR by the controller 5005.

Each of the left front camera 5003LF, the right front camera 5003RF, the left rear camera 5003LR, and the right rear camera 5003RR is a device for capturing an image of a predetermined area outside the vehicle 100. In other words, each of the left front camera 5003LF, the right front camera 5003RF, the left rear camera 5003LR, and the right rear camera 5003RR serves as a sensor for detecting the external information of the vehicle 100. The controller 5005 is configured to be capable of communicating with each of the left front camera 5003LF, the right front camera 5003RF, the left rear camera 5003LR, and the right rear camera 5003RR. The communication may be performed electrically or optically via a wired connection, or may be performed contactless via wireless communication.

Each of the left front camera 5003LF, the right front camera 5003RF, the left rear camera 5003LR, and the right rear camera 5003RR is configured to output a video signal corresponding to the captured image. The external Information of the vehicle 100 detected by each of the left front camera 5003LF, the right front camera 5003RF, the left rear camera 5003LR, and the right rear camera 5003RR is acquired by appropriately processing the video signals by the controller 5005.

Each of the left front lamp 5004LF, the right front lamp 5004RF, the left rear lamp 5004LR, and the right rear lamp 5004RR includes an optical system including at least one of a lens and a reflector, and is configured to emit light in a predetermined direction. In each of the left front lamp 5004LF, the right front lamp 5004RF, the left rear lamp 5004LR, and the right rear lamp 5004RR, a lamp light source or a light emitting element can be used. Examples of the lamp light source include an incandescent lamp, a halogen lamp, a discharge lamp, and a neon lamp. Examples of the light-emitting element include a light-emitting diode, a laser diode, and an organic EL element.

The controller 5005 is configured to be capable of communicating with each of the left front lamp 5004LF, the right front lamp 5004RF, the left rear lamp 5004LR, and the right rear lamp 5004RR. The communication may be performed electrically or optically via a wired connection, or may be performed contactless via wireless communication. The controller 5005 is configured to output control signals to each of the left front lamp 5004LF, the right front lamp 5004RF, the left rear lamp 5004LR, and the right rear lamp 5004RR. Each of the left front lamp 5004LF, the right front lamp 5004RF, the left rear lamp 5004LR, and the right rear lamp 5004RR performs a light emitting operation according to the control signal outputted from the controller 5005.

The sensor system 5001 includes a communicator 5006. The communicator 5006 is configured to be able to communicate with the controller 5005. The communication may be performed electrically or optically via a wired connection, or may be performed contactless via wireless communication. The controller 5005 is configured to output a control signal to the communicator 5006 at a predetermined timing. The communicator 5006 is configured to acquire infrastructure information in response to the control signal. The communicator 5006 is configured to output the acquired infrastructure information to the controller 5005.

The infrastructure information may include at least one of information about roads and information about constructions on the roads. Examples of the information on roads include the number of lanes, the presence of intersections, the presence of crossing sidewalks, the presence of entrances and exits of expressways, and the presence of curves. Examples of the constructions include a traffic light, a curve mirror, a pedestrian bridge, a bus stop, and a tollgate on a toll road.

Figure 38:
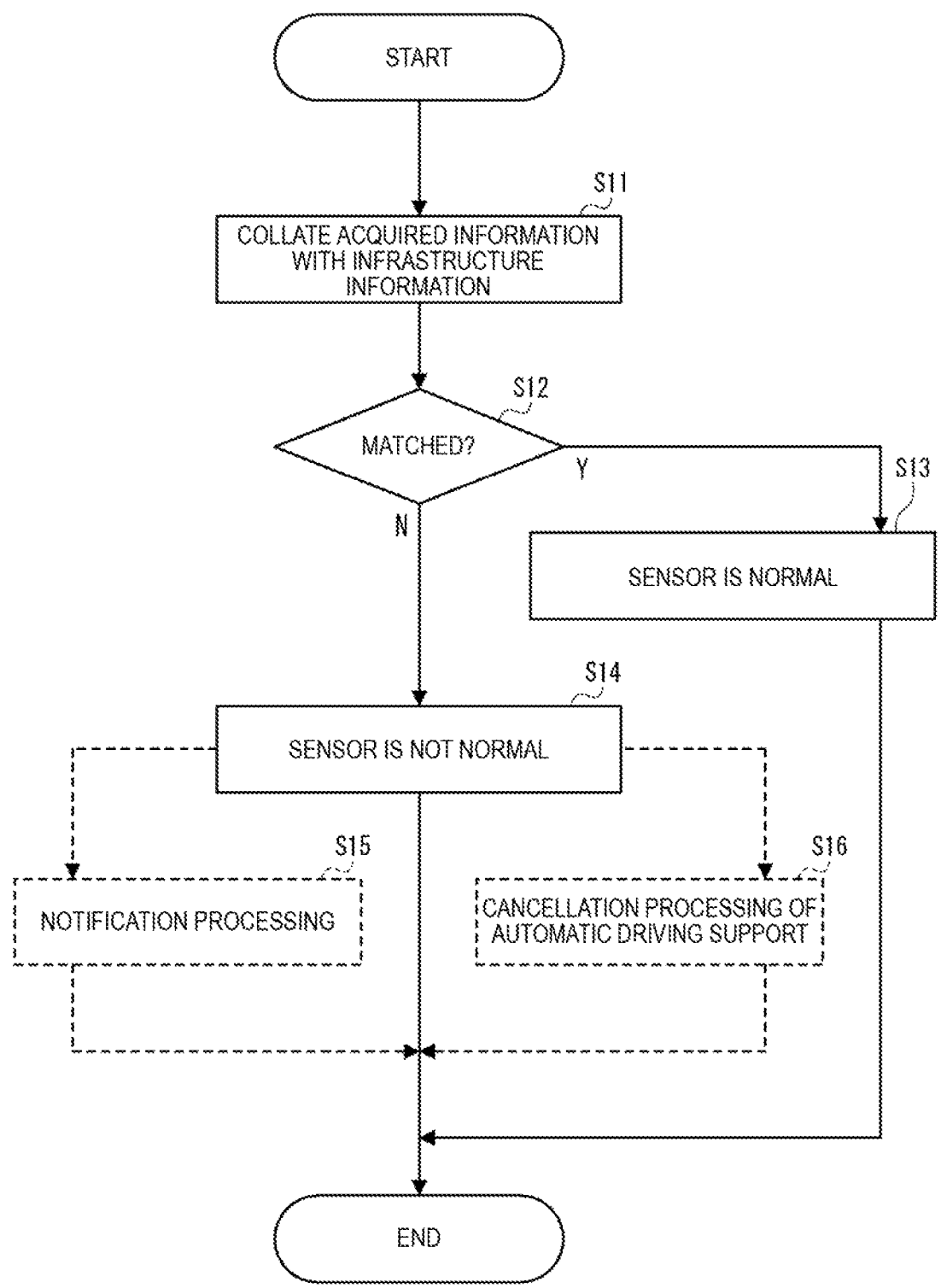
FIG. 38 is a flow chart illustrating a first operation example of the sensor system of FIG. 37.

With reference to FIG. 38, a first operation example of the sensor system 5001 configured as described above will be described.

The controller 5005 causes the communicator 5006 to acquire the infrastructure information at a predetermined timing. Next, the controller 5005 collates the infrastructurel information with the external information of the vehicle 100 acquired through at least one of the left front LiDAR sensor 5002LF, the left front camera 5003LF, the right front LiDAR sensor 5002RF, the right front camera 5003RF, the left rear LiDAR sensor 5002LR, the left rear camera 5003LR, the right rear LiDAR sensor 5002RR, and the right rear camera 5003RR (step S11).

Next, in step S12, the controller 5005 determines whether or not the infrastructure information acquired through the communicator 5006 matches the external information of the vehicle 100 acquired through the sensor. For example, when the infrastructure information indicates the presence of a traffic light on the left front of the vehicle 100, it is determined whether the presence of a traffic light on the left front of the vehicle 100 is detected by at least one of the left front LiDAR sensor 5002LF and the left front camera 5003LF.

If it is determined that the infrastructure information matches the information acquired through the sensor (Y in step S12), the controller 5005 determines that the sensor involved in the collation is normal (step S13), and terminates the processing.

When it is determined that the infrastructure information does not match the information acquired through the sensor (N in step S12), the controller 5005 determines that the sensor involved in the collation is not normal (step S14).

According to such a configuration, it is possible to automatically judge whether or not the sensor mounted on the vehicle 100 and acquiring the external information of the vehicle 100 is operating normally. In addition, the reliability of the judgment can be enhanced by using, for the judgment, information on the infrastructure where the installation location that is basically unchanged.

As illustrated in dashed lines in FIG. 37, the vehicle 100 may include a storage 5013. The communicator 5006 can communicate with the storage 5013. The communication may be performed electrically or optically via a wired connection, or may be performed contactless via wireless communication.

The storage 5013 stores map information. The map information may be used, for example, in a navigation device installed in the vehicle 100. The map information may be stored in advance in the storage 5013, or may be downloaded from an external network periodically or as required.

In this case, the controller 5005 causes the communicator 5006 to perform communication with the storage 5013 at a predetermined timing. The communicator 5006 acquires the above-mentioned infrastructure information from the map information stored in the storage 5013.

According to such a configuration, it is possible to automatically judge whether or not a sensor mounted on the vehicle 100 to acquire the external information of the vehicle 100 is operating normally by acquiring appropriate infrastructure information regardless of the external environment of the vehicle 100 such as weather, brightness, and radio wave conditions.

The infrastructure information can also be acquired from the map information stored in a storage of a portable digital assistance held by an occupant of the vehicle 100. Here, this storage is considered to be a "storage installed in a vehicle".

The communicator 5006 may acquire the infrastructure information through communication with an external entity of the vehicle 100. Examples of such communication include so-called inter-vehicle communication, so-called road-to-vehicle communication, and wireless communication with an external network.

In the case of the vehicle-to-vehicle communication, the communicator 5006 acquires the infrastructure information through wireless communication with a vehicle (preceding vehicle or oncoming vehicle) traveling ahead of the vehicle 100. The vehicles traveling ahead are likely to already have information on a location where the vehicle 100 is to arrive. The information may be obtained from such a vehicle prior to reaching the location.

In the case of the road-to-vehicle communication, the communicator 5006 acquires information on the road infrastructure itself through wireless communication with devices embedded in the road infrastructure (traffic lights, crosswalks, curve mirrors, and the like).

Alternatively, the communicator 5006 can acquire the infrastructure information through wireless communication with an entity on an external network providing map information or road information.

According to such a configuration, it is possible to automatically judge whether or not the sensor mounted on the vehicle 100 to acquire the external information of the vehicle 100 is operating normally by acquiring the infrastructure information having a higher real-time characteristic.

Examples of the predetermined timings at which the controller 5005 causes the communicator 5006 to acquire the infrastructure information include periodic, upon input of a user instruction, and upon detection of a road infrastructure providing the infrastructure information.

Preferably, the infrastructure information is acquired when the vehicle 100 stops. For example, the infrastructure information is acquired when the vehicle is stopped to wait for a signal at an intersection. In this case, since the information is acquired by the sensor under a condition that the relative speed between the vehicle 100 and the infrastructure is zero, not only the accuracy of the information can be enhanced, but also an increase in the processing load can be suppressed.

As indicated by dashed lines in FIG. 38, when it is determined that the sensor is not normal, the controller 5005 can cause the vehicle 100 to execute at least one of notification processing (step S15) and cancellation processing of the automatic driving support (step S16).

In the notification processing, at least one of a visual notification, an audible notification, and a haptic notification is performed to a driver through a facility installed in the vehicle 100.

The automatic driving support refers to a control processing which at least partially performs at least one of a driving operation (steering wheel operation, acceleration, deceleration), monitoring of the driving environment, and backup of the driving operation. That is, it includes not only the partial driving support such as braking function for collision avoidance and assisting function for lane-keeping, but also a full self-driving operation.

In step S16, only the driving support control involving the sensor determined to be not normal may be invalidated, or all the driving support controls may be invalidated.

According to such a configuration, it is possible to avoid a situation where the driving support control involving a sensor determined to be not normal is continued without the driver recognizing the fact that the sensor is not normal.

In this operation example, the LiDAR sensor and the camera are exemplified as the sensors for detecting the external information of the vehicle 100. Additionally or alternatively, any suitable sensor may be mounted on the vehicle 100. Examples of such a sensor include a millimeter wave radar sensor, an ultrasonic sonar, and a non-visible light camera.

Next, a second operation example of the sensor system 5001 will be described with reference to FIG. 39.

In step S21, the controller 5005 blinks the left front lamp 5004LF, the right front lamp 5004RF, the left rear lamp 5004LR, and the right rear lamp 5004RR at predetermined timings, and acquires the outputs from the left front camera 5003LF, the right front camera 5003RF, the left rear camera 5003LR, and the right rear camera 5003RR. Each of the left front lamp 5004LF, the right front lamp 5004RF, the left rear lamp 5004LR, and the right rear lamp 5004RR is an example of a light source. At this time, the left front camera 5003LF, the right front camera 5003RF, the left rear camera 5003LR, and the right rear camera 5003RR serve as sensors for acquiring information on the brightness of the outside of the vehicle 100.

The blinking operation may be performed for at least one of the left front lamp 5004LF, the right front lamp 5004RF, the left rear lamp 5004LR, and the right rear lamp 5004RR. However, when the left front lamp 5004LF blinks, the output from the left front camera 5003LF is acquired. Similarly, when the right front lamp 5004RF blinks, the output from the right front camera 5003RF is acquired. When the left rear lamp 5004LR blinks, the output from the left rear camera 5003LR is acquired. When the right rear lamp 5004RR blinks, the output from the right rear camera 5003RR is acquired.

In step S22, the controller 5005 judges whether or not the output acquired from each camera corresponds to the blinking of the light source associated with the camera. If the camera is normal, the output from the camera corresponds to a change in the external brightness of the vehicle 100 due to the blinking of the light source associated with the camera. Accordingly, when the blinking of the light source corresponds to the output from the camera associated with the light source (Y in step S22), the controller 5005 determines that the camera is normal (step S23), and terminates the processing.

If the blinking of the light source does not correspond to the output from the camera associated with the light source (N in step S22), the controller 5005 determines that the camera is not normal (step S24).

According to such a configuration, it is possible to automatically judge whether or not the camera mounted on the vehicle 100 is operating normally. In addition, a diagnostic system can be constructed at a low cost by utilizing the light source for lighting the outside of the vehicle 100 for the judgment.

The blinking frequency of each of the left front lamp 5004LF, the right front lamp 5004RF, the left rear lamp 5004LR, and the right rear lamp 5004RR is selected as a value at which a human cannot visually recognize the blinking. For example, the blinking frequency is 30 Hz or more, and preferably 60 Hz or more.

According to such a configuration, even at night, it is possible to automatically judge whether or not the camera mounted on the vehicle 100 is operating normally without giving a sense of discomfort not only to an occupant of the vehicle 100 but also to a person in the vicinity of the vehicle 100.

Examples of predetermined timings at which the controller 5005 causes the left front lamp 5004LF, the right front lamp 5004RF, the left rear lamp 5004LR, and the right rear lamp 5004RR to blink include upon activation of each light source, periodic, and upon input of a user instruction.

Preferably, the left front lamp 5004LF, the right front lamp 5004RF, the left rear lamp 5004LR, and the right rear lamp 5004RR blink when the vehicle 100 is activated. In this case, even not at night, it is possible to automatically judge whether or not the camera mounted on the vehicle 100 is operating normally without giving a sense of discomfort to a person around the vehicle 100. In addition, it is possible to avoid a situation in which the driving is started under a condition that a camera mounted on the vehicle 100 is not operating normally.

Figure 39:
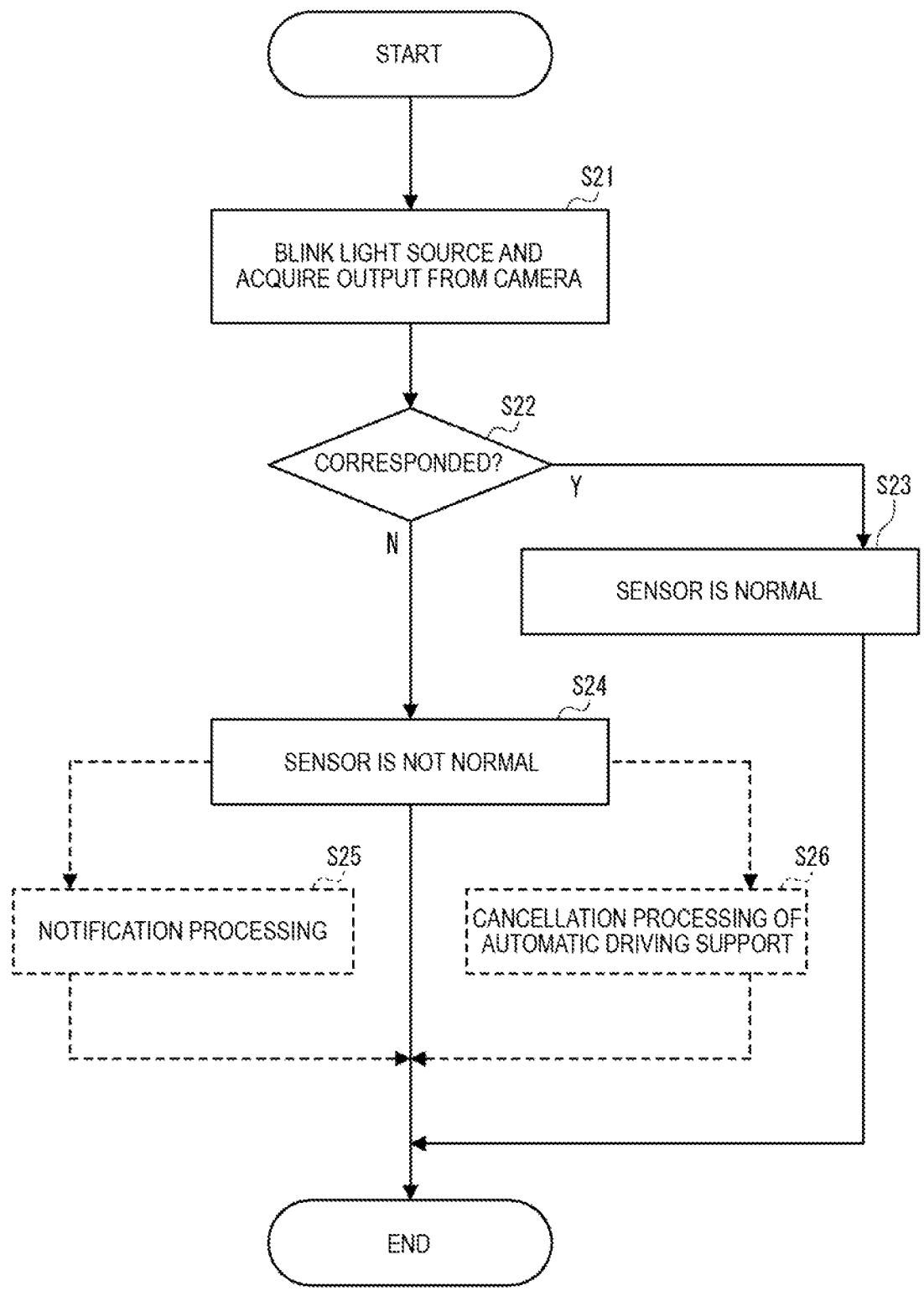
FIG. 39 is a flow chart illustrating a second operation example of the sensor system of FIG. 37.

As indicated by dashed lines in FIG. 39, when it is determined that at least one of the left front camera 5003LF, the right front camera 5003RF, the left rear camera 5003LR, and the right rear camera 5003RR is not normal, the controller 5005 can cause the vehicle 100 to execute at least one of notification processing (step S25) and cancellation processing of the automatic driving support (step S26). The definition of the automatic driving support is as described above.

In the notification processing, at least one of a visual notification, an audible notification, and a haptic notification is performed to a driver through a facility installed in the vehicle 100.

In step S26, only the driving support control involving the camera determined to be not normal may be invalidated, or all the driving support controls may be invalidated.

According to such a configuration, it is possible to avoid a situation where the driving support control involving a camera determined to be not normal is continued without the driver recognizing the fact that the camera is not normal.

In this operation example, a camera adapted to be mounted on the vehicle 100 is exemplified as a sensor for detecting the information relating to the brightness outside the vehicle 100. Additionally or alternatively, well-known sensors for detecting brightness may be mounted on the vehicle 100. The judgment of whether the sensor is normal can be made by blinking a light source having the highest influence on the brightness detection of the sensor.

Next, a third operation example of the sensor system 5001 will be described with reference to FIG. 40.

In step S31, the controller 5005 acquires outputs from the left front camera 5003LF, the right front camera 5003RF, the left rear camera 5003LR, and the right rear camera 5003RR at predetermined timings, and collates the detection information from the respective cameras. Examples of the detection information to be collated include environmental information of the vehicle 100 such as weather and time (day or night).

In step S32, the controller 5005 judge whether the information detected by the respective cameras match each other. If all the cameras are normal, the detected information shall match each other. Accordingly, when the detected information match each other (Y in step S32), the controller 5005 determines that all the cameras are normal (step S33), and terminates the processing.

If the detected information do not match each other (N in step S32), the controller 5005 determines that any of the cameras is not normal (step S34).

According to such a configuration, it is possible to automatically and easily judge whether the camera mounted on the vehicle 100 is operating normally.

In particular, since the information subjected to the judgment is the environment information of the vehicle 100, there are few constraints on the timing at which the judgment is executed. In addition, in the environment information, a large difference is less likely to occur in the detection result compared with detection of an object or the like. If the detection results for such information do not match each other, an abnormality with a higher severity is expected. Accordingly, it is possible to detect an abnormality having a higher severity.

Examples of predetermined timings at which the controller 5005 collates the detection results of the left front camera 5003LF, the right front camera 5003RF, the left rear camera 5003LR, and the right rear camera 5003RR include upon activation of the vehicle 100 and upon input of a user instruction.

Preferably, the detection results from the respective cameras are collated periodically by the controller 5005. In this case, it is possible to easily construct a periodic self-diagnosis system of the camera mounted on the vehicle 100.

Figure 40:
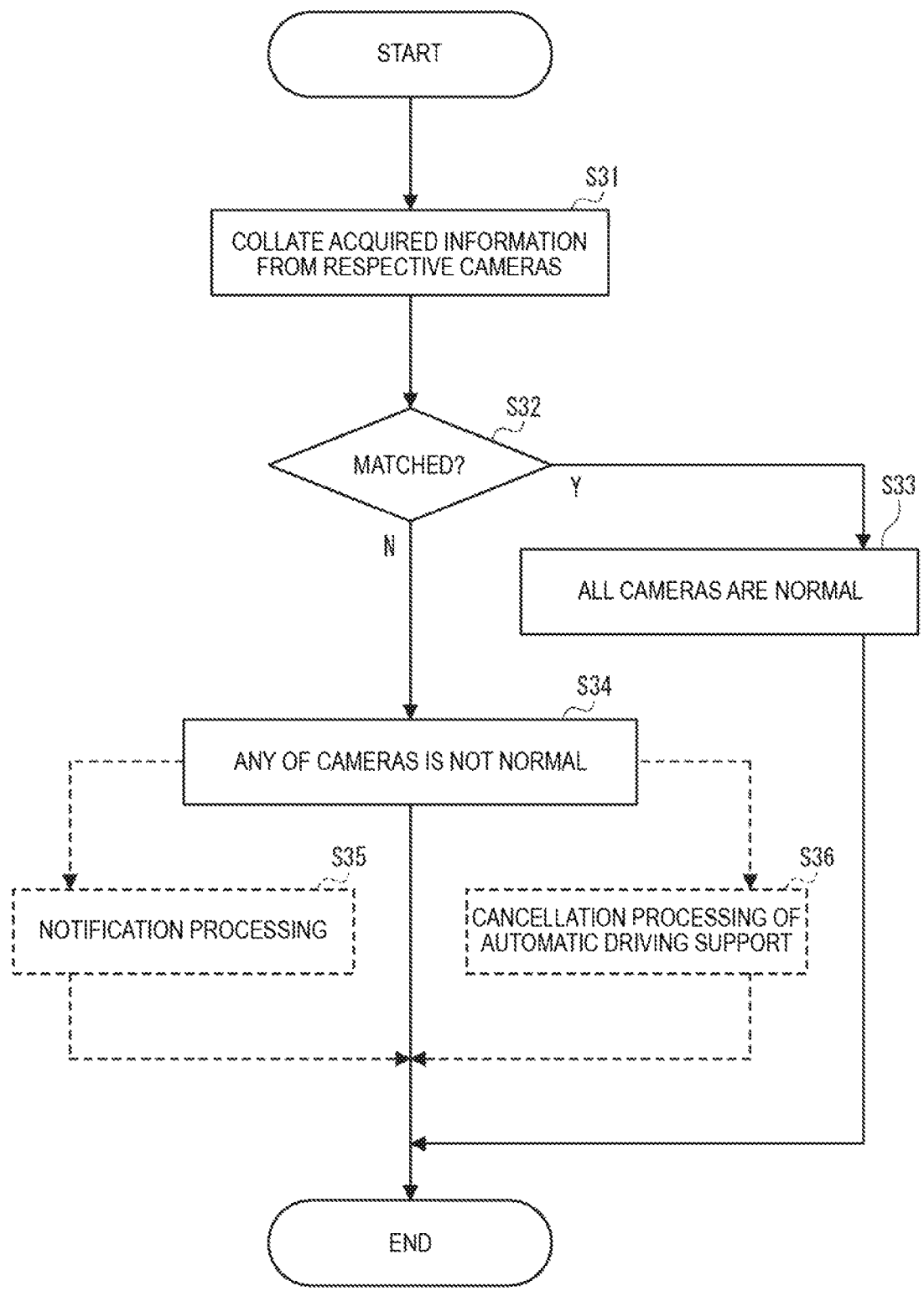
FIG. 40 is a flow chart illustrating a third operation example of the sensor system of FIG. 37.

As indicated by dashed lines in FIG. 40, when it is determined that at least one of the left front camera 5003LF, the right front camera 5003RF, the left rear camera 5003LR, and the right rear camera 5003RR is not normal, the controller 5005 can cause the vehicle 100 to execute at least one of notification processing (step S35) and cancellation processing of the automatic driving support (step S36). The definition of the automatic driving support is as described above.

In the notification processing, at least one of a visual notification, an audible notification, and a haptic notification is performed to a driver through a facility installed in the vehicle 100.

In step S36, only the driving support control involving the camera determined to be not normal may be invalidated, or all the driving support controls may be invalidated.

According to such a configuration, it is possible to avoid a situation where the driving support control involving a camera determined to be not normal is continued without the driver recognizing the fact that the camera is not normal.

In this operation example, it is determined whether all of the four cameras are normal by collating the environment information of the vehicle 100 acquired from the four cameras. However, similar processing may be performed for at least two sensors mounted on different portions of the vehicle 100 to detect the same information.

For example, in a case where it is evident that a wall is present on the right of the vehicle 100, the right front LiDAR sensor 5002RF and the right rear LiDAR sensor 5002RR shall be able to detect the presence of the wall. In this instance, the controller 5005 collates the information detected by the right front LiDAR sensor 5002RF and the right rear LiDAR sensor 5002RR with each other. If they coincide with each other, it can be determined that both sensors are operating normally. If they do not coincide with each other, it can be determined that either of the two sensors is not normal.

In addition, if the same information can be detected by being mounted on different portions of the vehicle 100, a sensor to be used can be appropriately selected in accordance with the type of information to be acquired. For example, a millimeter wave radar sensor, an ultrasonic sonar, a non-visible light camera, a brightness sensor, a temperature sensor, and the like can be used.

The determination that the information obtained by the different sensors match each other may be made even in a case where the complete matching is not obtained. If the information can be expressed numerically, it can be determined that two information do not match each other when the difference between a value acquired from a first sensor and a value acquired from a second sensor is no less than a predetermined threshold value. That is, when the difference between the values acquired from the two sensors is less than the threshold value, it can be determined that the information acquired by the two sensors matches each other.

When it is determined that either the first sensor or the second sensor is not normal as a result of determination of the consistency of the information, it may be determined that the consistency with the information acquired by a third sensor. As a result, it is possible to specify which of the first sensor and the second sensor is abnormal.

The eighteenth embodiment described above is illustrative only to facilitate an understanding of the presently disclosed subject matter. The configuration according to the eighteenth embodiment can be appropriately modified or improved without departing from the gist of the presently disclosed subject matter.

If only the first example of operation is performed, the sensor system 5001 does not need to include a left front lamp 5004LF, a right front lamp 5004RF, a left rear lamp 5004LR, and a right rear lamp 5004RR.

If only the second exemplary operation is performed, the sensor system 5001 does not need to include the left front LiDAR sensor 5002LF, the right front LiDAR sensor 5002RF, the left rear LiDAR sensor 5002LR, the right rear LiDAR sensor 5002RR, and the communicator 5006.

If only the third example of operation is performed, the sensor system 5001 does not need to include the left front lamp 5004LF, the right front lamp 5004RF, the left rear lamp 5004LR, the right rear lamp 5004RR, and the communicator 5006.

Figure 41:
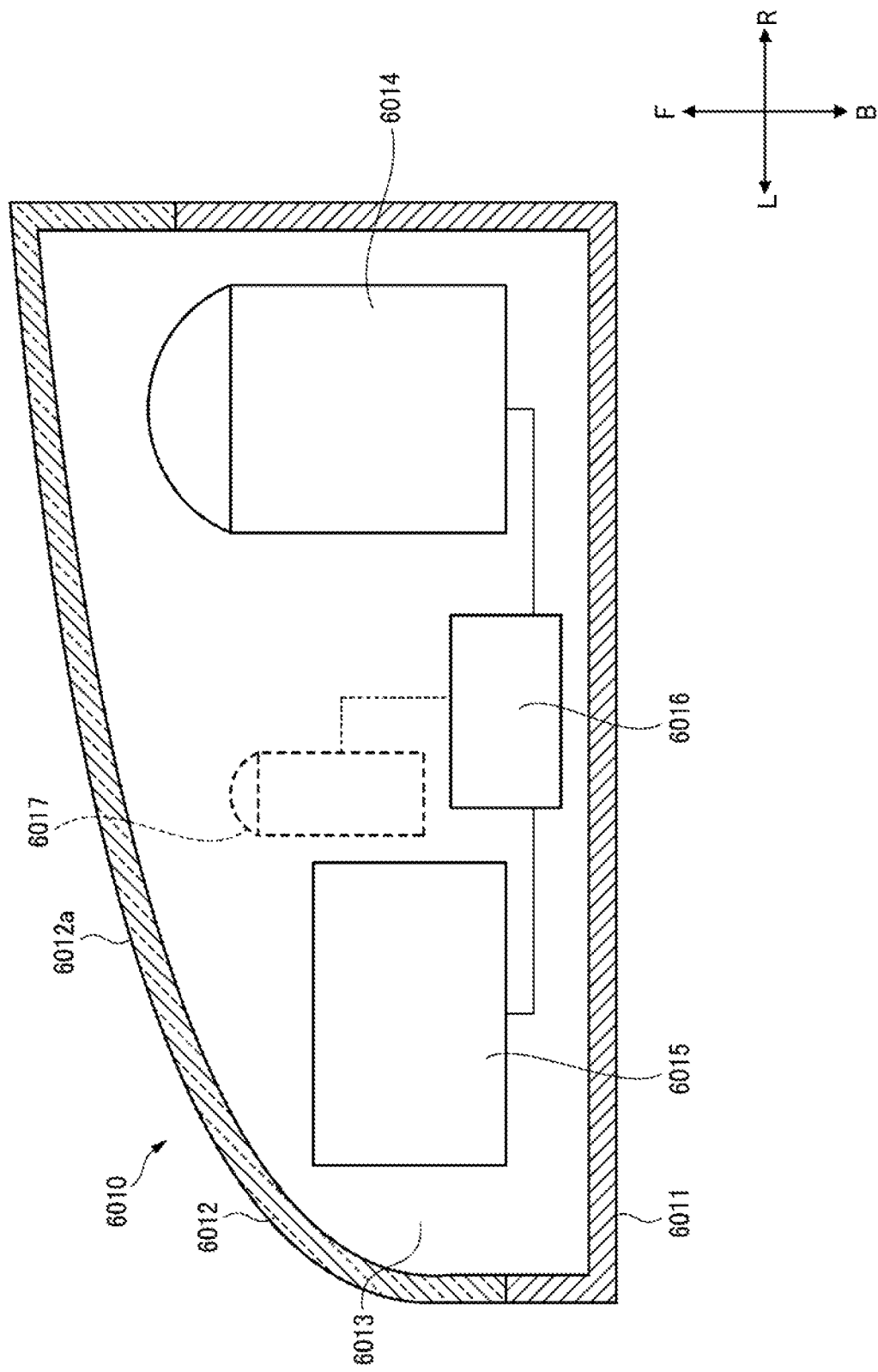
FIG. 41 schematically illustrates a configuration of a left front lamp device according to a nineteenth embodiment.

FIG. 41 schematically illustrates a configuration of a left front lamp device 6010 according to a nineteenth embodiment. The left front lamp device 6010 is mounted on the left front corner portion LF of the vehicle 100 illustrated in FIG. 2. A right front lamp device having a configuration symmetrical with the left front lamp device 6010 relative to the left-right direction is mounted on the right front corner portion RF of the vehicle 100.

The left front lamp device 6010 includes a housing 6011 and a translucent cover 6012. The translucent cover 6012 forms a portion of the outer face of the vehicle 100. The translucent cover 6012 defines a lamp chamber 6013 together with the housing 6011.

The left front lamp device 6010 includes a lamp unit 6014. The lamp unit 6014 is a lamp that emits light toward an area including ahead of the vehicle 100. The lamp unit 6014 is a headlamp, for example.

The left front lamp device 6010 includes a LiDAR sensor unit 6015. The LiDAR sensor unit 6015 is disposed in the lamp chamber 6013. That is, the lamp chamber 6013 is an example of a housing chamber.

The LiDAR sensor unit 6015 has a configuration for emitting non-visible light and a configuration for detecting return light as a result of the non-visible light being reflected by an object existing at least ahead of the vehicle 100. The front of the vehicle 100 is an example of the outside of the vehicle. As required, the LiDAR sensor unit 6015 may include a scan device that sweeps the non-visible light to change the light emitting direction (i.e., the detecting direction). In the present embodiment, infrared light having a wavelength of 905 nm is used as the non-visible light.

The LiDAR sensor unit 6015 can acquire the distance to the object associated with the returned light, for example, based on the time period from the time when the non-visible light is emitted in a certain direction to the time when the returned light is detected. Further, by accumulating such distance information in association with the detecting position, it is possible to acquire information as to the shape of the object associated with the returned light. Additionally or alternatively, information as to an attribute such as the material of the object associated with the returned light can be acquired based on the difference in wavelength between the emitted light and the returned light.

In other words, the LiDAR sensor unit 6015 is a sensor for detecting information including a distance to at least an area ahead of the vehicle 100. The LiDAR sensor unit 6015 outputs data corresponding to the attributes of the detected return light, such as intensities and wavelengths.

The left front lamp device 6010 includes a processing device 6016. The above-mentioned information is acquired by appropriately processing the information outputted from the LiDAR sensor unit 6015 by the processing device 6016. The LiDAR sensor unit 6015 and the processing device 6016 constitute a sensor system.

The processing device 6016 includes a processor and a memory. Examples of the processor include a CPU and an MPU. The processor may include multiple processor cores.

Examples of the memory include a ROM and a RAM. The ROM may store a program for executing the processing described above. The program may include an artificial intelligence program. Examples of the artificial intelligence program may include a pretrained neural network with deep learning. The processor may designate at least a part of the program stored in the ROM, load the program on the RAM, and execute the processing described above in cooperation with the RAM.

Specifically, the processing device 6016 is configured to exclude information corresponding to a space closer than a predetermined distance from the LiDAR sensor unit 6015 when performing processing based on the detected result of the LiDAR sensor unit 6015.

Figure 42:
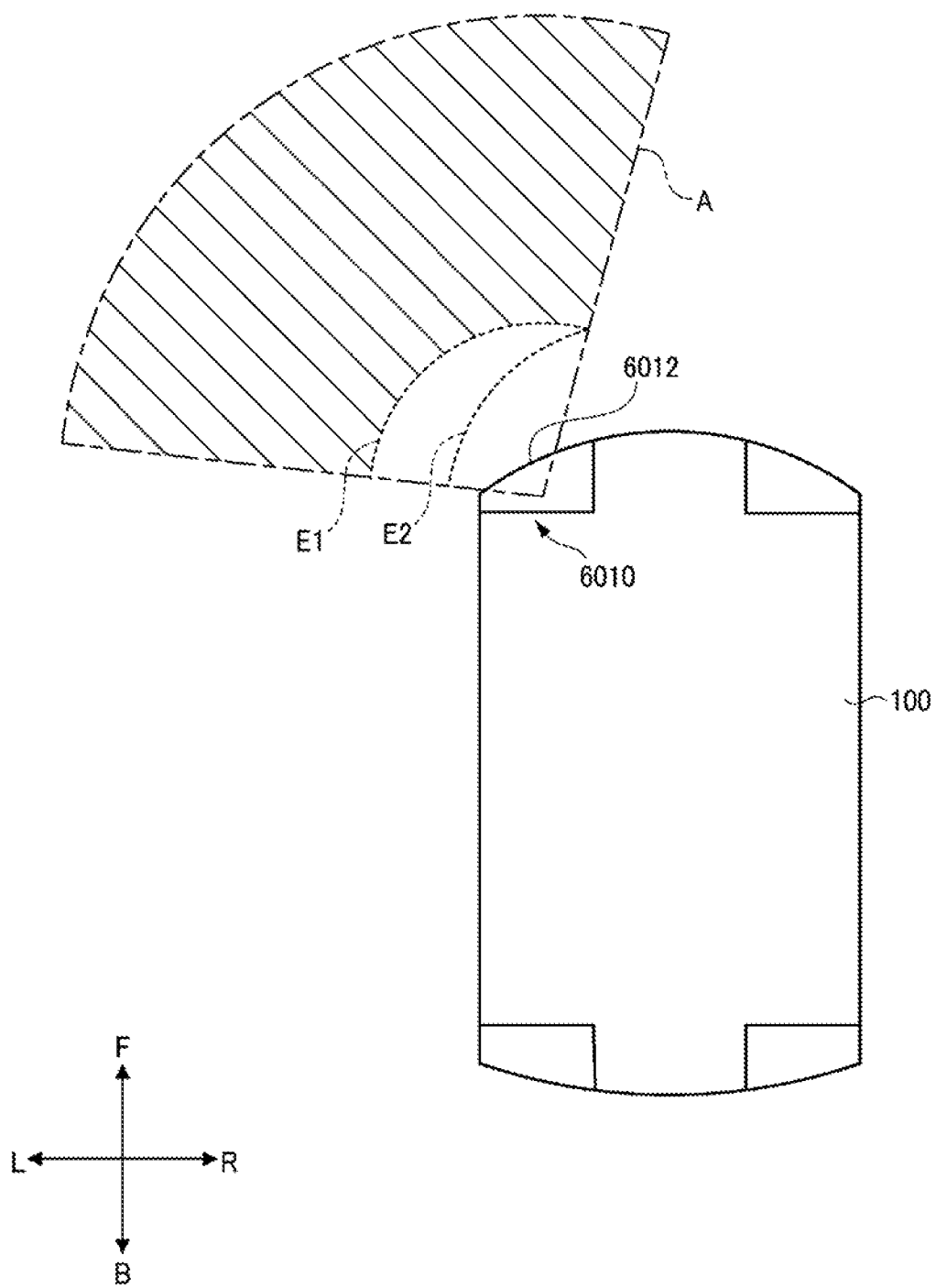
FIG. 42 illustrates a detection range of a LiDAR sensor unit in the left front lamp device of FIG. 41.

In FIG. 42, an area A surrounded by a chain line represents a detecting area of the LiDAR sensor unit 6015. The dashed line E1 is a set of points that are at predetermined distances from the LiDAR sensor unit 6015. The predetermined distance is defined as such a distance that an object to be detected (a pedestrian, an object with a collision possibility, or the like) is assumed to be absent at a location where is closer than the distance.

The processing device 6016 uniformly excludes the information corresponding to the space closer to the LiDAR sensor unit 6015 than the dashed line E1. That is, only the information corresponding to the hatched portion of the region A is subject to the processing relating to the information acquisition.

According to such a configuration, the amount of information subjected to the processing for acquiring the external information of the vehicle 100 is reduced, so that an increase in processing load can be suppressed. In addition, since a part of the information outputted from the LiDAR sensor unit 6015 is uniformly excluded from the processing target based on predetermined distances, it is possible to omit the determination processing relating to the selection of information. This also makes it possible to suppress an increase in the processing load.

The dashed line E1 is a set of points whose distances from the LiDAR sensor unit 6015 are constant regardless of the detecting directions. However, distances from the LiDAR sensor unit 6015 to determine the information to be excluded from the target of data processing may vary depending on the detecting directions. The dashed line E2 illustrates such an example. The shape of the dashed line E2 is appropriately determined according to an assumed detection target.

According to such a configuration, it is possible to flexibly cope with more complicated information detection while suppressing an increase in the processing load.

As can be seen from FIG. 42, the area closer to the LiDAR sensor unit 6015 than the dashed line E1 or E2 includes the translucent cover 6012 of the left front lamp device 6010. The presence of the translucent cover 6012 can be detected by the LiDAR sensor unit 6015. However, the translucent cover 6012 itself and the inner side thereof, i.e., the inside of the lamp chamber 6013, are not necessary upon the acquisition of the external information of the vehicle 100.

Accordingly, the predetermined distance may be a distance from the LiDAR sensor unit 6015 to an outer face 6012*a* (see FIG. 41) of the translucent cover 6012. In this case, since it is not necessary to consider the presence of the translucent cover 6012 when acquiring the external information of the vehicle 100, an increase in the processing load can be suppressed.

In the embodiment illustrated in FIG. 41, the distance from the LiDAR sensor unit 6015 to the outer face 6012*a* of the translucent cover 6012 is changed in accordance with the detecting direction. However, since the shape of the translucent cover 6012 is known, the distance for information exclusion can be easily determined.

The processing device 6016 may be configured to acquire a temporal change of a result detected by the LiDAR sensor unit 6015 on the outer face 6012*a* of the translucent cover 6012.

In this case, water droplets or dirt adhering to the outer face 6012*a* of the translucent cover 6012, scratches formed on the outer face 6012*a* of the translucent cover 6012, and the like can be detected. The processing device 6016 can exclude the result detected in this manner from the target of the processing for acquiring the external information of the vehicle 100. As a result, the influence of water droplets, dirt, scratches, and the like on the acquisition of the external information of the vehicle 100 can be eliminated and an increase in the processing load can be suppressed.

As illustrated by a dashed line in FIG. 41, the left front lamp device 6010 may include a camera unit 6017. The camera unit 6017 is disposed in the lamp chamber 6013. The camera unit 6017 is a device for acquiring image information of an area including ahead of the vehicle 100.

The camera unit 6017 outputs the information corresponding to the acquired image information. The image information is acquired by appropriately processing the information outputted from the camera unit 6017 by the processing device 6016.

In this instance, the processing device 6016 may be configured to acquire the external information of the vehicle 100 based on the information outputted from the camera unit 6017 while referring to the temporal change of the detection result by the LiDAR sensor unit 6015.

In principle, the distance information is not included in the image information outputted from the camera unit 6017. On the other hand, water droplets, dirt, scratches, and the like on the outer face 6012*a* of the translucent cover 6012 may be captured in an image acquired by the camera unit 6017. By referring to the presence of water droplets, dirt, scratches, or the like detected by the LiDAR sensor unit 6015, processing for detecting the water droplets, dirt, scratches, or the like from the image information can be made unnecessary, so that an increase in the processing load can be suppressed.

The configuration of the left front lamp device 6010 is also applicable to the left rear lamp device. The left rear lamp device is mounted on the left rear corner portion LB of the vehicle 100 illustrated in FIG. 2. The basic configuration of the left rear lamp device may be symmetric with the left front lamp device 6010 relative to the front-rear direction. However, the specifications of the lamp unit 6014 and the LiDAR sensor unit 6015 may be appropriately changed.

The configuration of the left front lamp device 6010 is also applicable to the right rear lamp device. The right rear lamp device is mounted on the right rear corner portion RB of the vehicle 100 illustrated in FIG. 2. The basic configuration of the right rear lamp device is symmetrical with the above-mentioned left rear lamp device relative to the left-right direction.

The nineteenth embodiment described above is illustrative only to facilitate an understanding of the presently disclosed subject matter. The configuration according to the nineteenth embodiment can be appropriately modified or improved without departing from the gist of the presently disclosed subject matter.

In addition to or in place of the LiDAR sensor unit 6015, a millimeter wave radar unit may be housed in the lamp chamber 6013. The millimeter wave radar unit has a configuration for transmitting a millimeter wave and a configuration for receiving a reflection wave resulting from the millimeter wave being reflected by an object existing outside the vehicle 100. Examples of frequencies of millimeter waves include 24 GHz, 26 GHz, 76 GHz, and 79 GHz.

The millimeter wave radar unit can obtain the distance to the object associated with the reflected wave, for example, based on the time period from the time when the millimeter wave is transmitted in a certain direction to the time when the reflected wave is received. In addition, by accumulating such distance data in association with the detecting position, it is possible to acquire information as to the shape of the object associated with the reflection wave. That is, the millimeter wave radar unit is an example of a sensor unit that detects information including a distance to an area outside the vehicle 100.

The millimeter wave radar unit outputs data corresponding to the attributes of the detected reflection wave, such as intensities and wavelengths. The above-mentioned information is obtained by appropriately processing the data outputted from the millimeter wave radar unit by the processing device 6016.

The left front lamp device 6010 may be configured as a left front sensor device that does not include the lamp unit 6014. If the camera unit 6017 is also not provided, the translucent cover 6012 need not be transparent to visible light.

In the embodiment described above, the left front lamp device 6010 includes the processing device 6016. However, at least a part of the functions of the processing device 6016 may be realized by the control device 101 illustrated by a dashed line in FIG. 2. An example of the control device 101 is an ECU. The ECU may be configured by an integrated circuit such as an ASIC or an FPGA, or may be configured by a combination of a microcontroller and an integrated circuit.

The present application is based on Japanese Patent Application No. 2017-142752 filed on Jul. 24, 2017, Japanese Patent Application No. 2017-143576 filed on Jul. 25, 2017, Japanese Patent Application No. 2017-151425 filed on Aug. 4, 2017, Japanese Patent Application No. 2017-157566 filed on Aug. 17, 2017, Japanese Patent Application No. 2017-165462 filed on Aug. 30, 2017, and Japanese Patent Application No. 2017-207339 filed on Oct. 26, 2017, the entire contents of which are incorporated herein by reference.

The invention claimed is:

1. A sensor system, adapted to be mounted on a vehicle, comprising: a housing; a translucent cover defining a housing chamber together with the housing; a lamp unit disposed in the housing chamber and configured to emit light; a sensor unit disposed in the housing chamber and having a sensor configured to detect external information of the vehicle; and a light emitting member disposed in a position in the housing chamber being discrete from the lamp unit and surrounding the sensor unit when viewed from an outside of the vehicle, at which operation of the sensor is not obstructed, and configured to emit light while the sensor is detecting the external information of the vehicle, when the sensor is activated or when the sensor is deactivated, wherein the sensor unit and the light emitting member are visible from the outside of the vehicle.

2. The sensor system according to claim 1,
wherein the light emitting member is a light source.

3. The sensor system according to claim 2, further comprising:
a controller configured to control the operation of the sensor; and
a support member supporting the light source, the sensor and the controller so as to maintain their positional relationships.

4. The sensor system according to claim 3, further comprising:
an adjustment mechanism configured to adjust at least one of a detection reference position of the sensor and a light emitting direction of the light source.

5. The sensor system according to claim 1,
wherein the light emitting member is configured to emit light when the vehicle performs a control operation that at least partially performs at least one of a driving operation, monitoring of driving environment, and backup of the driving operation.

6. The sensor system according to claim 1,
wherein the light emitting member is a light guide member.

* * * * *